(12) United States Patent
Kikkoji et al.

(10) Patent No.: US 8,185,924 B2
(45) Date of Patent: May 22, 2012

(54) INFORMATION PROCESSING DEVICE, INFORMATION PROCESSING METHOD, AND INFORMATION PROCESSING PROGRAM

(75) Inventors: Hiroyuki Kikkoji, Tokyo (JP); Nozomu Okuzawa, Tokyo (JP); Shinsuke Yamashita, Kanagawa (JP); Jun Moriya, Tokyo (JP); Yasuhiro Murase, Tokyo (JP)

(73) Assignee: Sony Corporation, Tokyo (JP)

( * ) Notice: Subject to any disclaimer, the term of this patent is extended or adjusted under 35 U.S.C. 154(b) by 556 days.

(21) Appl. No.: 10/564,058

(22) PCT Filed: May 18, 2004

(86) PCT No.: PCT/JP2004/007053
§ 371 (c)(1),
(2), (4) Date: Jan. 10, 2006

(87) PCT Pub. No.: WO2005/006230
PCT Pub. Date: Jan. 20, 2005

(65) Prior Publication Data
US 2006/0190980 A1    Aug. 24, 2006

(30) Foreign Application Priority Data

Jul. 14, 2003 (JP) ................................. 2003-274302
Aug. 11, 2003 (JP) ................................. 2003-291741
Sep. 4, 2003 (JP) ................................. 2003-313167
Sep. 30, 2003 (JP) ................................. 2003-339489
Sep. 30, 2003 (JP) ................................. 2003-342024

(51) Int. Cl.
*H04N 7/10* (2006.01)
*H04N 7/025* (2006.01)
*G06F 3/00* (2006.01)

(52) U.S. Cl. .......................... 725/40; 455/3.05; 455/3.06
(58) Field of Classification Search ..................... 725/23
See application file for complete search history.

(56) References Cited

U.S. PATENT DOCUMENTS
4,673,976 A * 6/1987 Wreford-Howard ......... 725/120
(Continued)

FOREIGN PATENT DOCUMENTS
JP    2000-209681    7/2000
(Continued)

OTHER PUBLICATIONS
U.S. Appl. No. 10/526,902, filed Aug. 16, 2005, Yamashita et al.
(Continued)

*Primary Examiner* — Kristine Kincaid
*Assistant Examiner* — Robert Hance
(74) *Attorney, Agent, or Firm* — Oblon, Spivak, McClelland, Maier & Neustadt, L.L.P.

(57) ABSTRACT

Request information 3 is transmitted from a transmission means 1a of a communication device 1 to a server 2. Then, related information 4a corresponding to the request information 3 and an identification code 4b are obtained and transmitted to the communication device 1 by a transmission means 2c. The related information 4a and identification code 4b are stored in a storage means 1c of the communication device 1. Thereafter, purchase request information 5a is transmitted to the server 2 by the transmission means 1a. This purchase request information 5a is added with an identification code 5b and user identification information 5c. Then, content data 6a corresponding to the purchase request information 5a and additional data 6b corresponding to the identification code 5b are transmitted to the communication device 1 by the transmission means 2c of the server 2.

12 Claims, 33 Drawing Sheets

U.S. PATENT DOCUMENTS

| | | | | |
|---|---|---|---|---|
| 5,014,125 | A | * | 5/1991 | Pocock et al. .................. 725/93 |
| 5,128,752 | A | * | 7/1992 | Von Kohorn .................... 705/10 |
| 5,287,181 | A | * | 2/1994 | Holman ....................... 348/473 |
| 5,510,832 | A | | 4/1996 | Garcia ........................... 348/56 |
| 5,974,399 | A | * | 10/1999 | Giuliani et al. ................. 705/14 |
| 6,178,446 | B1 | * | 1/2001 | Gerszberg et al. ............ 709/217 |
| 6,263,505 | B1 | * | 7/2001 | Walker et al. ................. 725/110 |
| 6,317,784 | B1 | * | 11/2001 | Mackintosh et al. ......... 709/219 |
| 6,378,031 | B1 | * | 4/2002 | Kuno et al. ....................... 711/4 |
| 6,490,728 | B1 | * | 12/2002 | Kitazato et al. ............... 725/151 |
| 2002/0026419 | A1 | * | 2/2002 | Maritzen et al. ................. 705/41 |
| 2002/0046109 | A1 | * | 4/2002 | Leonard et al. ................. 705/14 |
| 2002/0120927 | A1 | * | 8/2002 | Harada et al. ................... 725/23 |
| 2002/0174436 | A1 | * | 11/2002 | Wu et al. ......................... 725/87 |
| 2002/0188461 | A1 | * | 12/2002 | Matsumoto ....................... 705/1 |
| 2003/0003431 | A1 | * | 1/2003 | Maeda ..................... 434/307 A |
| 2003/0021346 | A1 | * | 1/2003 | Bixby et al. ............. 375/240.25 |
| 2003/0172108 | A1 | * | 9/2003 | Paul et al. ...................... 709/203 |
| 2004/0015986 | A1 | * | 1/2004 | Carver et al. ................... 725/36 |
| 2005/0060701 | A1 | | 3/2005 | Murase |
| 2005/0091679 | A1 | | 4/2005 | Tanaka et al. |

FOREIGN PATENT DOCUMENTS

| | | |
|---|---|---|
| JP | 2000-222360 | 8/2000 |
| JP | 2002-164858 | 6/2002 |
| JP | 2002-209681 | 7/2002 |
| JP | 2002-222302 | 8/2002 |
| JP | 2002-534013 | 10/2002 |
| JP | 2003-16328 | 1/2003 |
| JP | 2003-046986 | 2/2003 |
| JP | 2003-108565 | 4/2003 |
| JP | 2003-162601 | 6/2003 |

OTHER PUBLICATIONS

U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.

* cited by examiner

50 RELATED INFORMATION

| ITEM | CONTENTS |
|---|---|
| SONG TITLE | RAINY, AFTER FAIR |
| ARTIST NAME | FALCONS |
| CLIP TIME | 2003/3/8 19:20 |
| CD NUMBER | No. 01234567 |
| CLIP LOCATION | MD |
| ⋮ | ⋮ |

FIG. 9

70 IDENTIFICATION CODE

| ISSUER | FM SHINAGAWA |
|---|---|
| PURPOSE | DISCOUNT OF A CD |
| AVAILABLE PARTNER | CD SHOP A |
| EXPIRATION LIMIT | 2003.12.31 |
| CODE ID | A03281 |

FIG. 10

60X FIRST IDENTIFICATION CODE

| | | |
|---|---|---|
| 60aX | ISSUER | FM SHINAGAWA |
| 60bX | PURPOSE | BONUS TRACK A |
| 60cX | AVAILABLE PARTNER | MUSIC DISTRIBUTION SITE B |
| 60dX | EXPIRATION LIMIT | 2003.12.31 |
| 60eX | CODE ID | A03281 |

FIG. 19

70X SECOND IDENTIFICATION CODE

| | | |
|---|---|---|
| 70aX | ISSUER | MUSIC DISTRIBUTION SITE B |
| 70bX | PURPOSE | DISCOUNT OF A PARTICULAR CD |
| 70cX | AVAILABLE PARTNER | CD SHOP A |
| 70dX | EXPIRATION LIMIT | 2003.12.31 |
| 70eX | CODE ID | B49382 |

FIG. 21

INFORMATION PROCESSING DEVICE, INFORMATION PROCESSING METHOD, AND INFORMATION PROCESSING PROGRAM

TECHNICAL FIELD

The present invention relates to an information processing apparatus, information processing method, and information processing program for receiving related information of broadcast contents. In particular, the present invention relates to an information processing apparatus, information processing method, and information processing program for periodically receiving related information of a content being broadcasted.

BACKGROUND ART

Currently, various contents are sold. Those contents are sold, recorded on recording media such as CDs (Compact Discs), for example. Alternatively, contents can be purchased through the Internet. Examples thereof are a service which provides digital contents such as music songs on line from servers to terminal devices (EMD: Electronic Music Distribution), and an Electronic Commerce (EC) by which music CDs can be ordered on line and distributed.

Contents recorded on recording media are sometimes added with additional data such as electronic watermarks or advertisements. To promote use of these additional data, there has been a technique which makes special service available when additional data is used as a content is played back from a recording medium.

Patent Document 1: Jpn. Pat. Appln. Laid-Open Publication No. 2002-112012

Meanwhile, FM broadcast stations provide related information related to songs to be broadcasted, through the Internet. For example, a service of providing related information of songs being currently broadcasted (now-on-air), lists of songs broadcasted in past programs (on-air list), or the like.

In addition, there are a service of searching for contents such as songs through the Internet (distributed-song search service), a service of searching for CDs (CD search service), and the like. In these search services, information concerning a CD which complies with a search key, and information related to songs contained in the CD are returned as a search result.

By interconnecting these services, it is possible to promote use of the services. For example, a link may be added from a server providing related information to a server selling contents, so that users can smoothly move to a content sales service from a related-information providing service. Interconnections between plural services, conveniences for users of the services improve.

However, a simple interconnection between services cannot change the quality of a service to be utilized next, depending on the contents of a service which is utilized first. For example, in case of purchasing a CD based on related information of a song with use of a personal computer, there exists no system which allows users to receive a special service such as discount only when a distributed song or CD is searched from and purchased from related information of a song broadcasted in a specific time band in a specific program. There has been demand for a system by which the same discount service is provided when the CD is purchased in a shop.

The technique described in the Patent Document 1 utilizes contents and additional data both recorded on recording media, and does not interconnect services through a network.

DISCLOSURE OF THE INVENTION

The present invention has been made in view of the above situation and has an object of providing an information processing apparatus, information processing method, and information processing program by which a user who has once received a service of providing related information of a content can attain any special service when the user uses another service.

In order to achieve the above object, according to a first aspect of the present invention, there is provided an information processing apparatus comprising: a transmission means for transmitting request information continuously at a particular interval, the request information requesting related information related to a content in a broadcast program being received; a reception means for receiving the related information corresponding to the request information, and an identification code indicative of a right to receive a particular service upon purchase of a content; a storage means for storing the related information and the identification code which have been received; and a display means for displaying the related information stored in the storage means.

According to the information processing apparatus, request information is transmitted by the transmission means at a particular interval. Then, related information corresponding to the request information and an identification code indicative of a right to receive a particular service upon purchase of a content are received by the reception means. The related information and the identification code are stored by the storage means. Further, the related information is displayed by the display means.

Also to achieve the above object, according to a second aspect of the present invention, there is provided an information processing apparatus comprising: a storage means for storing related information related to a content in a broadcast program received by a communication device; a reception means for receiving request information requesting the related information and transmitted continuously at a particular interval from the communication device; and a transmission means for transmitting the related information to the communication device in response to the request information received by the reception means, and transmitting an identification code indicative of a right to allow a user of the communication device to receive a particular service when the user purchases a content.

According to this information processing apparatus, request information is received from the communication device by the reception means. Then, by the transmission means, related information is transmitted to the communication device, corresponding to the received request information, and an identification code indicative of a right to receive a particular service when the user of the communication device purchases a content is transmitted.

According to a third aspect of the present invention, there is provided an information processing method comprising: transmitting request information continuously at a particular interval, the request information requesting related information related to a content in a broadcast program being received; receiving the related information corresponding to the request information, and an identification code indicative of a right to receive a particular service upon purchase of a content; storing the related information and the identification code which have been received; and displaying the related information stored in the storage means.

According to the information processing method, request information is transmitted at a particular interval. Then, related information corresponding to the request information and an identification code indicative of a right to receive a particular service upon purchase of a content are received. The related information and the identification code are stored. Further, the related information is displayed.

According to a fourth aspect of the present invention, there is provided an information processing method comprising: storing related information related to a content in a broadcast program received by a communication device; receiving request information requesting the related information and transmitted continuously at a particular interval from the communication device; and transmitting the related information to the communication device in response to the received request information, and transmitting an identification code indicative of a right to allow a user of the communication device to receive a particular service when the user purchases a content.

According to the information processing method, request information is received from the communication device. Then, related information is transmitted to the communication device, corresponding to the received request information, and an identification code indicative of a right to receive a particular service when the user of the communication device purchases a content is transmitted.

According to a fifth aspect of the present invention, there is provided an information processing program to make a computer function as: a transmission means for transmitting request information continuously at a particular interval, the request information requesting related information related to a content in a broadcast program being received; a reception means for receiving the related information corresponding to the request information, and an identification code indicative of a right to receive a particular service upon purchase of a content; a storage means for storing the related information and the identification code which have been received; and a display means for displaying the related information stored in the storage means.

If the information processing program is executed by a computer, request information is transmitted by the transmission means at a particular interval. Then, related information corresponding to the request information and an identification code indicative of a right to receive a particular service upon purchase of a content are received by the reception means. The related information and the identification code are stored by the storage means. Further, the related information is displayed by the display means.

According to a sixth aspect of the present invention, there is provided an information processing program to make a computer function as: a storage means for storing related information related to a content in a broadcast program received by a communication device; a reception means for receiving request information requesting the related information and transmitted continuously at a particular interval from the communication device; and a transmission means for transmitting the related information to the communication device in response to the request information received by the reception means, and transmitting an identification code indicative of a right to allow a user of the communication device to receive a particular service when the user purchases a content.

If the information processing program is executed by a computer, request information is received from the communication device by the reception means. Then, by the transmission means, related information is transmitted to the communication device, corresponding to the received request information, and an identification code indicative of a right to receive a particular service when the user of the communication device is transmitted.

As has been described above, according to the first, third, and fifth aspects of the present invention, related information corresponding to request information and an identification code indicative of a right to receive a particular service upon purchase of a content are received and stored. Therefore, a particular service can thereafter be received with use of the identification code.

According to the second, fourth, and sixth aspects of the present invention, related information is transmitted to a communication device, and an identification code indicative of a right to allow the user of the communication device to receive a particular service when the user purchases a content is transmitted. Therefore, a right to use a particular service can be given to the user who has obtained related information.

BRIEF DESCRIPTION OF THE DRAWINGS

FIG. 9 is a table showing an example of the data structure of related information;

FIG. 10 is a table showing an example of the data structure of an identification code stored by clipping;

FIG. 19 is a table showing an example of the structure of the first identification code;

FIG. 21 is a table showing an example of the structure of the second identification code;

BEST MODE FOR CARRYING OUT THE INVENTION

An embodiment of the present invention will now be described in details with reference to the drawings.

The outline of the invention applied to the embodiment will be described first, and thereafter, specific details of the embodiment will be described next.

(1) First Embodiment

Figure 1:
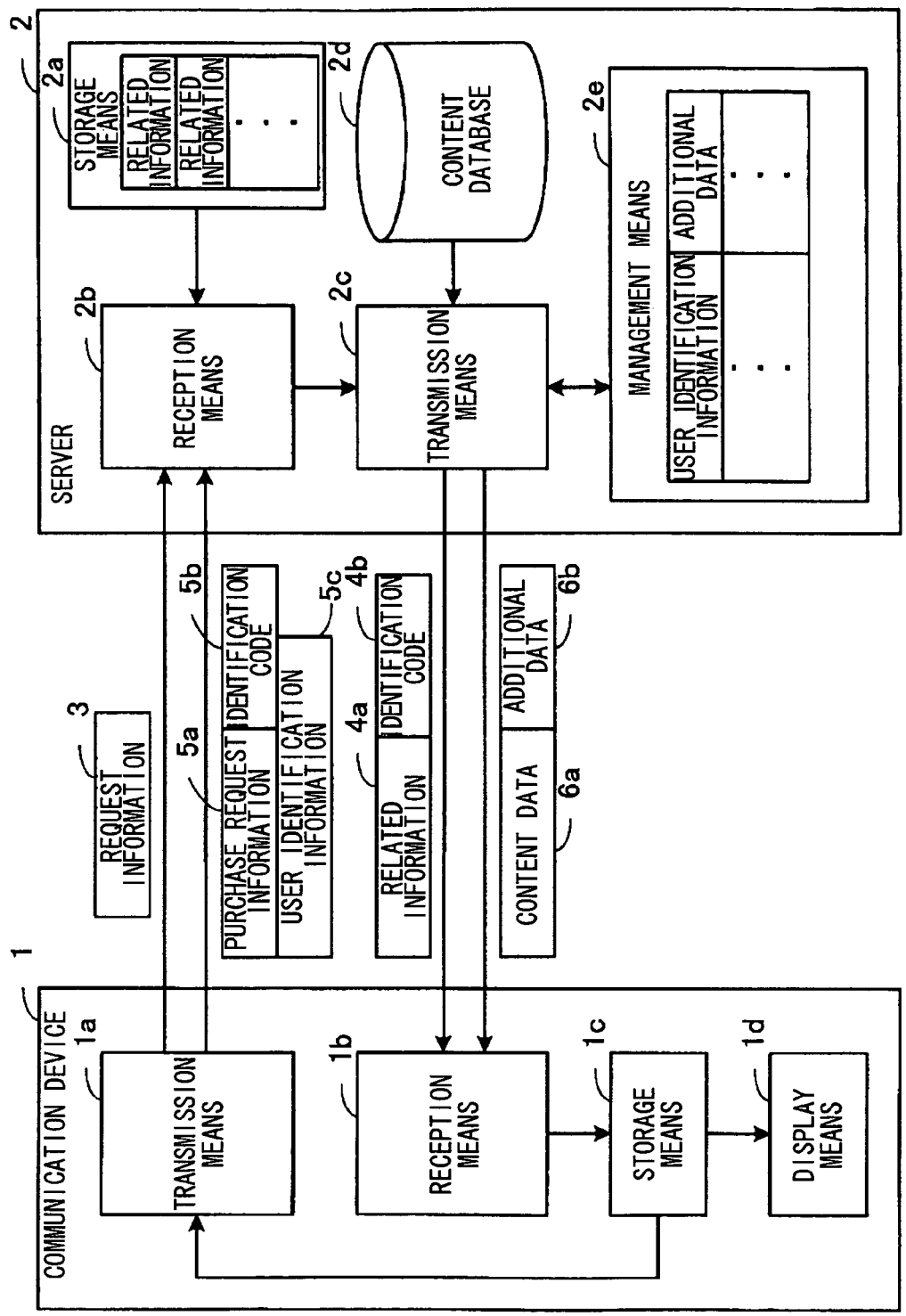
FIG. 1 is a conceptual view of the invention applied to the first embodiment.

FIG. 1 is a conceptual view of the invention applied to the first embodiment. A computer system provided in the embodiment is constituted by two types invention, i.e., the invention of an information processing apparatus which realizes functions of a communication apparatus 1, and the invention of an information processing apparatus which realizes functions of a server 2.

The communication apparatus 1 has a transmission means 1a, reception means 1b, storage means 1c, and display means 1d.

The transmission means 1a transmits, sequentially at specific intervals, request information 3 which requests related information 4a concerning contents in a broadcast program being broadcasted. The transmission means 1a obtains the related information 4a and an identification code 4b. Thereafter, the transmission means 1a transmits purchase request information 5a which requests purchase of a content, together with an identification code 5b and user identification information 5c for identifying the user.

The reception means 1b receives related information 4a corresponding to the request information 3, and the identification code 4b indicative of a right to receive a specific service granted upon purchase of a content. Also, the reception means 1b receives content data 6a corresponding to the purchase request information 5a, and additional data 6b corresponding to the identification code 5b.

The storage means 1c stores the received related information 4a and identification code 4b.

The display means 1d displays the related information 4a stored in the storage means 1c.

The server 2 has a storage means 2a, reception means 2b, transmission means 2c, content database 2d, and management means 2e.

The storage means 2a stores related information concerning contents in broadcast programs received by the communication apparatus 1.

The reception means 2b receives the request information 3 transmitted sequentially at specific intervals from the communication apparatus 1 and requesting related information. The reception means 2b receives purchase request information 5a requesting purchase of a content, identification code 5b, and user identification information 5c, from the communication apparatus 1.

The transmission means 2c transmits the related information 4a to the communication apparatus 1 in response to the request information 3 received by the reception means 2b, and also transmits the identification code 4b indicative, of the right to receive a specific service when the user buys a content. For example, the transmission means 2c transmits an identical identification code throughout a specific time band. Further, the transmission means 2c obtains content data 6a corresponding to the purchase request information 5a from the content database 2d, and transmits additional data 6b corresponding to the received content data 6a and identification code 5b.

The content database 2d is a database which stores content data 6a to be provided for the communication apparatus 1.

The management means 2e manages transmission of additional data 6b by the transmission means 2c. For example, the management means 2e performs management of copyright of the content data 6a and the additional data 6b, and manages how many times the identification code 4b is used.

In this kind of system, at first, the request information 3 is transmitted from the transmission means 1a of the communication apparatus 1 to the server 2. The request information 3 is periodically transmitted at predetermined intervals. The server 2 receives the request information 3 by the reception means 2b. The request information 3 is transferred to the transmission means 2c. Then, the transmission means 2c obtains related information 4a and an identification code 4b corresponding to the request information 3, which are transmitted to the communication apparatus 1. The communication apparatus 1 receives the related information 4a and identification code 4b by the reception means 1b. The received related information 4a and identification code 4b are stored in the storage means 1c. Further, the related information 4a is displayed by the display means 1d.

Thereafter, purchase request information 5a is transmitted to the server 2 by the transmission means 1a, in response to an operation input or the like from the user to the communication apparatus 1. The purchase request information 5a is added with an identification code 5b (identification code 4b) and a user identification information 5c. Each of the transmitted information is received by the reception means 2b of the server 2. The received information is transferred to the transmission means 2c. Then, by the transmission means 2c, content data 6a corresponding to the purchase request information 5a is obtained from the content database 2d, and additional data 6b corresponding to the identification code 5b is determined. Further, the transmission means 2c transmits the content data 6a and additional data 6b to the communication apparatus 1. At this time, the management means 2e manages the additional data 6b from the transmission means 2c, for every item of user identification information 5c. The communication apparatus 1 receives the content data 6a and additional data 6b by the reception means 1b.

Thus, the server 2 transfers the identification code 4b to the communication apparatus 1 which has requested the related information 4a. If the purchase request information 5a outputted from the communication apparatus 1 is added with an identification code 5b, the additional data 6b corresponding to the identification code 5b is transferred to the communication apparatus 1, in addition to the purchased content data 6a. In this manner, this system can provide the user who has used the related information 4a, with a special service based on the additional data 6b. It is accordingly possible to promote use of the related information 4a.

When the transmission means 1a transmits the identification code 5b together with the purchase request information 5a, plural identification codes may be transmitted. For example, the plural identification codes to be transmitted are those that are usable for the purpose of purchase indicated by the purchase request information 5a among plural identification codes received by the reception means 1b. The transmission means 2c of the server 2 which has received plural identification codes may transmit additional data 6b corresponding to the number of the identification codes.

Alternatively, each identification code may include information indicative of a validity period. In this case, the transmission means 1a of the communication apparatus 1 transmits additional data corresponding to an identification code a validity period which has not yet expired. That is, identification codes that have already expired are dealt with as invalid data. In this manner, the system can provide users with an additional service with a limited period.

Further, each identification code may include service provider identification information for identifying the service provider who provides a specific service for a user when the user purchases a content. In this case, the transmission means 2c of the server 2 transmits additional data concerning the provided service by the service provider identification information. In this manner, this system can provide services with fine special services for service providers, respectively.

The service which can be received in correspondence with an identification code may be a discount service of the price at the time of purchasing song data or a CD. Individual identification codes may be set respectively for broadcast programs or for songs.

The additional data 6b transmitted together with the content data 6b is, for example, a bonus track (a content provided as a service). This additional data 6b is managed by the management means 2e, linked to the user identification information 5c, thereby enabling managements of copyrights and the like. That is, if the server 2 manages users to whom contents have been provided, users who have obtained contents in an improper manner can be distinguished. In addition, if the management means 2e manages how many times each identification code 4b is used, each identification codes is prevented from being used beyond a limitation to the number of times the identification code can be used.

The display means 1d of the communication apparatus 1 may display an icon indicative of presence of an identification code 4b, if an identification code 4b is added to related information 4a when displaying the related information 4a.

Contents to be broadcasted may be songs. Related information of a song includes the title of the song or the name of the artist who plays the song. The embodiment of the present invention will be specifically described below with reference to an example in case of obtaining related information by a terminal device connected to a network which incorporates the functions of the communication apparatus shown in FIG. 1.

In the following description, a processing of storing related information concerning a song or a set of songs will be called clipping.

Figure 2:
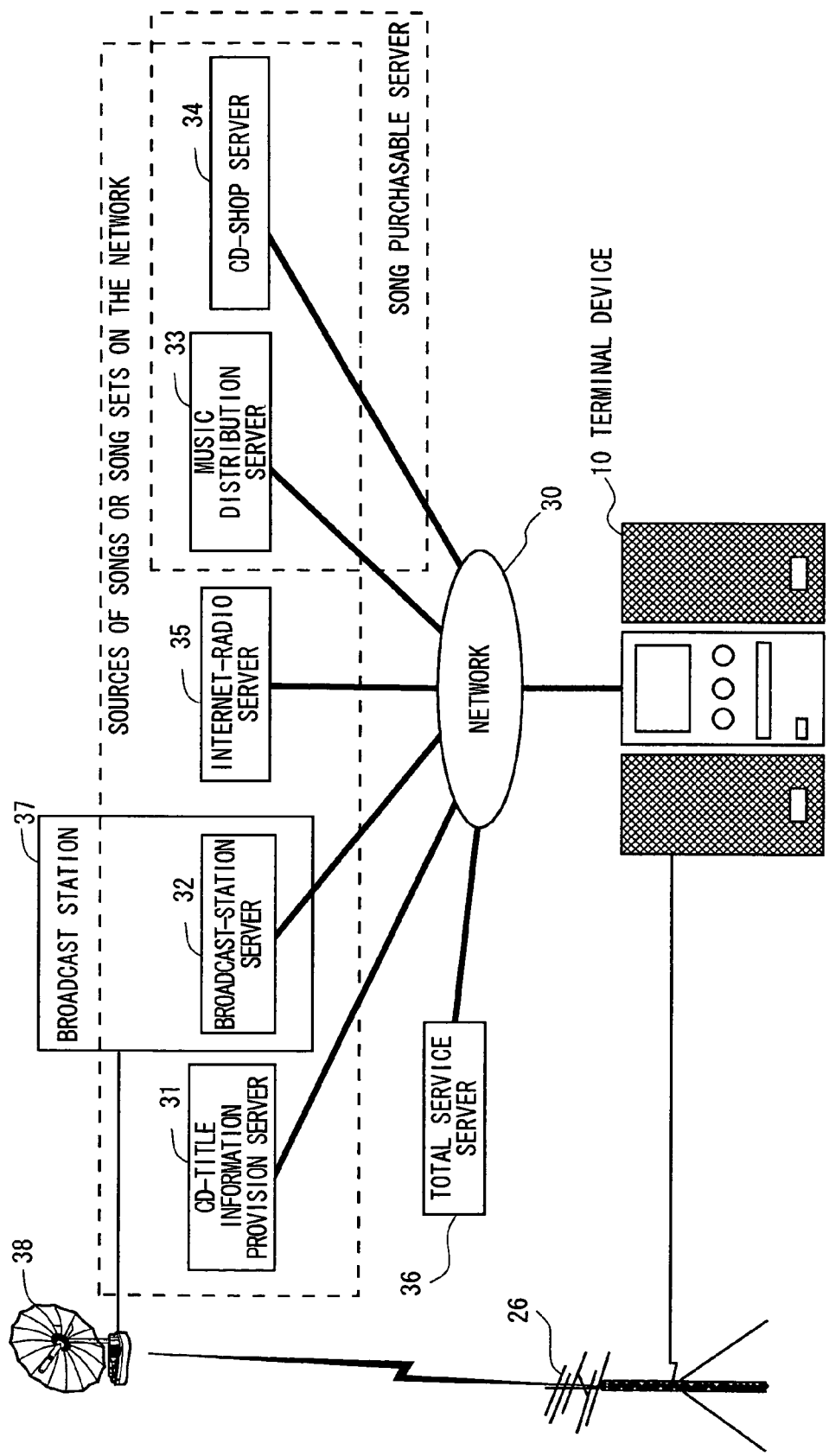
FIG. 2 is a view showing a network system according to an embodiment of the present invention.

FIG. 2 shows a network system according to the embodiment of the present invention. A terminal device 10 is connected to various servers via a network 30. The network 30 is, for example, the Internet. The servers may be a CD title information providing server 31, a broadcast station server 32, a music distribution server 33, a CD shop server 34, an internet radio server 35, a total service server 36, etc.

The CD title information providing server 31 serves to distribute related information of songs contained in commercially available CDs.

The broadcast station server 32 is a server managed by a broadcast station 37 of FM broadcast, television (TV) broadcast, or the like. The broadcast station 37 performs, for example, wireless broadcasting via an antenna 38, and the broadcast station server 32 provides a service of providing related information of broadcasted songs.

Note that the function of providing related information by the broadcast station server 32 is roughly divided into two kinds of functions. The first functions is to provide related information of a song currently broadcasted (now-on-air). The second function is to provide a list of songs which have already been broadcasted (on-air list), in response to a request from the terminal device 10 (the on-air list includes related information of songs). For example, the broadcast station server 32 provides related information of a song broadcasted in a specified program, or provides related information of a song broadcasted in a specified time band.

The music distribution server 33 serves to distribute digital data of songs (song data). For example, the music distribution server 33 provides music data only to the terminal device 10 of the user who took a procedure of purchasing a song. In addition, the music distribution server 33 can provide related information of songs to be distributed.

The CD shop server 34 serves to receive orders for correspondence sales of CDs. The CD shop server 34 also provides services to distribute demo song data and the like, and services of providing related information of songs contained in CDs on sale.

The Internet radio server 35 serves to provide audio programs through a broadband network such as the Internet or the like.

The total service server 36 functions as a reception window (e.g., a portal site) through the network 30, and intermediates various total services. For example, the total service server 36 distributes information indicative of a distribution source of related information of a song being broadcasted (for example, URL (Uniform Resource Locator)), to the terminal device 10.

Thus, plural servers serve to provide information related to songs or sets of songs on the network 30. That is, each server functions as a source of songs or sets of songs on the network 30.

Note that the music distribution server 33 and CD shop server 34 are servers from which songs can be purchased. Therefore, when a user operates the terminal device 10 to access a song-purchasable server, the user can actually purchase a song or a set of songs through the network 30. Thus, if the user of the terminal device 10 carries out a purchase procedure on the music distribution server 33, the user can download song data from the music distribution server 33.

Alternatively, if the user of the terminal device 10 carries out a purchase procedure on the CD shop server 34, the user can ask a deliver of a CD to the user's home.

The terminal device 10 can play back songs contained in CDs, MDs (Mini Discs), and the like, and can access various servers via the network 30 to obtain related information concerning songs. The terminal device 10 receives contents broadcasted through the antenna 26, and can output sounds from a loudspeaker.

Further, the terminal device 10 can clip related information. The terminal device 10 clip a song or a set of songs. In this manner, if an entire FM program, CD album, or the like including a number of interesting songs is clipped as a whole, related information of an interesting set of songs can be recorded by one clip operation.

Figure 3:
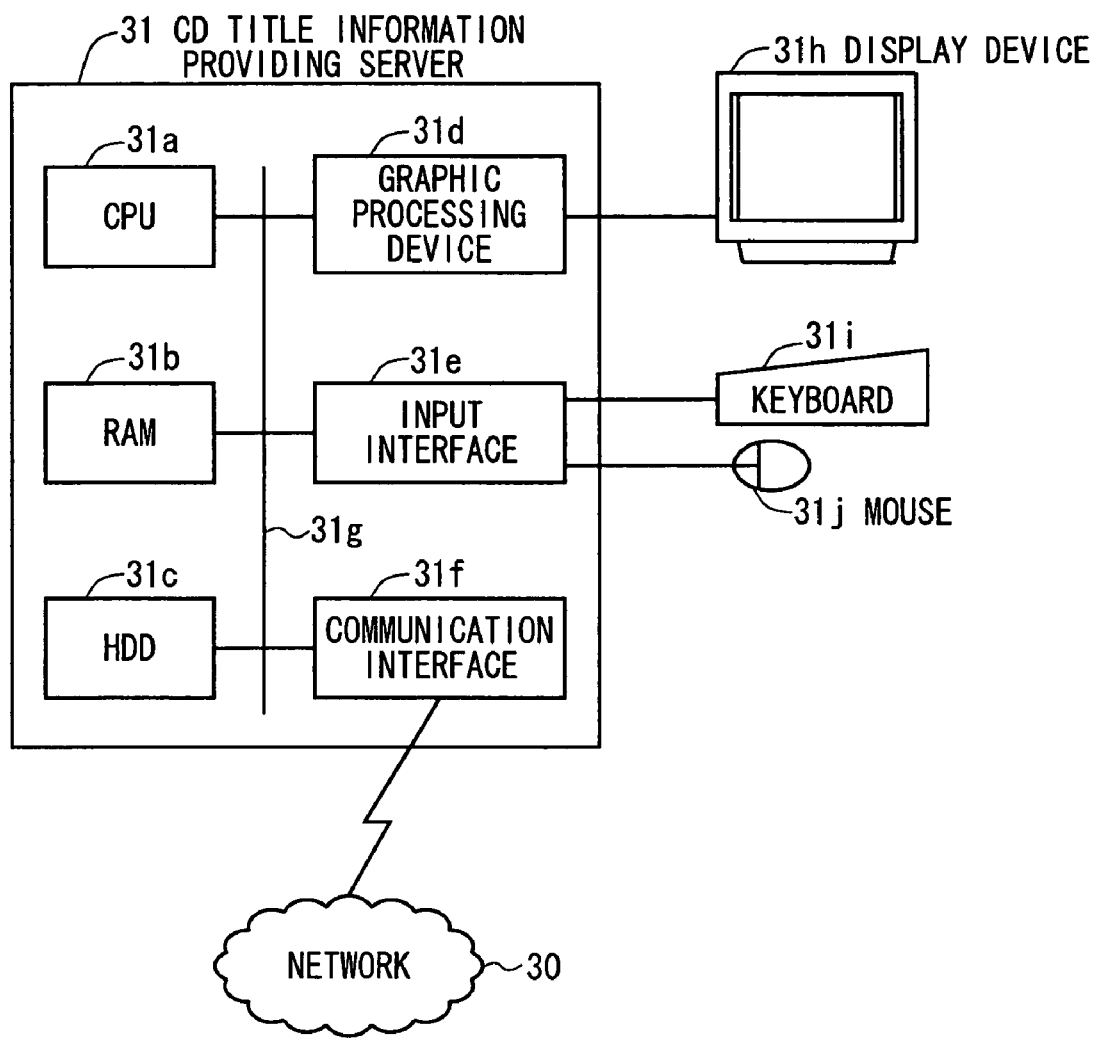
FIG. 3 is a view showing an example of the hardware configuration of a CD title information providing server.

FIG. 3 is a diagram showing an example of the hardware configuration of a CD title information providing server. The entire CD title information providing server 31 is controlled by a CPU (Central Processing Unit) 31a. The CPU 31a is connected to a RAM (Random Access Memory) 31b, hard disc drive (HDD) 31c, graphic processing device 31d, input interface 31e, and communication interface 31f, through a bus 31g.

The RAM 31b temporarily stores at least part of programs of the OS and application programs, which are to be executed by the CPU 31a. Also, the RAM 31b stores various data necessary for processing executed by the CPU 31a. The HDD 31c stores the OS and application programs. Also, the HDD 31c stores related information concerning CDs to be provided to the terminal device 10.

The graphic processing device 31d is connected to the display device 31h. The graphic processing device 31d makes images displayed on the screen of the display device 31h in accordance with instructions from the CPU 31a. The input interface 31e is connected to a keyboard 31i and a mouse 31j. The input interface 31e transmits signals fed from the keyboard 31i and mouse 31j to the CPU 31a through the bus 31g.

The communication interface 31f is connected to the network 30. The communication interface 31f performs data transmission/reception to/from another computer through the network 30.

According to the hardware configuration described above, the processing functions of the present embodiment can be realized. With reference to FIG. 3, the hardware configuration of the CD title information providing server 31 has been described as a typical example. Each of the other servers can be realized by a similar hardware configuration.

The terminal device 10 (communication apparatus 1) in the present embodiment also has a function as an audio device having a function to play back songs.

Figure 4:
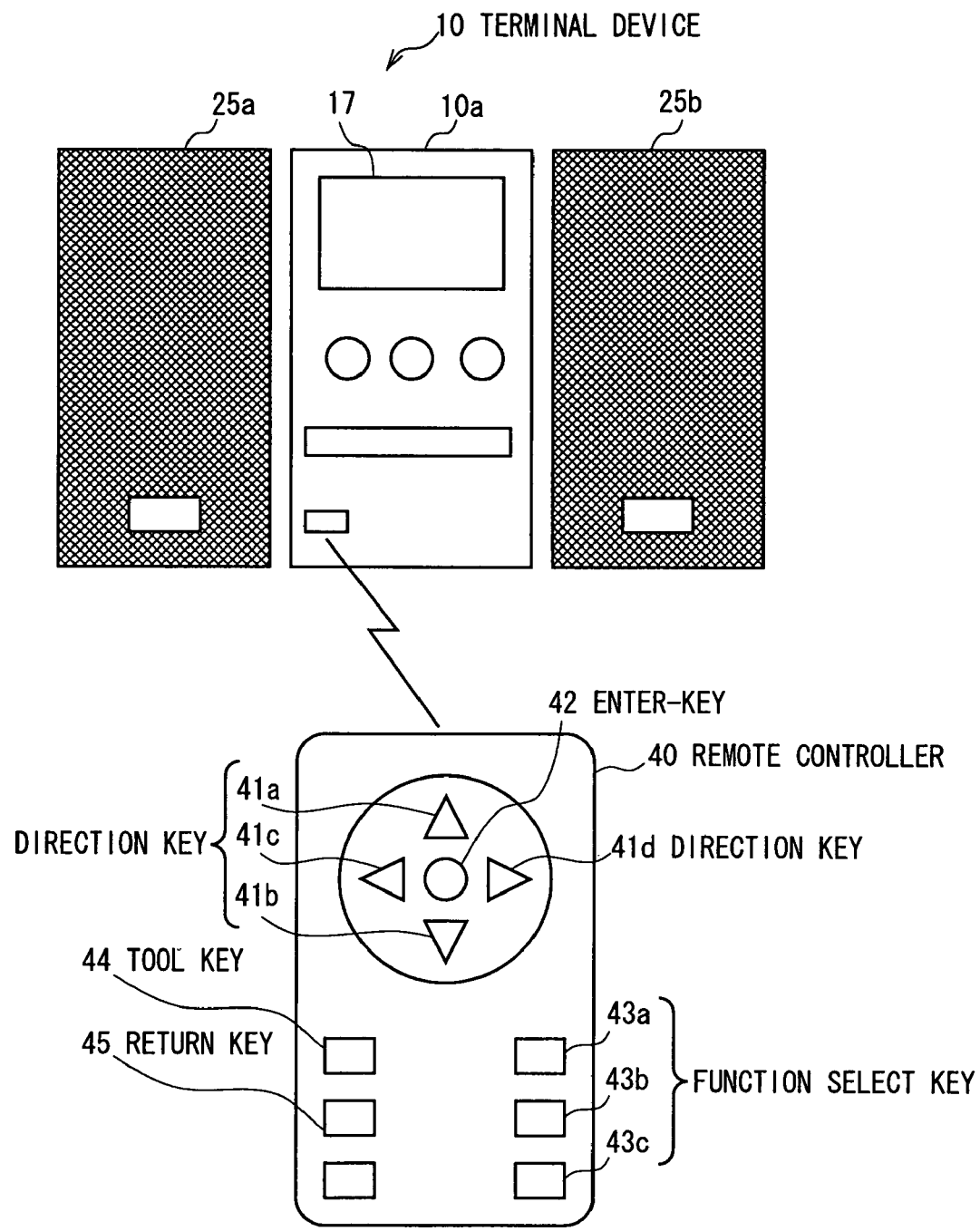
FIG. 4 is a view showing outer appearance of a terminal device.

FIG. 4 shows an outer appearance of the terminal device 10. As shown in FIG. 4, the terminal device 10 according to the present embodiment has an appearance similar to a system component generally used. The terminal device 10 includes a device body 10a, loudspeakers 25a and 25b, and a remote controller 40. The device body 10a has functions to play back CDs or DVDs (Digital Versatile Discs), to record/play back MDs, and to receive FM broadcast and TV broadcast. Audio signals generated by the device body 10a are supplied to the loudspeakers 25a and 25b, and then, sounds are outputted from the loudspeakers 25a and 25b.

Also, the device body 10a is provided with a display device 17. The display device 17 displays related information of a song being played back, related information stored by clipping, and the like.

The remote controller 40 is an input device to control the device body 10a from a remote place. The remote controller 40 is provided with plural operation keys. When a user presses down an operation key, a signal corresponding to the pressed operation key is transmitted to the device body 10a from the remote controller 40 by a wireless communication means such as infrared rays.

Provided as the operation keys are direction keys 41a to 41d, an enter key 42, function select keys 43a to 43c, a tool key 44, a return key 45, and the like.

The direction keys 41a to 41d are used to move a cursor and a focus spot displayed on the display device 17. The four direction keys 41a to 41d respectively correspond to upward, downward, leftward, and rightward directions. The cursor or the like moves in the direction corresponding to the direction key being pressed down.

The enter key 42 is used to fix any of contents displayed on the display device 17, for example.

The function select keys 43a to 43c are used to select functions. For example, the three function select keys 43a to 43c respectively correspond to a total service utilization function, a tuner function, and a local content management function. When any one of the function select keys 43a to 43c is pressed, the device body 10a switches into an operation mode of the function corresponding to the pressed function select key.

The tool key 44 is a button to display a tool menu on the display device 17. In the tool menu, commands corresponding to the contents displayed on the display device 17 are shown. The user can select an arbitrary command from the tool menu to make the terminal device 10 execute a processing corresponding to the command. For example, the user may select an arbitrary command by operating the direction keys 41a to 41d and further press the enter key 42. Then, a processing corresponding to the selected command is executed by the terminal device 10.

The return key 45 is a button to return the displayed contents of the display device 17 to status where the contents were in just before.

The remote controller 40 may further be provided with various other operation keys than those shown in FIG. 4. For example, a volume control key, a play key, a stop key, and the like for music CDS.

Next, the inner structure of the terminal device 10 will be described.

Figure 5:
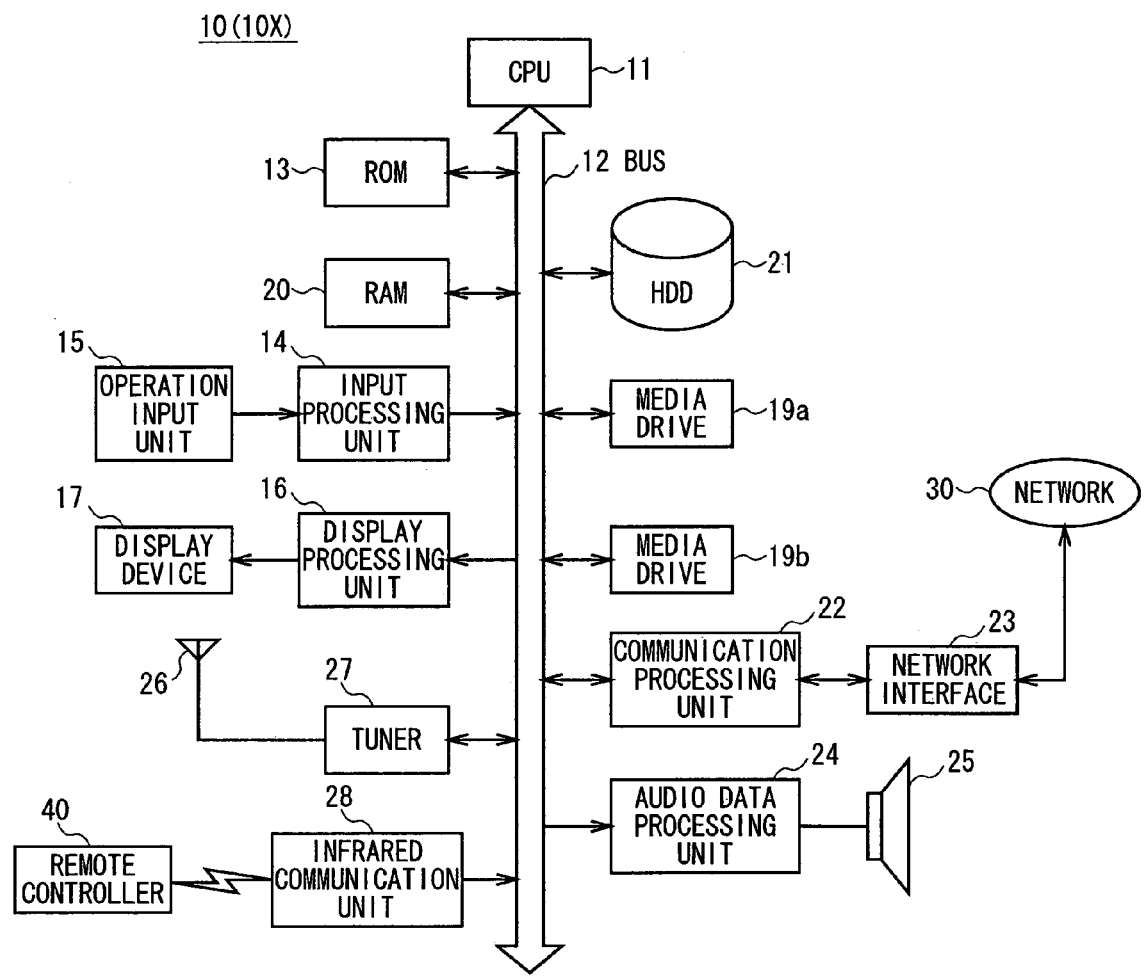
FIG. 5 is a block diagram showing the hardware configuration of the terminal device.

FIG. 5 is a block diagram showing the hardware configuration of the terminal device. The terminal device 10 as shown in FIG. 5 makes it possible to manage, record, and reproduce various sources such as songs and the like.

The CPU 11 performs total control and calculation processing of the whole terminal device 10, based on a program started up. For example, the CPU 11 performs communication operations via the network 30, input/output operations with respect to users, reproducing or clipping of contents from media, storing of contents into the hard disc drive (HDD) 21 and necessary management, and information search based on clipped information and the like via the network 30. Content data which are compatible with and recordable/reproducible by the terminal device 10 of the present invention are audio content data, video content data, and the like. The CPU 11 exchanges control signals and data with respective circuit units via the bus 12.

A ROM (Read Only Memory) 13 stores operation programs to be executed by the CPU 11, program loaders, various calculation coefficients, parameters used for programs, and the like. A RAM 20 develops programs to be executed by the CPU 11. The RAM 20 is also used as a data area and/or a task area necessary when the CPU 11 executes various processing.

The operation input unit 15 has various operators such as operation keys and a jog dial provided on the housing of the terminal device 10, a touch panel, and the like. A keyboard and a mouse for operating the GUI (Graphic User Interface) may be provided as the operation input unit 15. Information inputted through the operation input unit 15 is subjected to a predetermined processing by the input processing unit 14, and is transferred as an operation command to the CPU 11. The CPU 11 performs necessary calculations and controls so that operations as devices responding to inputted operation commands can be attained.

For example, a liquid crystal display or the like is connected as the display device, to display various information. When the CPU 11 supplies a display processing unit 16 with display information in accordance with various operation states, input states, and communication states, the display processing unit 16 then makes the display device 17 execute display operations, based on the supplied display information. For example, the display device 17 displays the contents of related information provided from a server or the like, or the contents of clipped information. If a song is searched for via the network 30, the search result is displayed on the display device 17.

Media drives 19*a* and 19*b* are drives each capable of recording/reproducing (only reproducing in some recording media) contents such as songs recorded on a portable recording medium. Note that the type of recording media which are recordable or reproducible by each of the media drives 19*a* and 19*b* is not limited to one type. That is, it is possible to record/reproduce data on/from plural types of recording media. For example, the media drive 19*a* serves to reproduce contents from CDs and DVDs while the media drive 19*b* may record/reproduce contents on/from MDs.

Portable type recording media for recording contents such as songs and the like should not be limited to optical recording media such as CDs and DVDs. For example, contents may be stored into a recording medium constituted by a semiconductor memory, like a flash memory. In this case, a reader/writer for the flash memory is connected to the bus 12.

The user inserts recording media (CD, DVD, MD, or the like) on which arbitrary contents have been recorded, into the media drives 19*a* and 19*b*, and makes a predetermined operation on the remote controller 40. Then, the user can enjoy songs and the like. For example, when the user operates the remote controller 40 to give an instruction for reproduction from the media drive 19*a*, the CPU 11 instructs the media drive 19*a* to reproduce a content. In response, the media drive 19*a* accesses the inserted recording medium for the instructed content, and reads out the content.

If the content thus read is an audio content, the content is subjected to a decode processing and the like by the CPU 11, if necessary, and then transferred to an audio data processing unit 24. The audio data processing unit 24 performs processing such as a sound-field processing by equalizing, volume control, D/A conversion, amplification, and the like. Then, sounds are outputted from a loudspeaker unit 25. Note that the loudspeaker unit 25 is constituted by plural loudspeakers 25*a* and 25*b* as shown in FIG. 4, and can output stereo sounds.

Contents reproduced by the media drives 19*a* and 19*b* can be stored as audio data files in the HDD 21 under control by the CPU 11. The format of the audio data files may be of digital audio data according to 16-bit quantization at a sampling frequency 44.1 KHz, which corresponds to the CD format. Alternatively, to save the volume of the HDD 21, the format may be of compressed audio data which is subjected to a compression processing according to a predetermined method. Although the compression method is not specifically limited, it is possible to use the ATRAC (Advanced TRansform Acoustic Coding: trademark) method, MP3 (MPEG Audio Layer-3) method, or the like.

The tuner 27 is, for example, an AM/FM radio tuner and demodulates broadcast signals received by the antenna 26, based on control by the CPU 11. Of course, the tuner 27 may alternatively be a television tuner, satellite broadcast tuner, or digital broadcast tuner. Demodulated broadcast audio signals are subjected to necessary processing by the audio data processing unit 24 and outputted as broadcasted sounds from the loudspeaker unit 25.

A communication processing unit 22 performs an encode processing on transmission data as well as a decode processing on reception data, based on control by the CPU 11. The network interface 23 transmits the transmission data encoded by the communication processing unit 22, to a predetermined external network-compatible device via the network 30. Also, the network interface 23 transfers signals transmitted from the external network-compatible device via the network 30, to the communication processing unit 22. The communication processing unit 22 transfers the received information to the CPU 11. Information received via the network 30 may be, for example, related information of programs being FM-broadcasted, information of songs included in titles of CDs, and the like.

An infrared communication unit 28 communicates with the remote controller 40 via a wireless communication means such as infrared rays. Further, the infrared communication unit 28 performs a predetermined processing on signals supplied from the remote controller 40, and feeds the signals as operation commands to the CPU 11. The CPU 11 performs necessary calculations and controls to attain operations as devices which respond to inputted operation commands.

The configuration of the terminal device 10 is not limited to that shown in FIG. 5 but may further be varied. For example, interfaces to peripheral devices can be added according to communication methods such as USB (Universal Serial Bus), IEEE 1394, Bluetooth (R), and the like. The HDD 21 can store audio contents downloaded via the network 30 through the network interface 23 described above and audio contents transferred through an interface according to the USB, IEEE 1394, or the like. In addition, there can be provided terminals for connection to a microphone, external headphones, and the like, a video output terminal corresponding to DVD playback, a line connection terminal, an optical digital connection terminal, and the like. Further, a PCMCIA slot, a memory card slot, or the like may be provided to enable data exchange with external information processing devices and audio devices.

Next, a description will be made of the configuration of program modules in the system of the present embodiment. Note that the program modules are information which describes processing to be executed by the terminal device 10, which can perform predetermined functions based on the program modules. In the following description, the functions realized by executing the program modules will be referred to by the names of the program modules.

Figure 6:
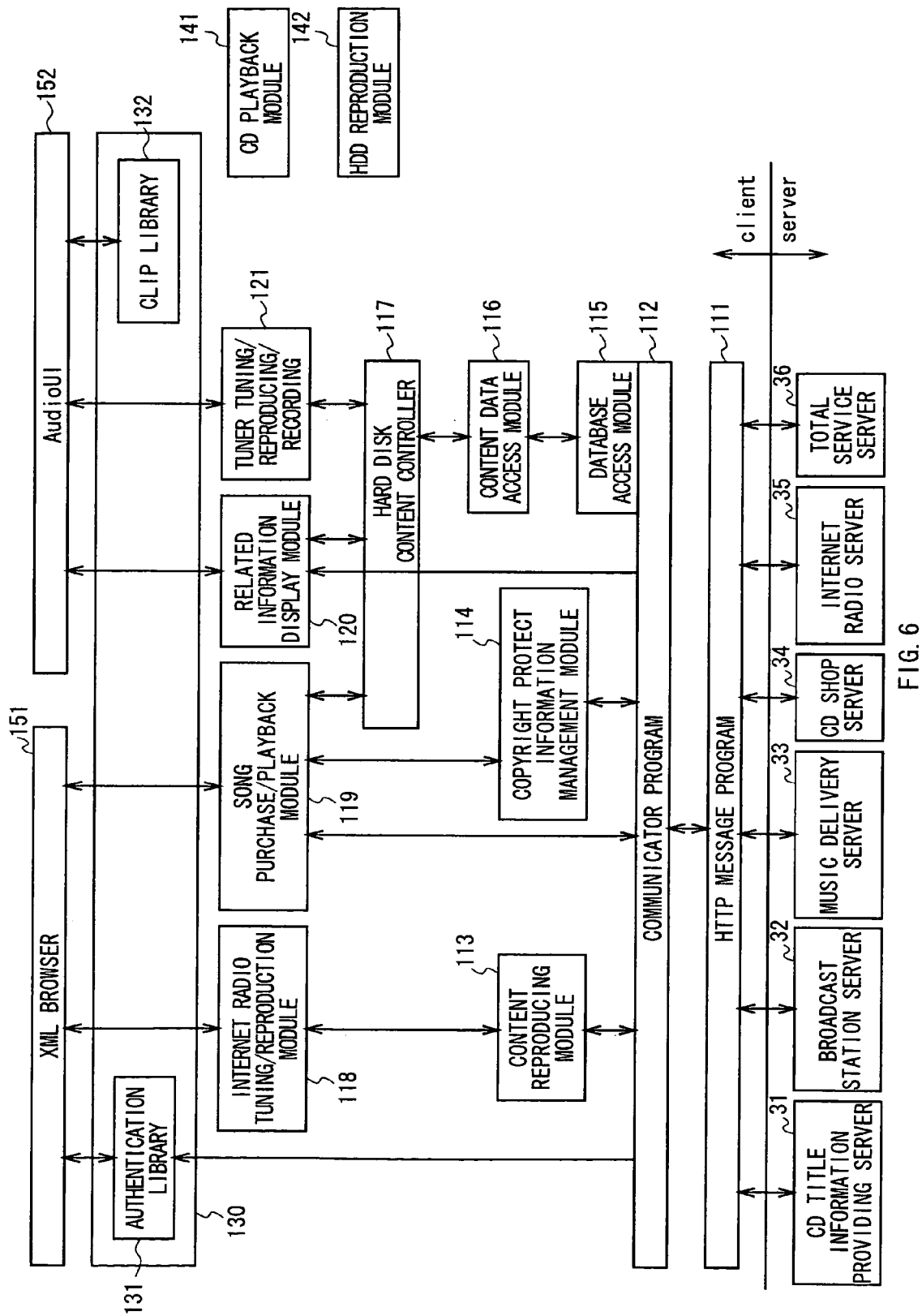
FIG. 6 is a diagram showing the program module configuration of the terminal device.

FIG. 6 is a diagram showing the configuration of the program modules. The program modules of the terminal device 10 are constructed to operate on the OS. The terminal device 10 can communicate with the CD title information providing server 31, broadcast station server 32, music providing server 33, CD shop server 34 which sells CDs, total service server 36, internet radio server 35, and other various servers, due to the functions of the program modules.

An HTTP (Hyper Text Transfer Protocol) message program 111 achieves various transactions between various servers including the CD title information providing server 31, broadcast station server 32, CD shop server 34, total service server 36, and the like by HTTP communication. A communicator program 112 is a communication module which enables various communication with the total service server 36 and the like.

Provided in the higher-level side of the communicator program 112 (a function close to the user interface) are a content reproducing module 113 which interprets CODECs of contents to reproduce the contents, and a copyright protect information management module 114 which deals with information concerning copyright protection. In the higher-level side of the content reproducing module 113, there is provided an internet radio tuning/reproducing module 118 which performs tuning and reproducing of internet radio broadcast. A song purchase/reproducing module 119 which manages purchase of songs and playback of demo songs is provided in the higher-level side of the copyright protect information management module 114.

An XML (extensible Markup Language) browser 151 is provided in the higher-level side of the internet radio tuning/reproducing module 118 and the song purchase/playback module 119. The XML browser 151 interprets the contents of XML files sent from various servers and displays the contents on the screen of the display device 17. When the terminal device 10 is in a total service utilization mode, the contents of inputs made on the terminal device 10 by the user are interpreted by the XML browser 151. Further, processing requests and the like corresponding to the contents of the inputs are sent to other modules from the XML browser 151. For example, a song selected by a user through the XML browser 151 is purchased by the song purchase/playback module 119, and is written into the HDD 21 through the hard disc content controller 117.

The communicator program 112 is connected to an authentication library 131 of a library 130. The authentication library 131 performs a processing for authenticating the total service server 36 and other various servers.

Further, in the higher-level side of the communicator program 112, there are provided a database access module 115, a content data access module 116, and a hard disc content controller 117. The database access module 115 accesses various databases constructed in the HDD 21. The content data access module 116 accesses contents stored in the HDD 21. The hard disc content controller 117 manages contents stored in the HDD 21.

In the higher-level side of the hard disc content controller 117, there are provided a related-information display module 120, tuner tuning/reproducing/recording module 121, and song purchase/playback module 119. The related-information display module 120 displays titles and artist names of songs broadcasted by the broadcast station 37, on the display device 17. The tuner tuning/reproducing/recording module 121 selects the broadcast station 37 and records contents of songs received from the broadcast station 37 into the HDD 21.

For example, a song received from the broadcast station 37 through the audio user interface (Audio UI) 152 is written into the HDD 21 through a content data access module 116.

The related-information display module 120 receives the title and/or artist name of a song being currently broadcasted from the broadcast station 37, as related information from the CD title information providing server 31, the broadcast station server 32, or the like through the tuner tuning/reproducing/recording module 121 via the HTTP message program 111. The module 120 then displays the related information on the display device 17 through the audio user interface 152.

Note that the related information displayed on the display device 17 through the audio user interface 152 can be temporarily stored into the clip library 132 of the library 130. Also, the related information can be finally stored into the HDD 21 through the database access module 115 in accordance with a user's instruction.

Further, program modules included in the terminal device 10 are a CD playback module 141 and an HDD reproducing module 142 for reproducing data from the HDD 21. Reproduced results are outputted through the audio data processing unit 24 and the loudspeaker unit 25.

In the terminal device 10 constructed as described above, related information can be obtained from a server and the related information can be clipped. If an identification code is sent at the same time when the related information is obtained, the identification code is stored into the terminal device 10, and a special service can be received when purchasing song data or the like.

Figure 7:
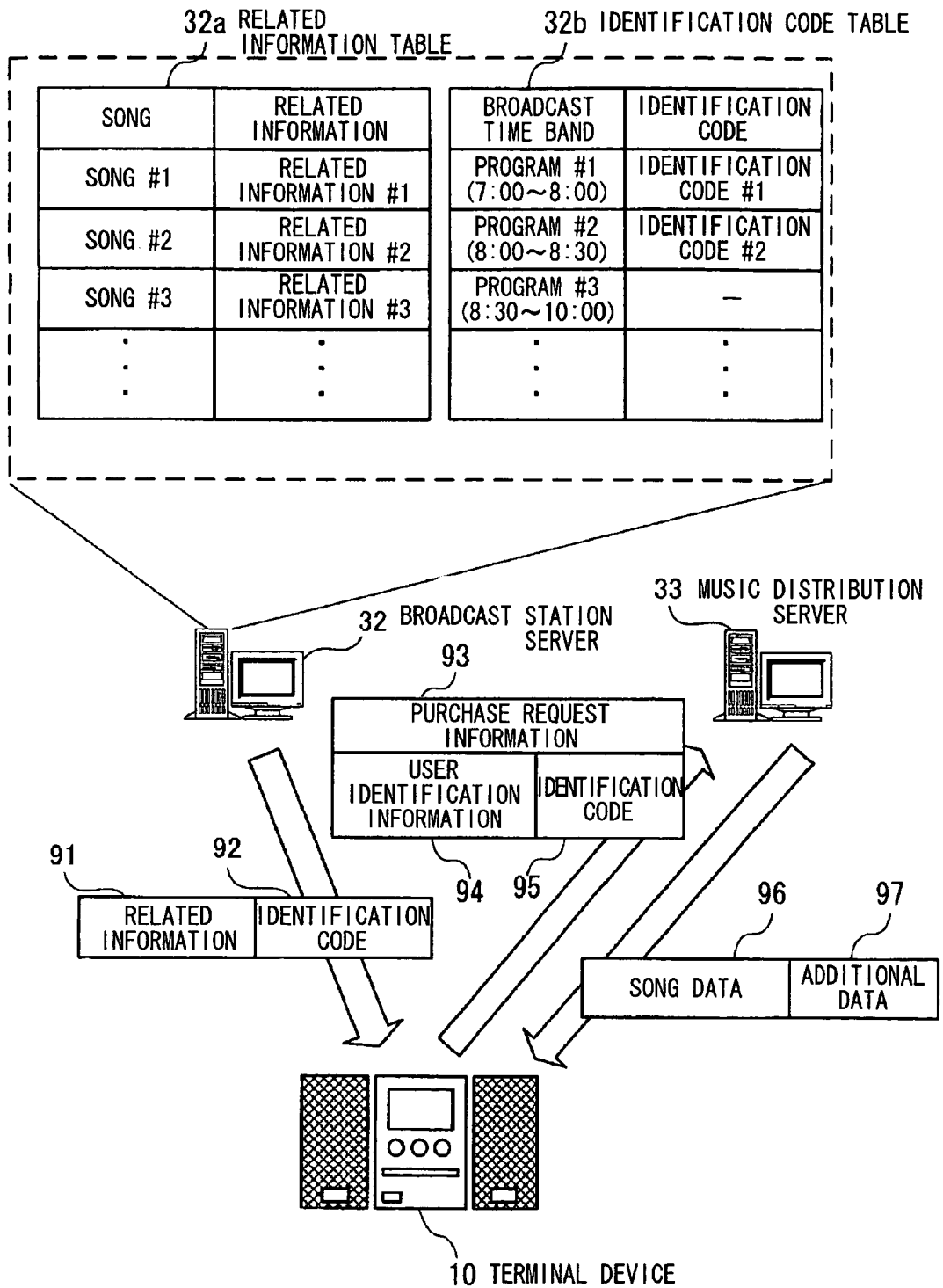
FIG. 7 is a view showing an example of obtaining a special service based on an identification code.

FIG. 7 shows an example of obtaining a special service based on an identification code. In this example, the terminal device 10 receives an identification code 92 added to related information 91 of a broadcasted song from the broadcast station server 32, and a content of song data is purchased with use of the identification code 92.

More specifically, a related information table 32a and an identification code table 32b are prepared in advance in the broadcast station server 32. The related information table 32a registers related information concerning songs to be broadcasted.

Identification codes for individual broadcast time bands are registered in the identification code table 32b. Identification codes are codes necessary to receive special services. The broadcast time bands are separated, for example, in units of programs.

The identification code of each program indicates, for example, rights to receive special services (such as discount or the like) provided by sponsor companies of the program. In the example of FIG. 7, identification codes are registered respectively for the programs. However, identification codes may respectively be registered in units of songs.

There is a time band having no identification code registered. That is, identification codes are registered only with respect to broadcast time bands of those programs for which any services are provided from sponsor companies. Even if related information of a song broadcasted in a time band having no registered identification code, no identification code is provided for the terminal device 10.

In a program assigned to an identification code 92, for example, the broadcast station 37 announces that some special service can be provided upon obtaining related information. Hence, only the users who have listened to the program can know the special service, and the identification code 92 for special service can be received through the terminal device 10.

The identification code 92 (identification code 95) can be separately assigned to whatever song is broadcasted in a specific time band from a specific broadcast station. In this case, if the same song is broadcasted at different times, different identification codes are given.

Alternatively, identification codes may be assigned to songs, individually. In this case, a common identification code may be assigned to plural songs.

The terminal device 10 carries out polling at constant intervals and issues a request for obtaining related information 91 of a song being broadcasted, to the broadcast station server 32. The broadcast station server 32 transmits the related information 91 of the currently broadcasted song and an identification code 92 assigned to the current time band, to the terminal device 10.

The terminal device 10 displays the received related information 91 on the display device 17. If the user gives an operation input to instruct clipping, the terminal device 10 stores the combination of the received related information 91 and identification code 92 into the HDD 21 or the like.

Thereafter, the user operates the terminal device 10 to access the music distribution server 33, and transmits a purchase request information 93 to purchase song data. The purchase request information 93 includes information (e.g., related information for specifying a song) which specifies the item to be purchased. The purchase request information 93 is added with user identification information 94 and an identification code 95. The user identification information 94 and the identification code 95 need not be transmitted concurrently. The user identification information 94 may be transmitted first to carry out user authentication, and then, the identification code 95 may be transmitted together with the purchase request information 93.

The music distribution server 33 which has received the purchase request information 93 transmits song data 96 and the additional data 97 corresponding to the identification code 95, to the terminal device 10. The additional data 97 contains, for example, an instruction to delete an identification code recorded in the terminal device 10, and an additional service such as a bonus track.

Next, a description will be made of a clip processing procedure to clip related information of a song broadcasted in a program from the broadcast station 37. In the present embodiment, related information of songs to be broadcasted is provided by the broadcast station server 32. It is possible to provide separately a related information providing server which is requested from plural broadcast stations to undertake services of providing program information of the broadcast stations.

Figure 8:
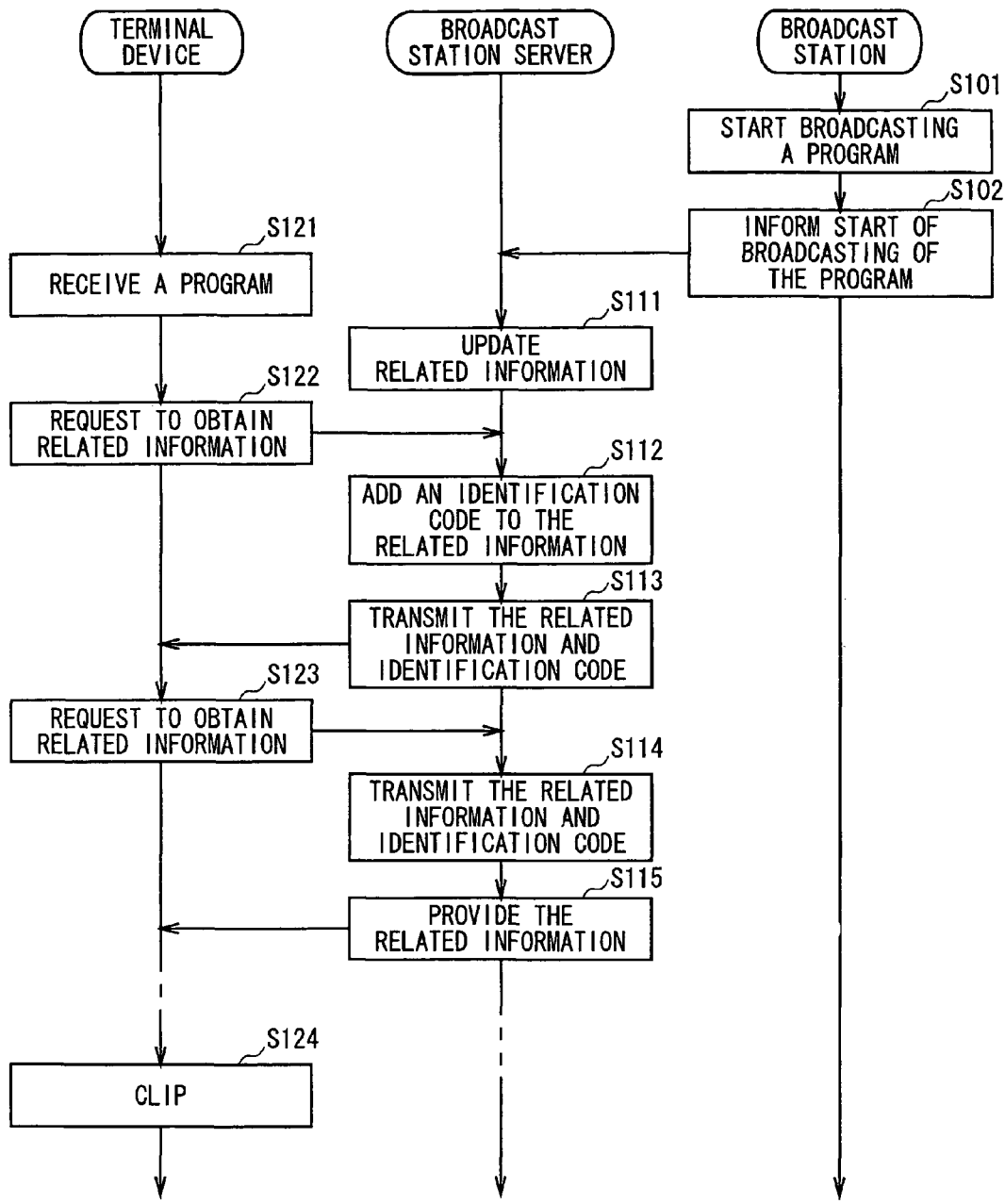
FIG. 8 is a sequence chart showing a procedure of clipping concerning related information of a song being currently broadcasted.

FIG. 8 is a sequence chart showing clipping procedures concerning related information of a song being broadcasted. The broadcast station 37 broadcasts sequentially programs in accordance with a program broadcast schedule. The processing shown in FIG. 8 will be described in the order of numbers of steps.

[Step S101] The broadcast station 37 starts broadcasting a program.

[Step S102] Upon reception of a notification of the start of the program, the start of the broadcast of the song is notified to the broadcast station server 32 from the broadcast station 37. This notification may be transferred automatically from a broadcast equipment of the broadcast station 37 to the broadcast station server 32 or a staff of the broadcast station server 37 may take an operation input.

[Step S111] The broadcast station server 32 stores related information related to titles of plural kinds of songs, artist names thereof, names of CDs containing the songs, CD numbers thereof, and the like, in form of a database in an HDD. Further, in order that the related information of the song notified this time from the broadcast station 37 should be prepared as an item to be provided for the terminal device 10, the broadcast station server 32 updates related information maintained as an item to be provided as a service, to the related information of the song notified this time. Then, the procedure goes to the next step S112.

[Step S121] The terminal device 10 receives the program broadcasted in the step S101 from the broadcast station 37 and makes the user, for example, listen to the program. The terminal device 10 also receives a song broadcasted in the program and makes the user, for example, listen to the song. Then, the procedure goes to the next step S122.

[Step S122] The terminal device 10 transmits a request for obtaining related information such as a title and artist name concerning the song being broadcasted, at constant time intervals (e.g., 30 seconds), to the broadcast station server 32. That is, the terminal device 10 performs poling to obtain related information of the song being received. Further, the processing of the terminal device 10 goes to the next step S123.

[Step S112] At this time, the broadcast station server 32 adds an identification code to the related information of the song maintained at present as an item to be provided, in response to the obtaining request from the terminal device 10. The identification code is an identification code set in correspondence with the current time band.

[Step S113] The broadcast station server 32 provides the related information and identification code to the terminal device 10 through the network 30, in response to the request from the terminal device 10 (step S122). Further, the processing of the broadcast station server 32 goes to the next step S114.

Thereafter, the terminal device 10 receives the related information and identification code of the song being broadcasted, and so can display the contents of the related information on the display device 17. As a result, it is possible to make the user recognize song information such as the title, artist name, and the like of the song broadcasted in the program, as related information.

The related information in the present embodiment contains a CD number, broadcast station identification information for specifying the broadcast station 37 as a supplier who broadcasted the song, and media identification information for specifying the recording medium which contains the song, in addition to the title and the artist name.

[Step S123] The terminal device 10 requests again related information to the broadcast station server 32 when 30 seconds passes from the previous obtaining request.

[Step S114] In response to this obtaining request, the broadcast station server 32 provides again the related information and identification code of the song, to the terminal device 10 through the network 30.

The terminal device 10 obtains the related information of the same song until before the related information of the song which the broadcast station server 32 maintains as the item to be provided at present is updated to related information of another song to be broadcasted next. Therefore, the display device 17 keeps displaying the related information of the same song until the related information provided by the broadcast station server 32 is updated.

[Step S124] Thereafter, the terminal device 10 can clip the related information of the song provided from the broadcast station server 32. If the terminal device 10 clips the information, the terminal device 10 can obtain, subsequently to the related information of this song, related information of another song from the broadcast station server 32. The terminal device 10 can also clip the related information of the another song. A database is constructed by clipped related information in the HDD 21 of the terminal device 10.

FIG. 9 is a table showing an example of data structure of related information. The related information 50 includes data items of song title, artist name, clip time, CD number, clip location, and the like. Various data concerning a song are set as contents corresponding to the data items.

The song title is the name of the song, and is data included in related information sent from a server.

The artist name is the name of the artist who plays the song, and is data also included in related information sent from a server.

The clip time indicates the time when the terminal device 10 executed the clip processing, and the time counted by an internal clock is set when the clip processing was executed.

The CD number is the identification number of the CD which contains the song, and is information included in related information sent from a server. The CD number is an identification number which CD shops use to specify a CD. At present, CD numbers are divided into two types of systems. Which of the types of number systems is used depends on CD shops. Hence, information for identifying the code system used by the server which provides related information may be included in the related information.

The clip location is data indicative of the place where the content (source) corresponding to the clipped related information exists. For example, in case where related information of a song recorded on an MD is obtained from a server and clipped while playing the song, "MD" is set as the clip location.

In the example shown in FIG. 9, the song title is "Rainy, after fair", the artist name is "Falcons", the clip time is "2003/ 3/8 19:20" (19:20, Mar. 8, 2003), the CD number is "01234567" and the clip location is "MD".

The items vary depending on the types of clips, and the items of clips can be changed depending on the purposes.

FIG. 10 is a table showing an example of data structure of an identification code stored by clipping. The identification code 70 (92, 95) includes information such as an issuer, purpose, available partner, validity period, code ID, and the like.

The issuer is the name of the broadcast station who issued the identification code 70.

The purpose indicates a service by which a special service can be received with use of the identification code 70.

The available partner is the name of the company or the like who practices the service of providing the special service for the user having the identification code 70.

The validity period indicates the last date when the special service can be received with use of the identification code 70. The validity period may be added to related information 50 or not.

The code ID is identification information for uniquely identifying the issued code.

The terminal device 10 stores plural combinations each consisting of related information and an identification code of a song.

Related information added with an identification code can be stored in form of a tree structure.

Next, the storage format of clipped related information will be described.

Figure 11:
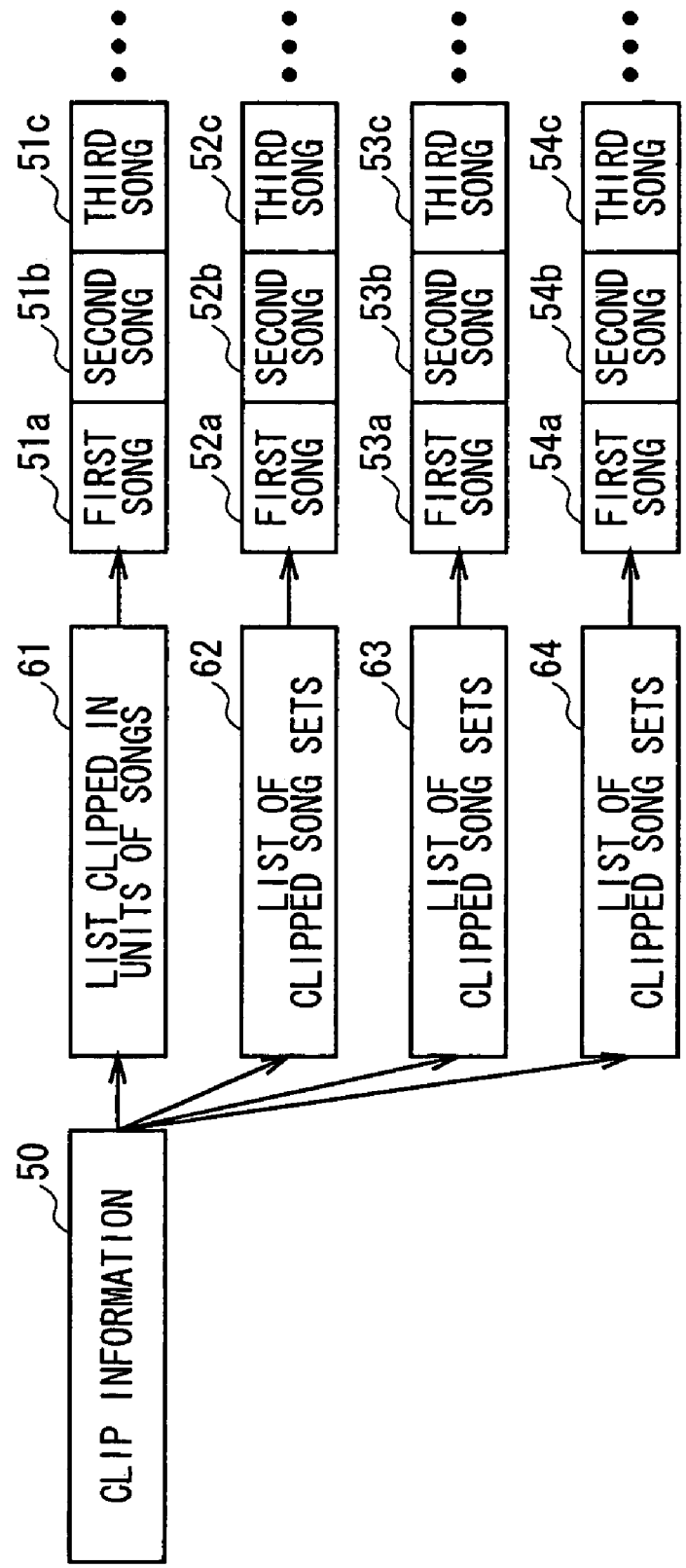
FIG. 11 is a diagram showing a storage format of clipped related information.

FIG. 11 is a diagram showing the storage format of clipped related information. Clipped related information (clipped information) 50 is stored in form of lists. A kind of list is a list 61 in which information is clipped in units of songs. Each of lists 62 to 64 is of another kind in which information is clipped in units of sets of songs. There is provided only one list of the former kind in which information is clipped in units of songs. Plural lists of the latter kind which clips information in units of sets of songs may be provided.

The list 61 which clips information in units of songs means a storage place (such as a folder or directory) of related information obtained by specifying songs individually. Each of the lists 62 to 64 of clipped sets of songs means a storage place (such as a folder or directory) when a set of songs are obtained at once together.

The clipped song-set lists 62 to 64 are given appropriate names suited to the song sets. For example, if related information concerning plural songs in a CD is stored, the title of the CD is set as the name of the song-set list of the set of clipped songs. Alternatively, if related information concerning a set of songs broadcasted in a program of FM broadcast is stored, the title of the program or the broadcasted date/time is set as the name of the song-set list of clipped songs. Also alternatively, if a set of songs detected by a search through the network 30 are stored, a search key or search date/time is set as the name of the song-set list of the clipped songs. Thus, there are various names depending on the kinds of song sets.

Each list is related to clipped related information. The list 61 in which information is clipped in units of songs is linked to the related information 51a of the first song, related information 51b of the second song, and related information 51c of the third song. The list 62 of a clipped set of songs is linked to the related information 52a of the first song, related information 52b of the second song, and related information 52c of the third song. The list 63 of a clipped set of songs is linked to the related information 53a of the first song, related information 53b of the second song, and related information 53c of the third song. The list 64 of a clipped set of songs is linked to the related information 54a of the first song, related information 54b of the second song, and related information 54c of the third song.

When newly obtained related information 50 is stored, the list to be linked is determined depending on whether the related information 50 is obtained in units of songs or as a set of songs. If the related information is obtained in units of songs, the related information 50 is linked to the end of the list 61 of information clipped in units of songs. If the related information is obtained as a set of songs, a new list of song set is created, and the related information 50 is linked to the new song-set list.

Each of the lists 62 to 63 of clipped song sets may be a set of songs, a list of songs (on-air list) broadcasted on FM broadcast, an album, a play list, or a set of songs obtained as a search result or the like. By thus adopting a storage format, data clipped as sources such as a single song, a set of various songs can be treated uniformly (reproduction form CD, MD, HDD, TV, reception of distributed music, browsing of related information).

Thus, when song data is purchased from the music distribution server 33 with use of stored related information and an identification code, a special service corresponding to the identification code can be received by the terminal device 10.

Figure 12:
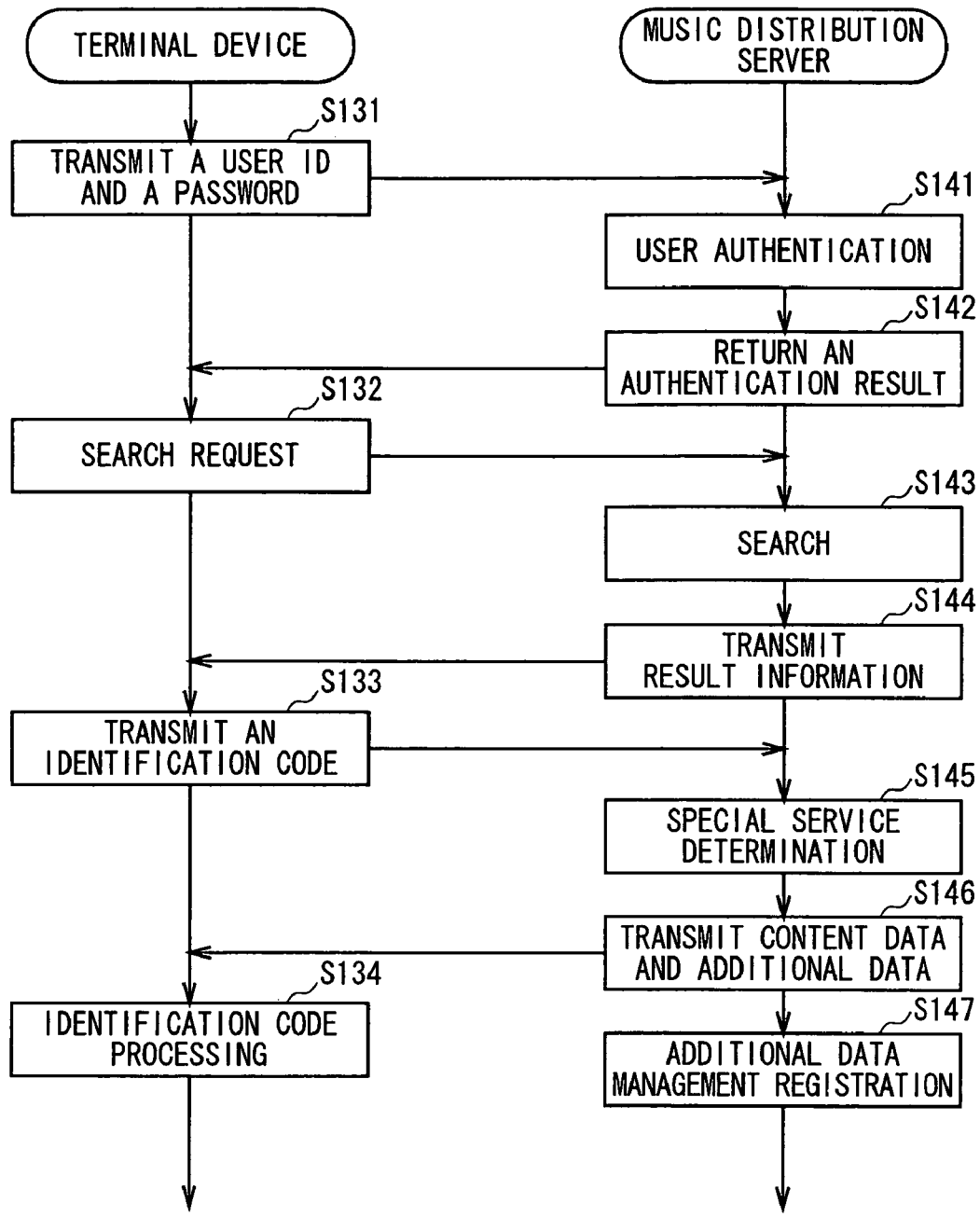
FIG. 12 is a sequence chart showing a procedure of purchasing song data.

FIG. 12 is a sequence chart showing a song data purchase procedure. The processing shown in FIG. 12 will now be described in the order of step numbers.

[Step S131] At first, a terminal device 10 transmits a user ID and a password, as user authentication information, to the music distribution server 33. At this time, a nickname set in the terminal device 10 may be transmitted to the music distribution server 33.

The nickname is a name set for identifying individual terminal devices when a user uses plural terminal devices. Different nicknames are set respectively for plural terminal devices which one single user uses.

When a user who purchased a new terminal device receives a service of obtaining related information or the like for the first time, the user sets a nickname for the terminal device. A server accessed from the terminal device checks if the nickname thus set disagrees with names of other terminal devices which the same user possesses. The server then allows the terminal device to register the set nickname.

[Step S141] The music distribution server 33 performs user authentication, based on the user ID and password.

[Step S142] The music distribution server 33 replies to the terminal device 10 with a result of the authentication processing.

[Step S132] In response to the reply, the terminal device 10 confirms that the user authentication was successful, and thereafter, transmits a search request to the music distribution server 33 in response to an operation input from the user. Note that part of data in the clipped related information (e.g., a CD number or the like) can be used as a search key included in the search request.

Not only the search based on clipped related information but also related information obtained by the now-on-air function before clipping or related information obtained from an on-air list can be directly used for the search without clipping.

[Step S143] The music distribution server 33 searches a database concerning song data in response to the search request.

[Step S144] The music distribution server 33 transmits search result information including information which the search has hit, to the terminal device 10.

[Step S133] The user makes an operation to purchase song data, based on the search result information from the music distribution server 33. In response, the terminal device 10 transmits an identification code stored in advance, together with purchase request information requesting purchase of the song data, to the music distribution server 33. For example, the terminal device 10 transmits an identification code corresponding to arbitrary related information. Alternatively, the terminal device 10 may transmit plural identification codes which allow reception of special services from the music distribution server 33, to the music distribution server 33. Whether or not the special services can be received from the music distribution server 33 can determined with reference to the column of "available partner" in the identification code.

Alternatively, all the identification codes stored in the terminal device 10 may be transmitted to the music distribution server 33. In this case, the music distribution server 33 selects usable identification codes and determines special services.

Transmission of the identification codes may be performed in response to an operation input from the user or automatically. For example, if only one item of music data is detected as a result of the search based on a CD number, an identification code may be transmitted automatically.

[Step S145] If an identification code is valid, the music distribution server 33 determines the contents of the special service corresponding to the identification code. The contents of the special service is discount of the sales price of music data, providing of additional contents, or the like. In addition, the music distribution server 33 manages how many times one user can use one identification code (the number of allowable uses). Unless the number of allowable uses is exceeded, the music distribution server 33 gives the special service. The music distribution server 33 refers to the information of the validity period in the identification code. If the validity period has not expired, the music distribution server 33 gives the special service.

[Step S146] The music distribution server 33 transmits content data and additional data. If a bonus track is granted as a special service, the bonus track is included in the additional data. Also, an instruction concerning management of the identification code in the terminal device 10 can be included in the additional data.

[Step S147] Thereafter, the music distribution server 33 manages, in units of users, additional data provided for the users. For example, exercise information for a special service based on an identification code can be stored in the music distribution server 33, linked to a user ID or an ID (nickname) specific to a terminal device 10. In this manner, exercise of special services by a specific user or terminal device 10 can be controlled.

[Step S134] The terminal device 10 processes the identification code in correspondence with the contents of additional data. For example, information indicating whether a corresponding identification code in a terminal device 10 should be invalidated or not is given as additional data from the music distribution server 33. In this case, the terminal device 10 performs a processing corresponding to the information.

Another processing of an identification code than the invalidation of an identification code will be a processing by which the number of times a special service can be received is reduced by a specified number of times. Alternatively, an identification code can be set in a previous state before a special service is received.

Thus, the user can receive a special service based on an identification code. In addition, different identification codes are provided respectively for time bands of programs or the like. Therefore, if an identification code is sent to a user who has received related information during broadcasting of a program, a special service which is valid for only the listeners/watchers of the program can be given. In this manner, it is possible to raise the audience rating of the program.

In addition, a validity period is set in each identification code, so that the period of the service can be limited.

Further, when using an identification code, user authentication is carried out in advance, so that user identification information (a user ID and/or password) is transmitted in advance to the music distribution server 33. Therefore, the music distribution server 33 can manage the state showing how a special service based on an identification code is provided, for every user. For example, it is possible to manage how many times a user used an identification code. Therefore, the music distribution server 33 can perform such a management that inhibits a special service from being given when the number of uses exceeds a limitation.

The server which provides a service with a special service for users is not limited to the music distribution server 33. For example, the CD shop server 34 can give a special service (discount or the like) corresponding to an identification code in sales of CDs. A purchase procedure taken from the terminal device 10 with respect to the CD shop server 34 is nearly the same as the processing shown in FIG. 12. However, the transmission of content data (song data) in the step S146 is not carried out by the CD shop server 34. In place of this transmission, the CD shop server 34 records the contents of an order for a CD from the user of the terminal device 10, and a shop assistant or the like of the CD shop ships a corresponding CD to the user.

Alternatively, an identification code may be recorded on a portable recording medium. When the recording medium is brought to a shop, a special service can be received from the shop upon purchase of a corresponding CD.

Figure 13:
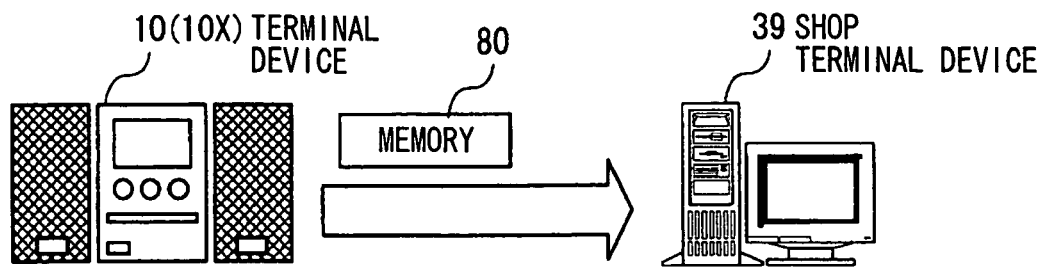
FIG. 13 is a view showing a purchase procedure in a shop.

FIG. 13 shows a purchase procedure at a shop. The user records an identification code stored in the terminal device 10, onto a portable recording medium. For example, the user records the code on a semiconductor memory 80. The memory 80 is, for example, a flash memory.

The user carries the memory 80 into which the identification code has been written, to a CD shop or the like. When the user buys a CD or the like which grants a special service upon the identification code, the user passes the memory 80 to a shop attendant.

The shop attendant uses a shop terminal device 39 installed in the shop, to read the identification code from the memory 80. Then, a special service corresponding to the identification code is given when a CD or the like is sold to the user.

The hardware configuration of the shop terminal device 39 can be realized by the same hardware configuration of the terminal device 10 shown in FIG. 5. However, a reader/writer for the memory 80 is necessary for a media drive. In addition, the shop terminal device 39 need not have the tuner 27 and the infrared communication unit 28.

Figure 14:
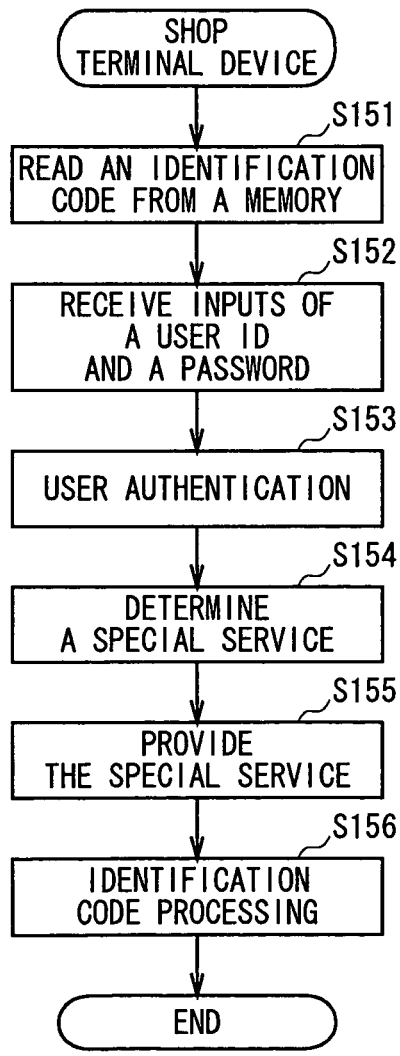
FIG. 14 is a flowchart showing a processing procedure in a shop terminal device.

FIG. 14 is a flowchart showing a processing procedure in the shop terminal device. The processing shown in FIG. 14 will now be described in the order of the step numbers.

[Step S151] The shop terminal device 39 reads an identification code form the memory 80 after the memory 80 is inserted.

[Step S152] The shop terminal device 39 receives inputs of the user ID and password from the user.

[Step S153] The shop terminal device 39 performs user authentication. The user authentication, however, may be entrusted to another server connected through the network 30. For example, the shop terminal device 39 transmits user identification information (e.g., a user ID and a password) inputted by a user, to a server (e.g., a CD shop server 34) connected through the network 30. The server then carries out an authentication processing and returns an authentication result to the shop terminal device 39.

[Step S154] If the user authentication is successful, the shop terminal device 39 determines a special service corresponding to the identification code.

[Step S155] The shop terminal device 39 provides the special service corresponding to sales of a CD. For example, if the special service is provision of an additional content, the shop terminal device 39 writes the additional content into the memory 80. Alternatively, if the special service is a discount of the sales price, the shop terminal device 39 performs a discount processing for discounting the sales price of a CD in cooperation with a terminal function such as POS (Point of Sale).

[Step S156] The shop terminal device 39 performs an identification code processing like in the case of purchase in EMD or EC.

In this manner, special services can be received at shops although it has been impossible to provide those services at shops. In case where clipping is carried out by a portable terminal device, another measure can be considered as follows. Specifically, a device capable of displaying a clipped identification code may be incorporated, and the clipped identification code may be displayed at a shop. Then, special services can be received at shops when CDs are purchased at CD shops.

As has been described above, according to the present embodiment, various special services (all of special services such as discount, an additional bonus track, mailing of an amenity, and the like) can be received if a tuner capable of receiving broadcasts is used and related information concerning broadcasted contents (now-on-air) or related information concerning contents of specific programs or time bands (a on-air list) are stored (clipped). As a result of this, those various special services can be set in more details by linking the now-on-air or on-air list of FM, the music distribution service, and sales of CDs with each other.

For service providers who provide contents, there is a merit that the music market can be activated. For users, there is a merit that various special services can be received by obtaining related information such as now-on-air or the like.

Examples of application of the present invention are not limited to a case that a special service is provided when one identification code is obtained. There can be a case that a special service is provided only when plural identification codes are collected. In a method of collecting plural identification codes, all identification codes that have been clipped and obtained may be posted to a server. In this case, the server counts the number of valid identification codes to determine the contents of special services.

In case where plural identification codes are recorded in a memory and are used at a CD-shop, for example, a shop terminal device can count the number of identification codes usable at the shop and display the number.

The processing and functions as described above can be realized by a server computer and a client computer. In this case, there are provided a server program which describes the contents of processing of the functions which each server should have, and a client program which describes the contents of processing of the functions which the terminal device should have. The server program is executed by a server computer so that the processing and functions of the server are realized by the server computer. Likewise, the client program is executed by a client computer so that the processing and functions of the terminal device are realized by the client computer.

The server program and client program which thus describe the contents of processing can be recorded on a recording medium readable from computers. Computer-readable recording media are a magnetic recording device, optical disc, magneto-optical recording medium, semiconductor memory, and the like. The magnetic recording device is a hard disc drive (HDD), flexible disc (FD), magnetic tape, or the like. The optical disc is, for example, a DVD, DVD-RAM, CD-ROM, CD-R (Recordable)/RW (Rewritable), or the like. The magneto-optical recording medium is, for example, an MO (Magneto-Optical disc) or the like.

In case of distributing the server program or the client program, portable recording media such as DVDs, CD-ROMs, and the like which records the programs are sold. Alternatively, the client program is once stored in a storage device of a server computer, and the client program may be transferred to client computers from the server computer through a network.

The server computer which executes the server program stores the server program recorded on a portable recording medium, for example, into a storage device of the server computer's own. Then, the server computer reads the server program from its own storage device, and executes processings according to the server program. The server computer can read the server program directly from the portable recording medium and execute processing according to the server program.

The client computer which executes the client program stores, for example, the client program recorded on a portable recording medium or transferred from the server computer, into a storage device of the client computer's own. Then, the client computer reads the client program from its own storage device and executes processing according to the client program. Alternatively, the client computer can read the client program directly from the portable recording medium and execute processing according to the client program. Also alternatively, every time when the client program is transferred from the server computer, the client computer can execute processing according to the client program received.

(2) Second Embodiment

Figure 15:
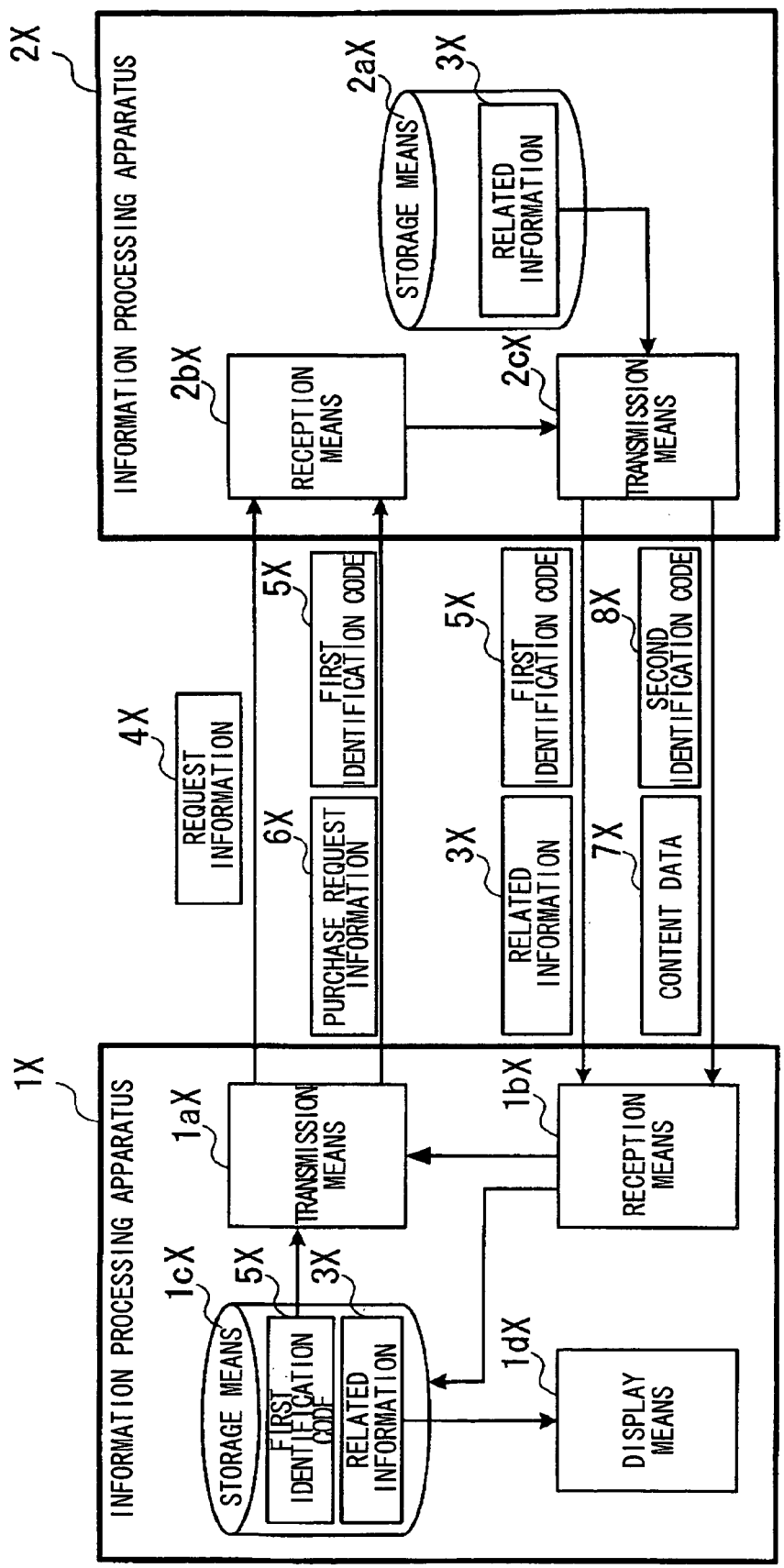
FIG. 15 is a conceptual view applied to the second embodiment of the present invention.

FIG. 15 is a view for explaining principles of the present invention. The outline of the second embodiment will now be described with reference to FIG. 15.

FIG. 15 shows the case where the present invention is applied to a special service grant system for granting special services to users who receive contents such as songs through broadcasting programs.

The special service grant system is constituted by an information processing apparatuses 1X and 2X. Suppose that the information processing apparatuses 1X and 2X are connected through a network, e.g., the Internet or the like. The information processing apparatus 1X is constituted by a transmission means 1aX, reception means 1bX, storage means 1cX, and display means 1dX, and has a function as a client. The information processing apparatus 2X is constituted by a storage means 2aX, reception means 2bX, and transmission means 2cX, and has a function as a server which provides services upon requests from the information processing apparatus 1X as a client.

In this special service grant system, the information processing apparatus 1X receives related information 3X concerning contents in a broadcasting program through a network from the information processing apparatus 2X. The related information 3X is stored in the storage means 2aX in the information processing apparatus 2X and is updated as the contents vary. The information processing apparatus 1X of this kind and the information processing apparatus 2X interact with each other, to grant a specific service to a user who once purchased a content, upon further purchase of a content. This processing will now be described.

At first, the information processing apparatus 1X continuously transmits, at a specific interval, request information 4X for requesting related information 3X concerning a content in broadcast program being received, from the transmission means 1aX. The information processing apparatus 2X receives the request information 4X transmitted from the information processing apparatus 1X, by the receiving means 2bX.

The receiving means 2bX then extracts the related information 3X corresponding to the request information 4X from the storage means 2aX, and sends the information to the transmission means 2cX. On the other side, the information processing apparatus 2X already issued a first identification code 5X indicative of the right for receiving a specific service, when the user purchased an arbitrary content. The transmitter means 2cX transmits the first identification code 5X, together, with the related information 3X extracted from the storage means 2aX, to the information processing apparatus 1X.

The information processing apparatus 1X receives the related information 3X transmitted by the information processing apparatus 2X and the first identification code 5X, by the receiving means 1bX, and stores these data into the storage means 1cX. Further, the information processing apparatus 1X displays the related information 3X stored in the storage means 1cX, on the display means 1dX, to show the user the contents of the related information 3X.

For example, when a user requests purchase of an arbitrary content, for example, suggested by the related information 3X, the information processing apparatus 1X transmits purchase request information 6X for requesting purchaser of the arbitrary content, and the first identification code 5X, from the transmission means 1aX.

The information processing apparatus 2X receives the purchase request information 6X and the first identification code 5X transmitted from the information processing apparatus 1X, by the receiver means 2bX, and prepares content data 7X corresponding to the purchase request information 6X. Further, when the user purchases further another content, the information processing apparatus 2X issues a second identification code 8X indicative of the right for receiving a specific service. Further, the information processing apparatus 2X transmits the content data 7X and the second identification code 8X from the transmission means 2cX.

Thus, the right for receiving a specific service upon further purchase of another content can be provided for the user who once purchased a content.

Next, the embodiment of the present invention will now be described specifically. In the following description, the processing of storing related information concerning a song or a set of songs will be called clipping.

Figure 16:
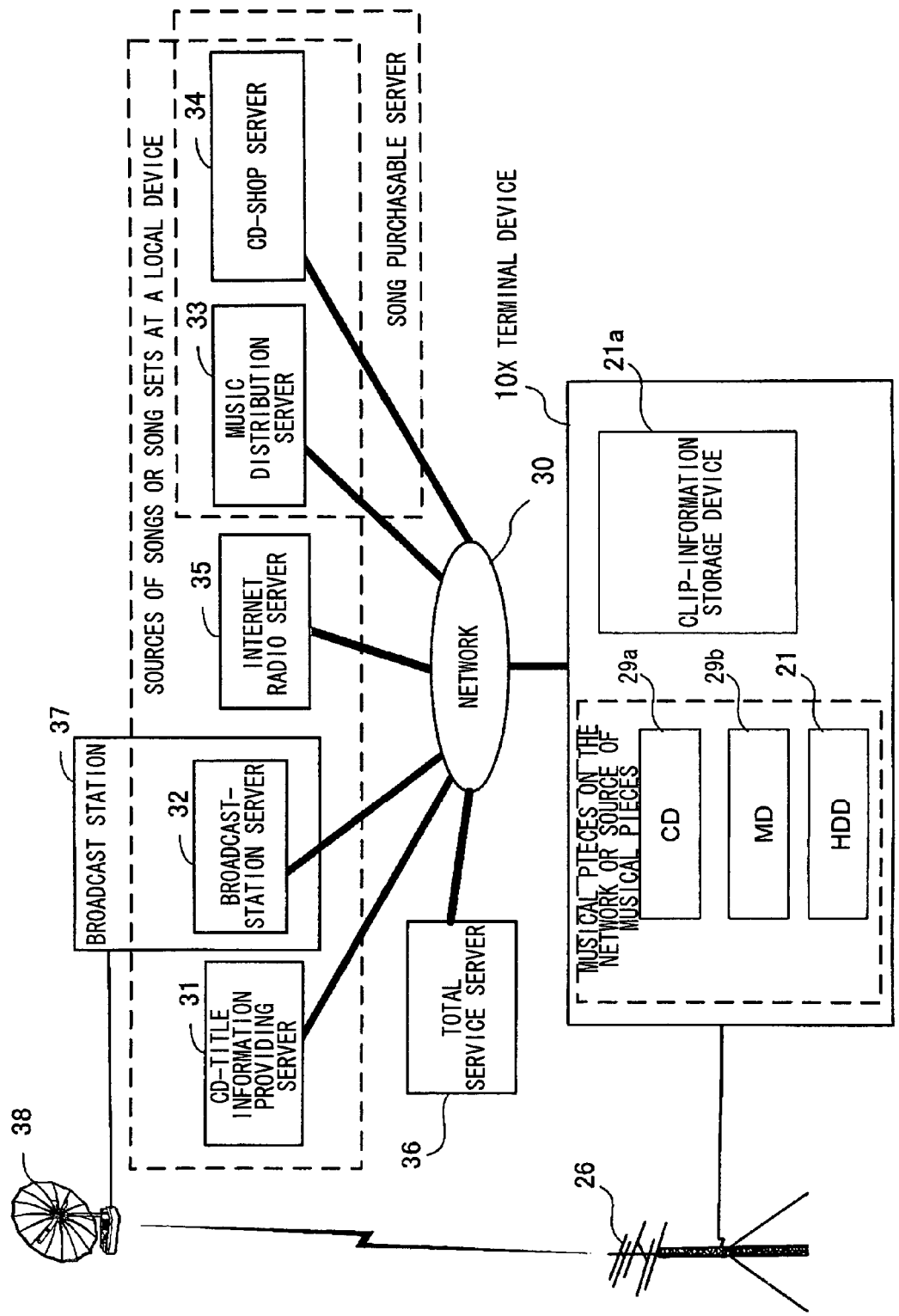
FIG. 16 is a view showing a network system according to the embodiment of the present invention.

FIG. 16 in which the portions corresponding to the portions shown in FIG. 2 are denoted at the same reference symbols shows a network system according to the embodiment of the present invention. The terminal device 10X is connected to various servers via a network 30.

The terminal device 10X maintains local sources such as songs or song sets in recording media such as in a CD 29a, MD (Mini Disc) 29b, hard disc drive (HDD) 21, and the like. The CD 29a and MD 29b are portable recording media and can be attached to and detached from the terminal device lox. What local sources are prepared for the terminal device 10X varies depending on the type of the terminal device 10X and the purposes. The terminal device 10X can receive contents broadcasted through the antenna 26.

Note that the local sources of songs or song sets shown in FIG. 16 are merely examples. That is, any recording medium can be let function as a local source of a song or song set by recording the song or song set as long as the recording medium exists locally in the terminal device lox.

The terminal device 10X has a clip information storage device 21a which stores clipped related information. The clip information storage device 21a is a secondary storage device of the terminal device 10X. For example, a part of the storage area of the HDD 21 or the like may be let function as the clip information storage device 21a. Note that the terminal device 10X is capable of clipping data in both forms of a song and song set. Therefore, the user can clip the whole of an FM program or CD album including interesting many songs, and thus record related information of an interesting song set by one clip operation. The inner structure, outer structure, and program module configuration of the terminal device 10X are, for example, the same as the terminal device 10 in the first embodiment.

Also, the hardware configuration of the CD title information providing server 31 is the same as that in the first embodiment.

Figure 17:
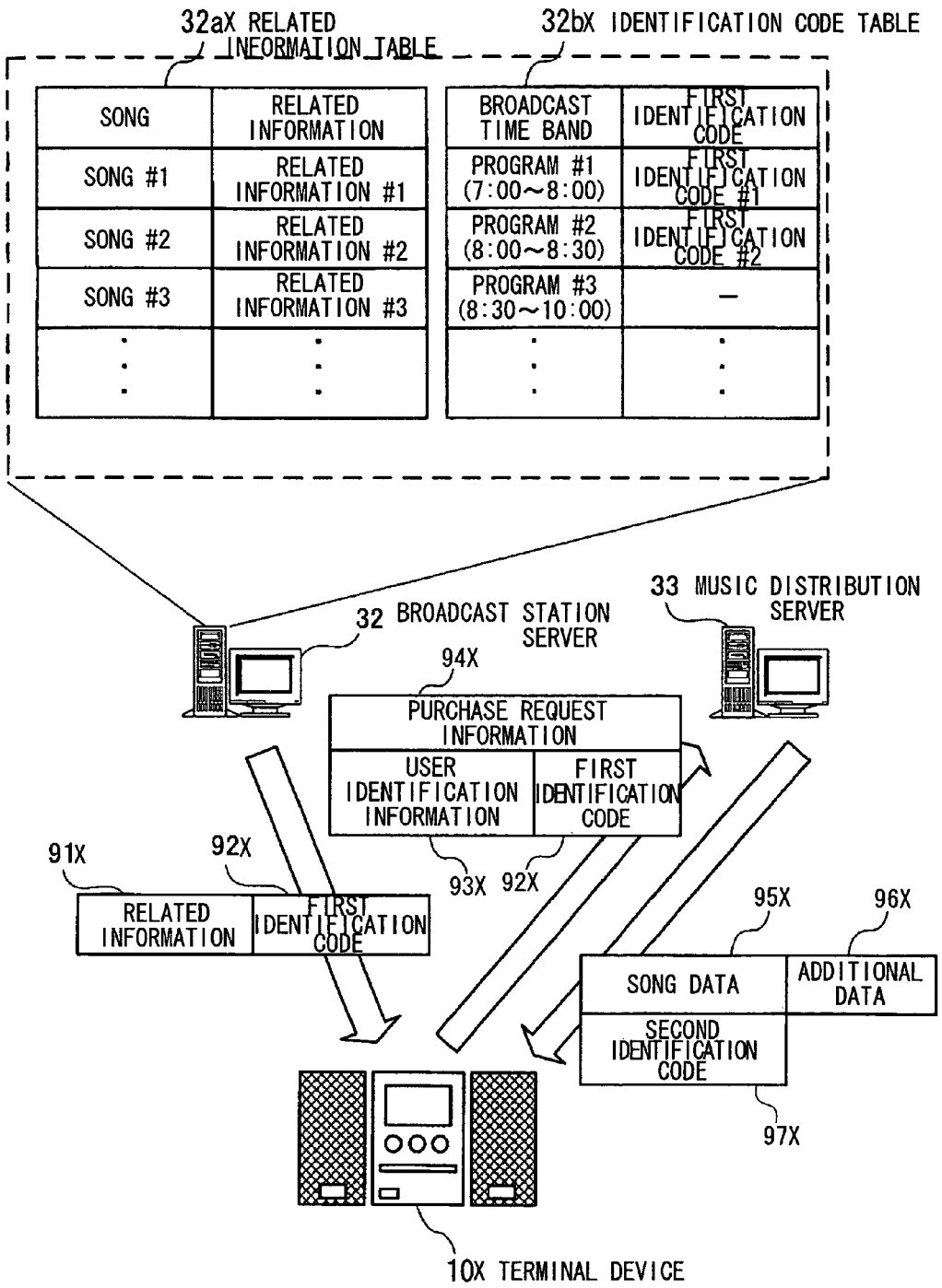
FIG. 17 is a view showing an example of obtaining a special service based on first and second identification codes.

FIG. 17 is a view showing an example of obtaining a special service based on the first and second identification codes. In this example, the first identification code 92X appended to the related information 91X of a song broadcasted from the broadcast station server 32 is used to purchase the content of song data 95X from the music distribution server 33.

More specifically, the broadcast station server 32 prepares in advance a related information table 32aX and an identification code table 32bX. The related information table 32aX registers related information of each song to be broadcasted.

The identification code table 32bX registers a first identification code for every broadcast time band. The first identification code is necessary for a user who purchased a song to receive a special service. The broadcast time bands are divided in units of programs, for example.

The first identification code registered for each program is indicative of, for example, a right for receiving a special service (such as addition of a bonus track in return for purchase of a song) provided by a sponsor enterprise of the program. In the example shown in FIG. 17, a first identification code is registered for each program. Alternatively, a first identification code may be registered for each song to be broadcasted.

Note that there may be a time band in which no first identification code is registered. That is, first identification codes are registered only for the broadcast time bands in which any service is provided from sponsor enterprises or the like. In case of the broadcast station 37, for example, an announcement notifying the contents of a special service given upon obtaining related information is made in comments in a program for which a first identification code is set. In this manner, only the users who have heard the program can know the presence of the special service, and so can receive the first identification code for receiving the special service.

Alternatively, a first identification code may be assigned inherently to songs in a specific time band of a specific broadcast station. In this case, when one song is broadcasted at different time points, different first identification codes can be provided respectively. In addition, a first identification code can be assigned to a song. In this case, one first identification code may be assigned in common to plural songs. In these ways, detailed solutions can be taken aiming at an improved broadcast audience rate.

The terminal device 10X performs polling at a predetermined interval, and issues a request for obtaining related information 91X of a song being broadcasted at present, to the broadcast station server 32. The broadcast station server 32 transmits the related information 91X of the song being broadcasted at present, and a first identification code 92X set for the present time band, to the terminal device 10.

The terminal device 10X displays the received related information 91X. If the user carries out an input operation to instruct a clip, the terminal device 10X stores the combination of the received related information 91X and the first identification code 92X, into a HDD 21 or the like.

Thereafter, the user operates the terminal device 10X to access the music distribution server 33. At this time, the terminal device 10X transmits user identification information 93X required for receiving user authentication, to the music distribution server 33, and waits for authentication confirmation from the music distribution server 33.

Upon reception of the authentication confirmation from the music distribution server 33, the terminal device lox transmits the first identification code 92X together with purchase request information 94X for buying song data, to the music distribution server 33.

The music distribution server 33 which has received the purchase request information 94X and the first identification code 92X prepares song data 95X requested by the purchase request information 94X. Thereafter, the music distribution server 33 determines whether the first identification code 92X is valid or not. If the code is determined to be valid, the music distribution server 33 issues the additional data 96X corresponding to the first identification code 92X, and the second identification code 97X indicative of a special service which the user who has purchased a song can receive when the user further buys a content such as a CD. Further, the music distribution server 33 transmits the music data 95X, additional data 96X, and second identification code 97X to the terminal device 10X.

The additional data 96X is an additional service such as an instruction to delete the first identification code recorded in the terminal device 10X, a bonus track, or the like.

The second identification code 97X is a code necessary to receive a special service when a user who has purchased a song further buys a content such as a CD. The second identification code 97X describes agencies capable of providing the special service or contents of the special service. As a special service, discount of a specific CD may be prepared. The user who has obtained the second identification code 97X uses the terminal device 10X to access a CD shop server which validates the second identification code 97X, and can thereby, for example, purchase a specific CD at a discount.

Next, with reference to a sequence chart, a description will be made of exchanges made between the terminal device 10X, broadcast station 37, and broadcast station server 32 when the terminal device 10X obtains and clips, from a broadcast station server 32, related information relevant to a song broadcasted in a program from the broadcast station 37.

Figure 18:
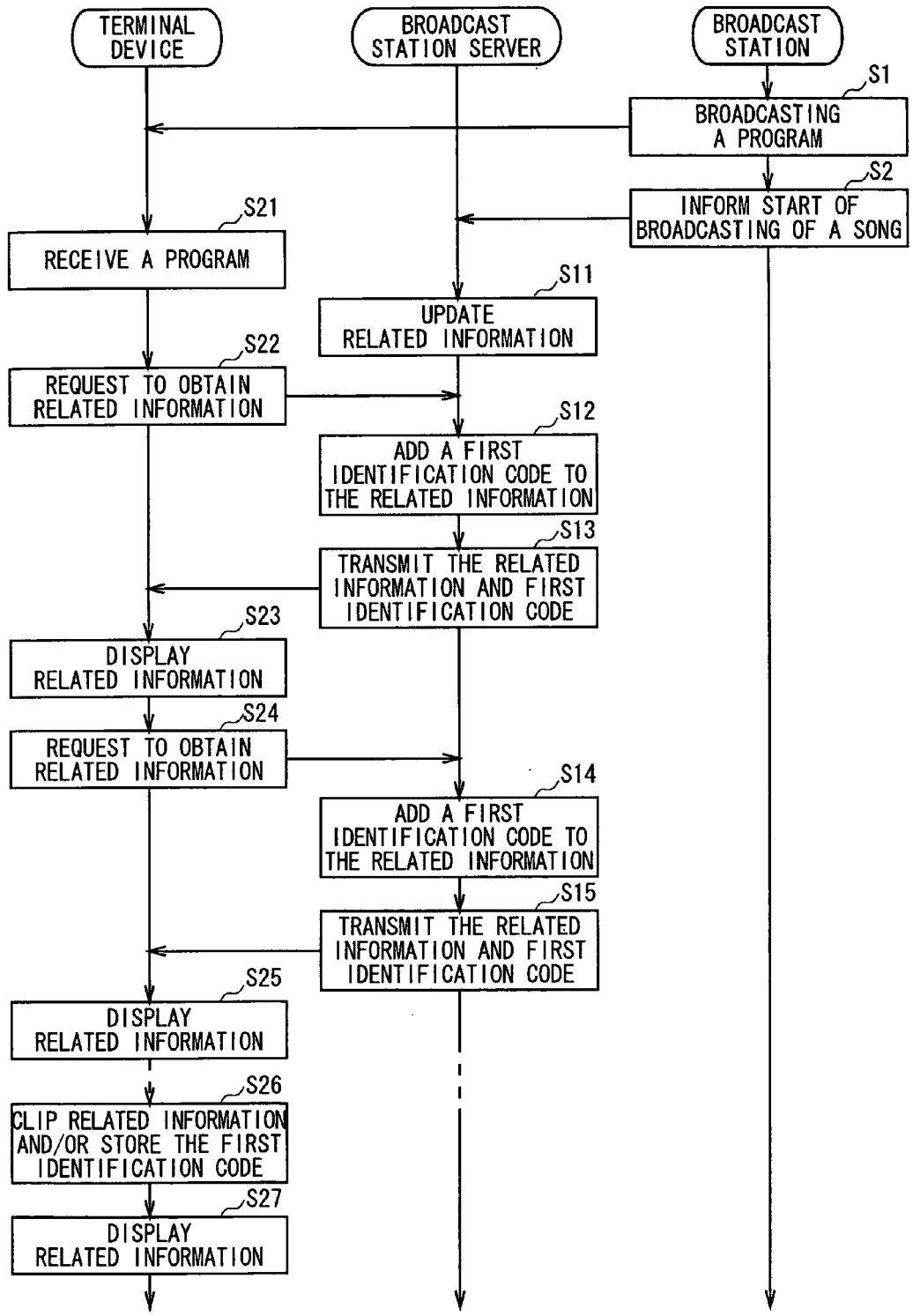
FIG. 18 is a sequence chart when clipping related information which a terminal device has obtained from a broadcast station server.

FIG. 18 is a sequence chart when clipping related information which a terminal device has obtained from a broadcast station server. Suppose that the broadcast station 37 broadcasts programs sequentially according to a broadcast schedule of programs. The processing shown in FIG. 18 will now be described in accordance with step numbers.

[Step S1] The broadcast station 37 starts broadcasting a program.

[Step S2] The broadcast station 37 notifies start of broadcast of a song to be broadcasted in the program to the broadcast station server 32.

[Step S11] The broadcast station server 32 refers to a related information table 32aX, and updates related information which has been previously maintained to be dealt with as targets to be provided to the terminal device 10, with related information related to the song notified by the broadcast station 37 in the Step S1.

[Step S21] The terminal device lox receives a program which the broadcast station 37 has started broadcasting in the step S1, and makes a user hear the program. The terminal device 10X also receives the song which the broadcast station 37 has started broadcasting in the program, and makes the user hear this song. Then, the processing is let go to the step S22.

[Step S22] The terminal device lox transmits request information to request acquistion of related information related to the song received in the step S21, to the broadcast station server 32 at a predetermined interval (e.g., an interval of 30 seconds). That is, the terminal device 10X performs polling to obtain related information of the song being received.

[Step S12] Upon receipt of request information transmitted from the terminal device 10X in the step S22, the broadcast station server 32 refers to the identification code table 32bX, and adds a first identification code corresponding to the current time band, to related information of the song held as a target to be provided at present. Further, the broadcast station server 32 proceeds the processing to the step S13.

[Step S13] The broadcast station server 32 transmits the related information and the first identification code to the terminal device 10X via the network 30. The first identification code having the same contents is transmitted to every user that receives this program.

[Step S23] Upon receipt of the related information and the first identification code transmitted from the broadcast station server 32 in the step S13, the terminal device 10X displays the contents of the received related information on the display device 17, and proceeds the processing to the step S24. The user can know related information such as the song title of the song being currently broadcasted and the artist name thereof, by referring to the display device 17. The related information in the present embodiment includes a CD number, broadcasting station identification information to specify the broadcasting station 37 as the supplier who has broadcasted the song, and media identification information to specify the recording medium which records the song, in addition to the title and the artist name.

[Step S24] After 30 seconds have passed from a previous obtaining request, the terminal device 10X transmits request information to the broadcast station server 32, and makes an obtaining request for related information again.

[Step S14] Upon receipt of the request information transmitted from the terminal device 10X in the step S24, the broadcast station server 32 refers to the identification code table 32bX, and adds a first identification code corresponding to the current time band, to the related information of the song held as a target to be provided at present. Further, the broadcast station server 32 proceeds the processing to the step S15.

[Step S15] The broadcast station server 32 provides the terminal device 10X again with the related information of the song and the first identification code via the network 30.

[Step S25] Upon receipt of the related information and the first identification code transmitted from the broadcast station server 32 in the step S14, the terminal device 10X displays the contents of the received related information on the display device 17.

Unless the related information of the song currently held as a target to be provided by the broadcast station server 32 is updated with related information of another song to be broadcasted next, the terminal device 10X obtains related information of the song currently held. Accordingly, the terminal device 10X continues displaying the related information of this song on the display device 17 until it is updated.

[Step S26] If the user now instructs the terminal device 10X to clip the related information displayed on the display device 17, the terminal device 10X clips the related information into the HDD 21, stores the first identification code linked with the related information in the HDD, and proceeds the processing to the step S27.

If the related information is clipped, the terminal device 10X obtains related information of another song from the broadcast station server 32, subsequently to the related information of the clipped song, and can clip the related information of the another song.

A database is constructed in the HDD 21 of the terminal device lox by clipped related information.

[Step S27] The terminal device 10X displays newly the clipped related information on the display device 17, and waits for a search request from the user.

Please note that the structure of the related information and the storage format of the clipped related information are the same as those in the first embodiment.

FIG. 19 is a table showing an example of configuration of a first identification code. As shown in FIG. 19, a first identification code 60X has a column 60aX of "Issuer", a column 60bX of "Purpose", a column 60cX of "Available partner", a column 60dX of "Expiration limit", and a column 60eX of "Code ID".

In the column 60ax of "Issuer", a name expressing the service provider who issues the first identification code 60X is set. In this case, the name of the broadcasting station (FM SHINAGAWA) which manages the broadcast station server 32 is set.

In the column 60bX of "Purpose", the contents of a special service provided for the user who has purchased a song with use of the first identification code 60X are set. The special service is, for example, a bonus track A.

In the column 60cX of "Available partner", the name of a service provider who provides a special service for the user who has purchased a song with use of the first identification code 60X is set. This information is used to distinguish the service provider who provides the special service from other service provides who do not. In this case, the name of a music distribution site (music distributions site B) provided by the music distribution server 33 is set.

In the column 60dX of "Expiration limit", the final date of the period for which the user can receive a special service with use of the first identification code 60X is set. The expiration limit may be set or not set.

In the column 60eX of "Code ID", a number to identify uniquely the issued first identification code 60X is set.

Plural combinations each consisting of related information of a song and a first identification code are stored in the terminal device 10X. Note that the related information can be stored in a tree structure.

Next, with reference to a sequence chart, a description will be made of a procedure of exchanges carried out between the terminal device 10X and the music distribution server 33 when the user purchases a song from the music distribution server 33.

Figure 20:
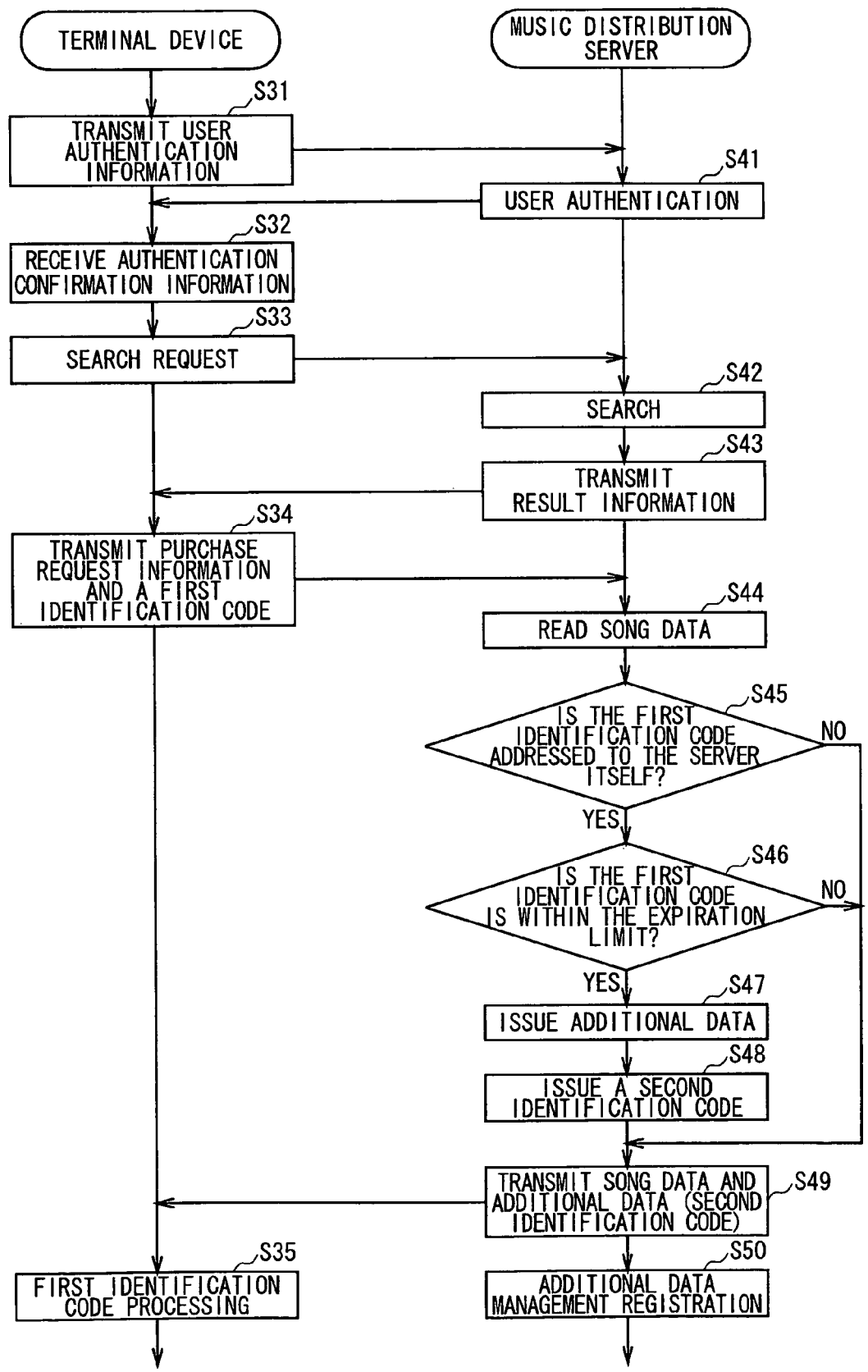
FIG. 20 is a sequence chart when purchasing a song.

FIG. 20 is a sequence chart when purchasing a song. In the following, the processing shown in FIG. 20 will be described in the order of step numbers.

[Step S31] The terminal device 10X transmits, to the music distribution server 33, user identification information such as a user ID, password, and the like given in advance to the terminal device 10X, in order to obtain user authentication by the music distribution server 33. At this time, the terminal device 10X may also transmit a preset nickname to the music distribution server 33.

The nickname is a name used to distinguish terminal devices from each other when one user uses plural terminal devices. Different nicknames are set respectively for terminal devices used by one user.

If a user has purchased a new terminal device, the user sets a nickname for the new terminal device when the user receives a service of obtaining related information or the like for the first time. Then, an accessed server confirms that the set nickname is not overlapped by any nicknames of the other terminal devices of the same user. The accessed server then allows the new terminal device to register the set nickname.

[Step S41] The music distribution server 33 receives user identification information transmitted from the terminal device 10X in the step S31, and carries out user identification. Thereafter, the music distribution server 33 responds to the terminal device 10X by an authentication result.

[Step S32] The terminal device 10X receives the authentication result from the music distribution server 33 and confirms that authentication has been successful. Then, the terminal device 10X proceeds the processing to the step S33.

[Step S33] After the confirmation of the successful user authentication, the terminal device lox transmits a search request to the music distribution server 33 in response to an operation input from the user. Note that a part of data in clipped related information (for example, a CD number) can be used as a search key for the search request.

Not only information obtained by a search based on the clipped related information but also related information before clipping, which has been obtained by the now-on-air function, and related information obtained by means of an on-air list can be used directly for a search without clipping.

[Step S42] The music distribution server 33 searches its own database concerning CDs in response to a search request, and proceeds the processing to the step S43.

[Step S43] The music distribution server 33 transmits result information indicative of a search result in the step S42 to the terminal device 10X.

[Step S34] Upon receipt of the result information transmitted from the music distribution server 33 in the step S43, the terminal device 10X displays this information to the display device 17, to notify the user of the search result. In response to a purchase instruction from the user, the terminal device 10X transmits, to the music distribution server 33, a first identification code stored in the HDD 21 and linked to related information of a song to be purchased, together with purchase request information for requesting purchase of a song.

Note that the terminal device 10X is capable of transmitting an identification code corresponding to arbitrary related information. For example, even another first identification code corresponding to the related information before clipping, which has been obtained by the now-on-air function, or related information obtained by means of an on-air list than the first identification code corresponding to clipped related information can be transmitted. Further, the terminal device 10X may transmit, to the music distribution server 33, a plurality of such first identification codes together that allow special services to be supplied from the music distribution server 33. Whether or not a special service can be supplied from the music distribution server 33 can be determined by referring to the column of "available partner" of the first identification code.

Otherwise, all the first identification codes stored in the terminal device 10X may be transmitted to the music distribution server 33. In this case, the music distribution server 33 selects usable first identification codes and determines special services.

The terminal device 10X may transmit the clipped related information together with a first identification code to the music distribution server 33.

Note that transmission of a first identification code may be carried out by an operation input from the user or may be automatically carried out. For example, if a corresponding CD is detected as a result of a search based on a CD number, a first identification code may be automatically transmitted.

The terminal device 10X may transmit a first identification code together with a search request in the step S33.

[Step S44] Upon receipt of the purchase request information and the first identification code transmitted from the terminal device 10X in the step S34, the music distribution server 33 reads song data requested by the purchase request information and proceeds the processing to the step S45.

[Step S45] The music distribution server 33 performs authentication of the first identification code received in the step S44. The column of "Available partner" of the first identification code is used for the authentication. That is, the music distribution server 33 refers to the name written in the column of "Available partner" and determines whether or not the received first identification code is addressed to the server 33 itself. For example, if the name of the music distribution site B is set in the music distribution server 33 and if the music distribution site B is set in the column of "Available partner" of the received first identification code, the music distribution server 33 determines that the received first identification code is addressed to the server 33 itself. As a result of this determination, if the first identification code is addressed to the server 33 itself, the music distribution server 33 proceeds the processing to the step S46. Otherwise, if not, the music distribution server 33 proceeds the processing to the step S49.

[Step S46] The music distribution server 33 refers to the column of "Expiration limit" of the received first identification code, and determines whether it is still within the expiration limit written in the column of "Expiration limit" or not. If within the expiration limit, the music distribution server 33 proceeds the processing to the step S47. Otherwise, if the expiration limit has passed, the music distribution server 33 proceeds the processing to the step S49.

[Step S47] The music distribution server 33 issues additional data (e.g., a bonus track or the like) corresponding to the special service written in the column of "Purpose" of the received first identification code. Also, the music distribution server 33 manages the number of times (the number of allowable uses) the user can use the first identification code. Only when the number of possible uses is not exceeded, the special service can be supplied. Further, the music distribution server 33 can proceed the processing to the step S48.

[Step S48] The music distribution server 33 issues a second identification code indicative of a right to receive a special service when a user who has purchased a song further purchases a content such as a CD or the like. The server 33 then proceeds the processing to the step S49. Specific contents of the second identification code will be described later.

[Step S49] The music distribution server 33 transmits the song data read in the step S44, the additional data issued in the step S47, and the second identification code (if issued), to the terminal device 10.

[Step S50] Thereafter, the music distribution server 33 manages additional data provided for every user. More specifically, the music distribution server 33 manages additional data provided for users by using a table on which user identification information such as user IDs and passwords is linked with the histories of additional data provided for users. Alternatively, the music distribution server 33 is capable of managing additional data linked with IDs (nicknames) which specify terminal devices 10X. In this manner, it is possible to control use of special services by particular users or particular terminal devices 10X.

[Step S35] The terminal device 10X processes the first identification code in accordance with the contents of additional data after receiving the song data, additional data, and second identification code transmitted from the music distribution server in the step S49. For example, the terminal device 10X deletes a used first identification code.

For example, information expressing whether the corresponding first identification code in a terminal device 10X should be invalidated or not is transferred from the music distribution server 33 as additional data. In this case, the terminal device 10X performs a processing corresponding to the information.

Processing for a first identification code may be not only the processing of invalidating a first identification code but also a processing for reducing, by an instructed number, the number of times a special service can be received. Alternatively, a first identification code may be set in a condition before receiving a special service.

Next, an example of the structure of a second identification code will be described.

FIG. 21 shows an example of the structure of a second identification code. As shown in FIG. 21, the second identification code 70X, has a column 70aX of "Issuer", a column 70bX of "Purpose", a column 70cX of "Available partner", a column 70dX of "Expiration limit", and a column 70eX of "Code ID", like the first identification code 60.

In the column 70ax of "Issuer", a name expressing the service provider who issues the second identification code 70X is set. In this case, the name of a music distribution site (the music distribution site B) provided by the music distribution server 33 is set.

In the column 70bX of "Purpose", the contents of a special service such as a discount of a particular CD are set, the special service being provided for the user who has purchased a song from the music distribution server 33 when the user further purchases a content like a CD.

In the column 70cX of "Available partner", the name of a service provider is set, such as a CD shop A, who provides a special service for the user who has purchased a song when the user further purchase a content such as a CD. This information is used to distinguish the service provider who provides the special service from other service provides who do not. Plural service providers that provide the same special service may be set. Thus, the service provider set in the column 60cX of "Effective partner" of the first identification code 60X and the service provider set in the column 70cX of "Effective partner" of the second identification code 70X may be different from each other. In this manner, it is possible to promote use of services by affiliating service providers.

In the column 70dX of "Expiration limit", the final date of the period for which the user can receive a special service with use of the second identification code 70X is set. The expiration limit may be set or not set.

In the column 70eX of "Code ID", a number to identify uniquely the issued second identification code 70X is set.

Suppose now that the CD shop server 34 is managed by a CD shop A set in the column 70cX of "Available partner". Then, a user who has obtained a second identification code 70X can access the CD shop server 34 through a terminal device 10X, and purchase a CD on a site provided by this server. In this manner, the user can receive the special service (e.g., a discount of a particular CD) written in the column 70bX of "Purpose".

If a second identification code is recorded on a portable recording medium and if the recording medium is brought to a shop, a special service can be provided at the time of purchasing a CD at the shop. Specifically, as shown in FIG. 13, a user records a second identification code stored in a terminal device 10X onto a portable recording medium. For example, the user may record the second identification code on a semiconductor memory 80. The memory 80 may be, for example, a flash memory.

The user brings the memory 80 in which an identification code is written, to a shop such as a CD shop. Further, the user passes the memory 80 to a shop attendant in the shop when the user buys a CD which allows the user to receive a special service with use of a second identification code.

The shop attendant uses a shop terminal device 39 installed in the shop, to read the identification code from the memory 80. Then, a special service corresponding to the second identification code is given when a CD or the like is sold to the user.

The hardware configuration of the shop terminal device 39 can be realized by the same hardware configuration as the terminal device 10X shown in FIG. 5. However, a reader/writer for the memory 80 is required as a media drive. In addition, the shop terminal device 39 need not have a tuner 27 or an infrared communication unit 28.

Meanwhile, a dummy track is added to song data which the user has purchased. When a second identification code is transmitted from the music distribution server 33, the second identification code is transmitted, stored in this dummy track.

When the second identification code is read into the memory 80 by a user, the dummy track storing the second identification code is read into the memory 80. At this time, the number of checkout of the dummy track can be managed by recording the number of reading into the memory 80 with respect to the second identification code.

The shop terminal device 39 can provide the user with a special service written in the second identification code, by performing reading from the memory 80 and executing a predetermined processing.

Figure 22:
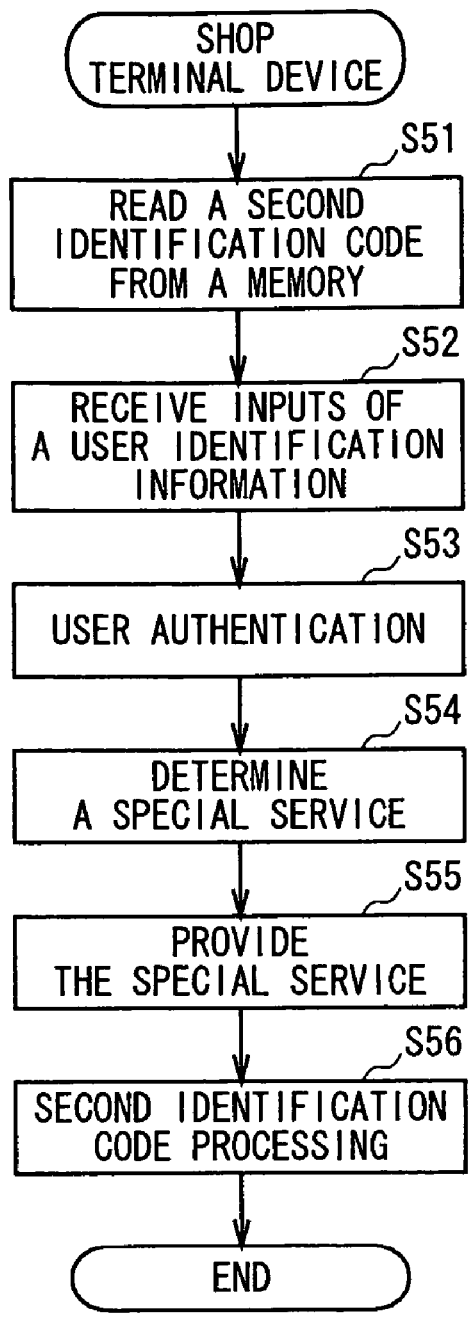
FIG. 22 is a flowchart showing a processing procedure of a shop terminal device.

FIG. 22 is a flowchart showing a processing procedure of the shop terminal device. In the following, the processing shown in FIG. 22 will be described in the order of step numbers.

[Step S51] The shop terminal device 39 reads a second identification code stored in a dummy track from the memory 80, and proceeds the processing to the step S52.

[Step S52] The shop terminal device 39 receives an input of user identification information such as a user ID, password, and the like.

[Step S53] The shop terminal device 39 carries out user authentication based on the user identification information inputted in the step S52. User authentication may be entrusted to another server connected via the network 30. For example, the shop terminal device 39 transmits the user identification information inputted from the user to a server (for example, a CD shop server 34) connected via the network 30. Then, this server performs an authentication processing and returns an authentication result to the shop terminal device 39.

[Step S54] The shop terminal device 39 determines a special service corresponding to the second identification code when the user authentication is successful.

[Step S55] The shop terminal device 39 provides special services corresponding to sales of CDs. For example, in case of providing an additional content, the shop terminal device 39 writes the additional content into the memory 80. Alternatively, in case of discounting a particular CD, the shop terminal device 39 cooperates with a terminal function such as POS (Point Of Sale), to perform a discount processing on the sales price of the particular CD.

[Step S56] The shop terminal device 39 checks the number of checkout of the dummy track recorded on the memory 80. If the number of checkout of the dummy track has reached a predetermined number, the shop terminal device 39 erases the second identification code. Thus, the number of checkout of the dummy track to the memory 80 can be limited by storing the second identification code in the dummy track. Copyright management can be achieved effectively.

In this manner, special services can be received at shops although special services cannot be received at shops by conventional techniques. Further, another measure can be considered as follows. That is, a device capable of displaying a second identification code may be built in a mobile terminal. The user may receive a special service upon showing the second identification code in a shop when buying a CD at a CD shop.

As described above, if a second identification code is newly issued upon authentication of a first identification code, the user who has purchased a song currently broadcasted or registered on an on-air list can obtain a right to receive a special service when the user further buys a content such as a CD. Actually, when the user buys a CD through a CD shop server 34, the user can purchase a particular CD for a discount price, for example.

In addition, an expiration limit is set for the first identification code. Therefore, the period in which a service is provided can be limited.

The above description has been made of a case that a user who has purchased a song further purchases a CD. Even in an opposite case that a user who has purchased a CD further purchases a song, the user who purchased the CD can obtain a right to receive a special service when the user further purchases a song, by use of first and second identification codes.

In the above description, the music distribution server 33 uses a table to manage additional data issued to users, for every user. Further, the number of receptions of a first identification code may be managed for every user. As a result of this, for example, it is possible to manage how many times one user has used one identification code. The music distribution server 33 can manage special services such that each special service is not provided more times than the number of possible uses of a corresponding identification code. It is also possible to issue a number of pieces of additional data corresponding to a first identification code transmitted from the terminal device 10X. Accordingly, purchase of songs can be promoted.

Processing functions of the terminal device 10X and each server can be realized by a computer. In this case, a program which describes the contents of processing of functions to be included in the terminal device 10X and each server is provided. By executing this program on the computer, the processing functions are realized by the computer. The program describing the contents of processing can be recorded on a recording medium readable from a computer. A recording medium readable from a computer may be a magnetic recording device, an optical disc, a magneto-optical recording medium, or a semiconductor memory. The magnetic recording device may be generally a hard-disc device (HDD), a flexible disc (FD), or a magnetic tape. The optical disc may be a DVD, DVD-RAM, CD-ROM, or CD-R (Recordable)/RW (Rewritable). The magneto-optical recording medium may be a MO (Magneto-Optical disc).

To make this program prevail, for example, a portable recording medium such as a DVD or CD-ROM on which the program is recorded is sold. Alternatively, the program may be stored in a storage device of a server computer, and may be transferred from the server computer to another computer via a network.

The computer which executes this program may, for example, store the program recorded on a portable recording medium or transferred from a server computer, into the computer's own storage device. Further, the computer may read the program from the storage device of itself and execute a processing according to the program. Note that the computer can also read the program directly from a portable recording medium and execute a processing according to the program. Further, every time when a program is transferred from a server computer, the computer can execute a processing according to the received program.

(3) Third Embodiment

Next, as a third embodiment, a detailed description will be made of a service system in which one of plural service servers realizes each of the service, as shown in FIGS. 8 and 18, of providing related information of a song being broadcasted, and the music distribution service as shown in FIGS. 12 and 20. Incidentally, this service system (the music-related service providing system 1000 shown in FIG. 23) has a single sign-on function. A client terminal 1002 shown in FIG. 23 corresponds to, for example, the terminal device 10 and terminal device 10X described previously. A network NT1000 corresponds to, for example, the network 30 described previously. A portal server 1003 corresponds to, for example, the total service server 36 also described previously. A music data distribution server 1004 corresponds to, for example, the music distribution server 33 described previously. A sales server 1005 corresponds to, for example, the CD shop server 34 described previously. A radio broadcast information distribution server 1006 corresponds to, for example, the broadcast station server 32 described previously. An internet radio server 1007 corresponds to, for example, the internet radio server 35 described previously.

(3-1) System Configuration

Figure 23:
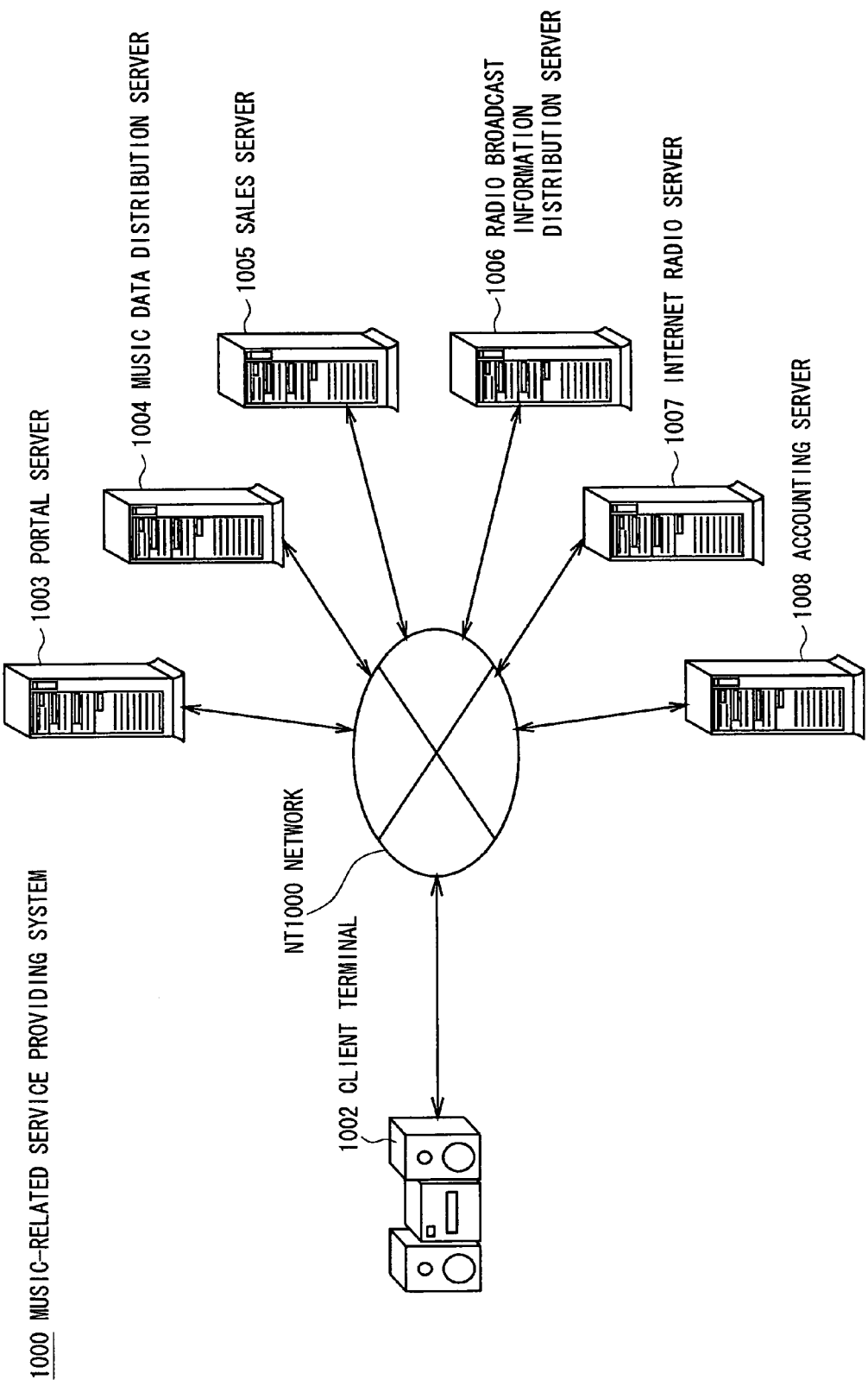
FIG. 23 is a schematic diagram showing the entire structure of a music-related service providing system according to the embodiment.

In FIG. 23, the reference numeral 1000 denotes a music-related service providing system as a whole, which includes a client terminal 1002 of the user who signed up a contract with a management agency of the music-related service providing system 1000, a portal server 1003 which manages the client terminal 1002, and plural servers 1004 to 1008 which provide various services concerning music for the client terminal 1002.

In case of this embodiment, the music data distribution server 1004 provides a music data distribution service of providing music data for the client terminal 1002, where the music data has a format according to ATRAC3 (Adaptive Transform Acoustic Coding 3), AAC (Advanced Audio Coding), WMA (Windows Media Audio), Real AUDIO G2 Music Codec, MP3 (MPEG Audio Layer-3), or the like.

A sales server 1005 provides a sales service of selling CDs (compact Discs) and DVDS (Digital Versatile Discs) to the user via the client terminal 1002.

Further, a radio broadcast information distribution server 1006 provides a radio broadcast information distribution service of distributing radio programs, music, and the like in radio broadcasts broadcasted from radio stations, to the client terminal 1002.

Further, the internet radio server 1007 provides an internet radio broadcast service which broadcasts radio broadcast data in the form of streaming distribution toward the client terminal 1002 via the network NT 1000 corresponding to the Internet.

In addition, an accounting server 1008 is configured to execute an accounting processing to charge users various fees in response to requests from the portal server 1003 and the like.

(3-2) Structure of the Client Terminal 1002
(3-2-1) Function Circuit Block Configuration of the Client Terminal 1002

Figure 24:
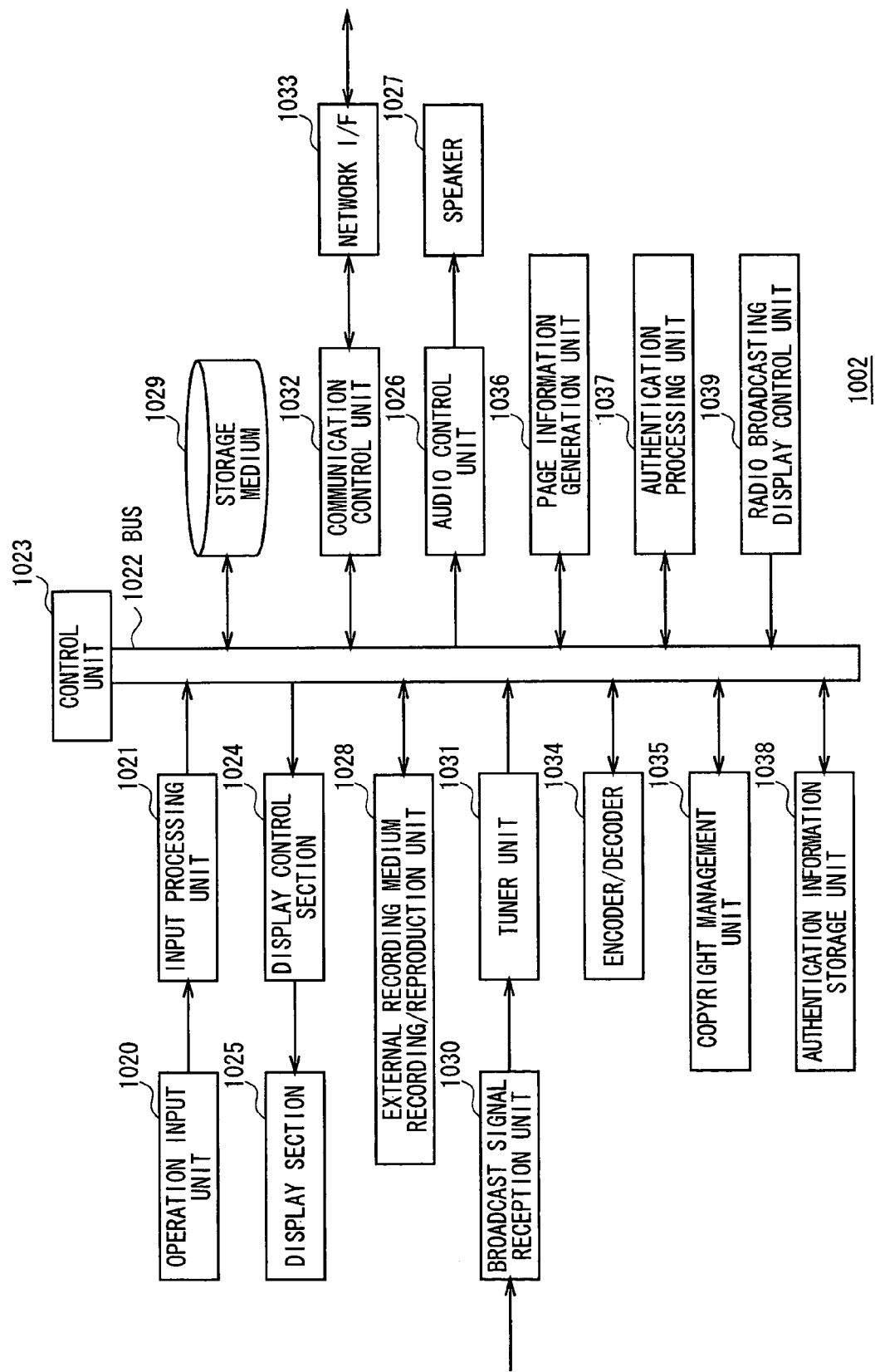
FIG. 24 is a block diagram showing hardware configuration based on function circuit blocks of a client terminal.

Next, the hardware configuration of the function circuit block of the client terminal 1002 will be described. As shown in FIG. 24, an operation input unit 1020 constituted by various operation buttons provided on the surface of the housing of the client terminal 1002 or a remote controller (not shown) is operated by the user, the client terminal 1002 recognizes the operation by the operation input unit 1020 and sends an operation input signal corresponding to the operation, to an input processing unit 1021.

The input processing unit 1021 converts the operation input signal given from the operation input unit 1020 into a specific operation command and sends the command to a control unit 1023 via a bus 1022.

The control unit 1023 controls operation of each of these circuits, based on operation commands and control signals given from circuits connected through the bus 1022.

The display control unit 1024 performs a digital/analog conversion processing on video data supplied thorough the bus 1022, and sends analog video signals obtained as a result of conversion to the display unit 1025.

The display unit 1025 is, for example, a display device such as a liquid crystal display or the like, which is directly mounted on the surface of the housing in some cases or is provided externally in other cases.

As processing results from the control unit 1023 or various video data as analog video signals through the display control unit 1024 are supplied to the display unit 1025, the display unit 1025 displays videos based on the analog video signals.

An audio control unit 1026 performs a digital/analog conversion processing on audio data supplied the bus 1022, and sends analog audio signals obtained as a result, to a loudspeaker 1027. The loudspeaker 1027 outputs sound based on the analog audio signals supplied from the audio control unit 1026.

An external recording medium recording/reproducing unit 1028 reads and reproduces content data recorded on an external recording medium such as a memory stick (trademark) or the like in which a flash memory is contained in an outer casing, or records content data as a recording target onto the external recording medium.

When the external recording medium recording/reproducing unit 1028 reads video data as content data from the external recording medium, the unit supplies the read video data to the display control unit 1024 through the bus 1022.

Then, the display control unit 1024 converts the video data read as content data from the external recording medium by the external recording medium recording/reproducing unit 1028, into analog video signals, and supplies the signals to the display unit 1025.

When the external recording medium recording/reproducing unit 1028 reads audio data as content data from the external recording medium, the unit 1028 supplies the read audio data to the audio control unit 1026 through the bus 1022.

The audio control unit 1026 then converts the audio data read as content data from the external recording medium by the external recording medium recording/reproducing unit 1028, into analog audio signals, and supplies the signals to the loudspeaker 1027.

Further, the control unit 1023 sends content data read from the external recording medium by the external recording medium recording/reproducing unit 1028, to a storage medium 1029 in the client terminal 1002 through the bus 1022, and stores the content data into the storage medium 1029 (hereinafter the operation of storing content data into the storage medium 1029 will be called ripping).

When video data such as image data or video data is read as content data from the storage medium 1029, the control unit 1023 supplies the read video data to the display control unit 1024 through the bus 1022.

Also, when audio data such as audio data is read as content data from the recording medium 1029, the control unit 1023 supplies the read audio data to the audio control unit 1026 through the bus 1022.

In addition, the control unit 1023 can read and transfer music data from the storage medium 1029 to the external recording medium recording/reproducing unit 1028, thereby to make the external recording medium recording/reproducing unit 1028 record the music data into the external recording medium.

A broadcast signal reception unit 1030 receives radio-broadcast waves transmitted from radio stations and supplies the waves to a tuner unit 1031.

Under control from the control unit 1023, the tuner unit 1031 extracts radio broadcast signals of a broadcast frequency corresponding to a radio station instructed, for example, by the operation input unit 1020 among radio broadcast waves received by the broadcast signal reception unit 1030. The tuner unit 1031 performs a predetermined processing on the extracted signals and sends audio data obtained as a result of the predetermined processing, to the audio control unit 1026 through the bus 1022.

The audio control unit 1026 converts the audio data given from the tuner unit 1031 into analog audio signals and sends these signals to the loudspeaker 1027. Thus, sounds of the radio program broadcasted from the radio station are outputted from the loudspeaker 1027, and the user can thus be able to hear the sounds of the radio program.

Also, the control unit 1023 sends audio data obtained by the tuner unit 1031 to the storage medium 1029 and stores the audio data. Thus, sounds of radio programs can be recorded.

Further, the control unit 1023 can connect to the network NT 1000 sequentially through a communication control unit 1032 and a network interface 1033, and can access the portal server 1003 or any of the other servers 1004 to 1007 on the network NT 1000. Thus, various information and data can be transmitted/received to/from the portal server 1003 or any of the other servers 1004 to 1007.

The encoder/decoder unit 1034 decodes compression-coded content data received from the network NT 1000 via the network interface 1033 and communication control unit 1032, or compression-coded content data read from the storage medium 1029 or an external recording medium. The unit 1034 then sends the decoded content data to the display control unit 1024 and the audio control unit 1026.

Also, the encoder/decoder unit 1034 compression-codes uncompressed content data read from the external recording medium and audio data and the like given from the tuner unit 1031, and sends the compression-coded content data to the storage medium 1029.

Thus, the content data compression-coded by the encoder/decoder unit 1034 is stored into the storage medium 1029 under control from the control unit 1023.

A copyright management unit 1035 generates copyright management information corresponding to content data downloaded from the network NT 1000 sequentially through the network interface 1033 and the communication control unit 1032, and copyright management information corresponding to content data read from the external recording medium by the external recording medium recording/reproducing unit 1028.

The copyright management information generated by the copyright management unit 1035 is registered in the storage medium 1029, linked to content data under control from the control unit 1023.

Also, when the copyright management unit 1035 checks out content data linked to copyright management information between the storage medium 1029 and a specific external recording medium or checks in content data linked to the copyright management information between the specific external recording medium and the storage medium 1029, the copyright management unit 1035 appropriately updates the contents of the copyright management information corresponding to the content data, thereby to protect the copyright corresponding to the content data.

A page information generation unit 1036 interprets XML (extensible Markup Language) files or HTML (Hyper Text Markup Language) files received from the network NT 1000 sequentially through the network interface 1033 and the communication control unit 1032, generates video data to be displayed on the display unit 1025, and sends the generated video data to the display control unit 1024.

An authentication processing unit 1037 executes an authentication processing and the like to transmit authentication information sequentially through the communication control unit 1032 and the network interface 1033, to the portal server 1003 or any of the other servers 1004 to 1007 on the network NT 1000 connected through the network interface 1033.

An authentication information storage unit 1038 stores authentication information required when the authentication processing unit 1037 accesses the portal server 1003 or the any of the other servers 1004 to 1007.

A radio broadcast display control unit 1039 transmits a request signal for requesting radio broadcast information concerning the radio broadcast being received at present for user's listening, sequentially through the communication control unit 1032 and the network interface 1033, to a radio broadcast information distribution server 1006 corresponding to the radio station broadcasting the radio broadcast being received.

As a result, the radio broadcast display control unit 1039 receives the radio broadcast information transmitted from the radio broadcast information distribution server 1006 on the network NT 1000 sequentially through the network interface 1033 and the communication control unit 1032, and sends the received radio broadcast information to the display control unit 1024. Thus, the unit 1039 makes the display unit 1025 display the radio broadcast information consisting of the program name of the radio program being received currently, the tile and artist name of the song being received currently, and the like.

(3-2-2) Directory Management

Figure 25:
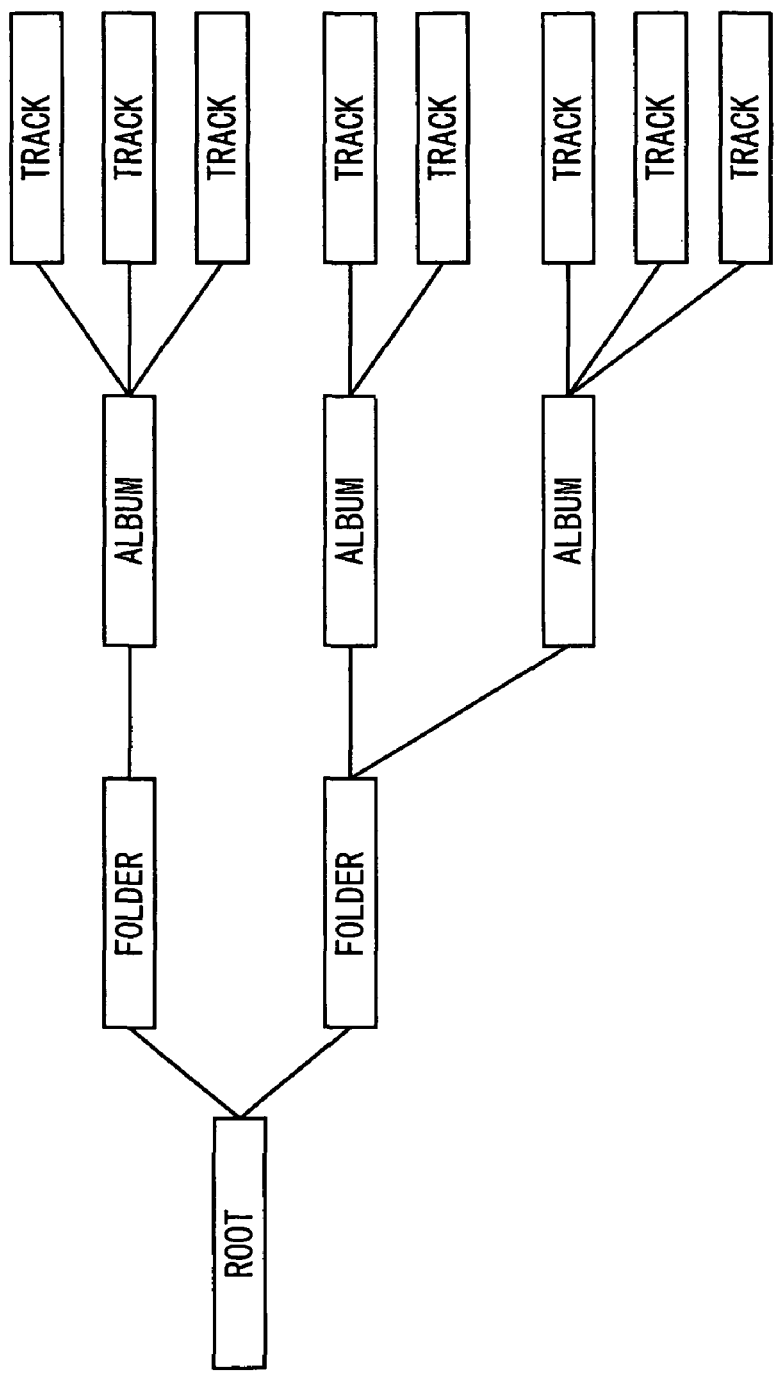
FIG. 25 is a tree view showing a directory structure.

The control unit 1023 of the client terminal 1002 manages the content data to be stored into the storage medium 1029, with use of a directory structure as shown in FIG. 25. At first, an arbitrary number of "folder" directories are created in the layer below the "root" directory wherein the number of "folder" directories is within a definite range. The "folder" directories are created, for example, corresponding to genres to which contents belong or owner users, respectively.

In the layer below the "folder" directories, an arbitrary number of "album" directories are created wherein the number of "album" directories is within a definite range. Every "album" directory corresponds to, for example, one album title. In the layer below the "album" directories, one or more "track" files which belong to any of the "album" directories are stored. Every "track" file constitutes one song, i.e., a content.

This kind of directory management concerning content data is carried out by database files stored in the storage medium 1029.

(3-3) Function Circuit Block Configuration of the Portal Server 1003

Figure 26:
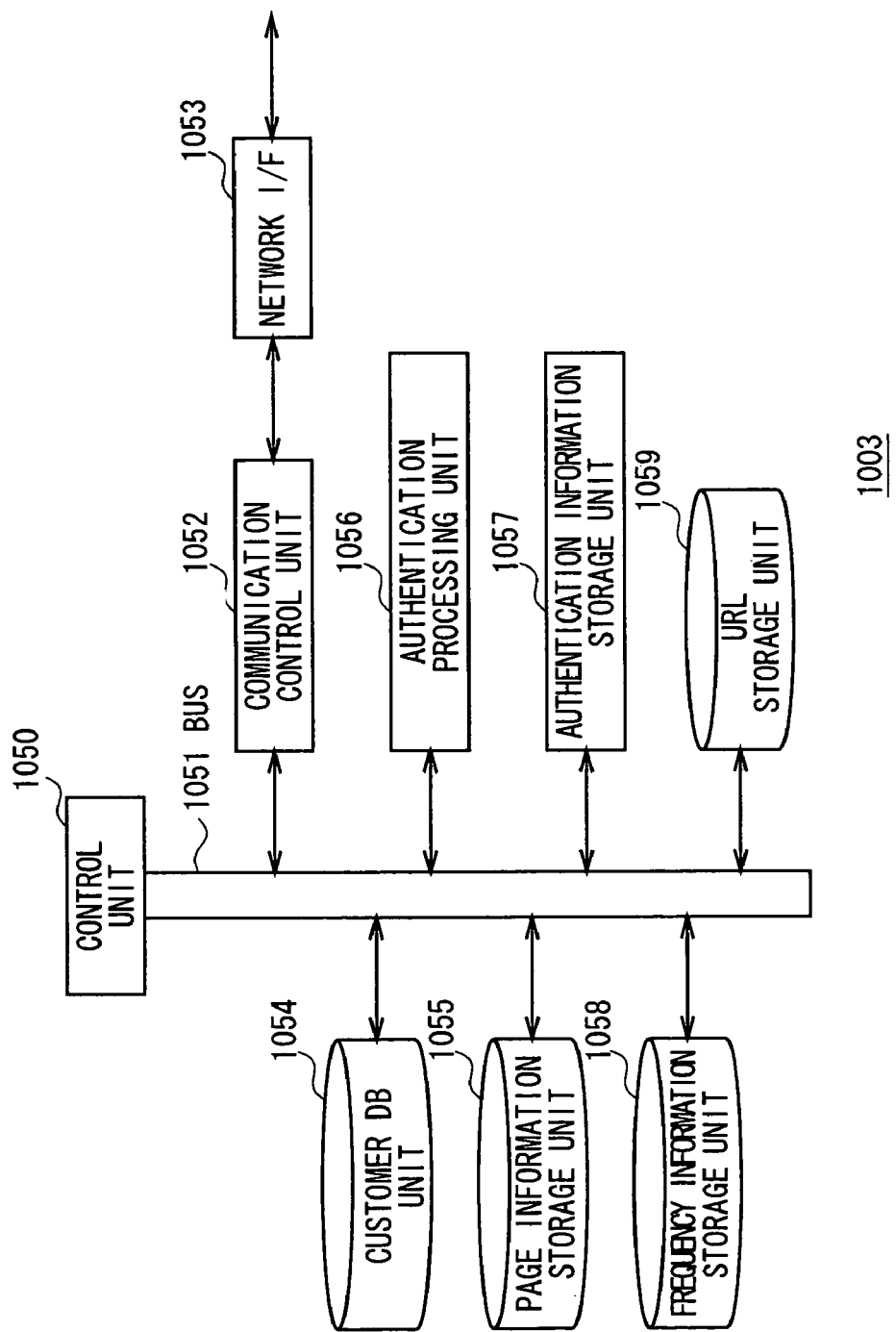
FIG. 26 is a block diagram showing the hardware configuration of function circuit blocks of a portal server.

Next, the hardware configuration of the function circuit block of the portal server 1003 will be described with reference to FIG. 26. The control unit 1050 in the portal server 1003 controls operations of respective circuits connected though the bus 1051.

A communication control unit 1052 transmits/receives various information to/from the client terminal 1002 or any of the other servers 1004 to 1008 via the network interface 1053, under control from the control unit 1050.

User ID (Identification) information and password information of users who have already signed up a contract with the management agency of the music-related service providing system 1000 are linked to each other and registered as customer information in a customer database unit 1054.

A page information storage unit 1055 stores page information and the like which are managed by the management agency of the music-related service providing system 1000.

The page information is written in the XML language or the like and includes URL (Uniform Resource Locator) information to access the music data distribution server 1004, sales server 1005, radio broadcast information distribution server 1006, internet radio server 1007, and the like.

When an authentication processing unit 1056 receives user ID information and password information transmitted from a client terminal 1002 sequentially through the network interface 1053 and communication control unit 1052, the authentication processing unit 1056 checks whether or not the received user ID information and password information have been registered as customer information in the customer database 1054, as a user authentication processing.

Upon completion of the user authentication processing, the authentication processing unit 1056 issues portal authentication result information (e.g., authentication session ID information described later) indicative of the user authentication processing result, and temporarily stores the issued portal authentication result information into the authentication information storage unit 1057.

At this time, if the user is authenticated to be a valid user as a result of the user authentication processing by the authentication processing unit 1056, the control unit 1050 transmits page information for contractants, which is stored in the page information storage unit 1055, to the client terminal 1002 sequentially through the communication control unit 1052 and network interface 1053, together with the portal authentication result information.

The control unit 1050 may be arranged such that, if the user is not authenticated to be a valid user as a result of the user authentication processing by the authentication processing unit 1056, the control unit 1050 transmits authentication error information together with authentication-failure notification page information indicative of a failed authentication, which is stored page information storage unit 1055, to the client terminal 1002 sequentially through the communication control unit 1052 and network interface 1053.

When the authentication processing unit 1056 receives, sequentially through the network interface 1053 and communication control unit 1052, portal authentication result information (e.g., an authentication ticket described later) obtained and transmitted from the client terminal 1002 of a user as a result of execution of an authentication processing for the user by the music data distribution server 1004, sales server 1005, and radio broadcast information distribution server 1006, the authentication processing unit 1056 compares the received portal authentication result information with portal authentication result information corresponding to the user, which has been temporarily stored in an authentication information storage unit 1057.

In this manner, the authentication processing unit 1056 executes a confirmation processing to check whether the portal authentication result information is valid or not, as an authentication processing with respect to the portal authentication result information received from the music data distribution server 1004, sales server 1005, and radio broadcast information distribution server 1006. The unit 1056 then sends confirmation result information indicative of the confirmation result, back to the music data distribution server 1004, sales server 1005, and radio broadcast information distribution server 1006 sequentially through the communication control unit 1052 and network interface 1053.

A frequency information storage unit 1058 stores area codes such as postal codes capable of specifying areas, frequency information indicative of broadcast frequencies of radio broadcasts receivable in the areas specified by the area codes, names of radio stations broadcasting the radio broadcasts (hereinafter called radio station names), and call signs as identification information unique to radio stations, linked to each other.

A URL storage unit 1059 stores the call signs respectively unique to radio stations for radio broadcasting, and URL information by which radio broadcast information (hereinafter called now-on-air information) can be obtained, with the call signs and the URL information linked to each other, wherein the radio broadcast information is provided from radio stations corresponding to the call signs, concerns radio programs being currently broadcasted, and contains names of the radio programs, titles of songs broadcasted at the current time point, and the like.

(3-4) Function Circuit Block Configuration of the Music Data Distribution Server 1004

Figure 27:
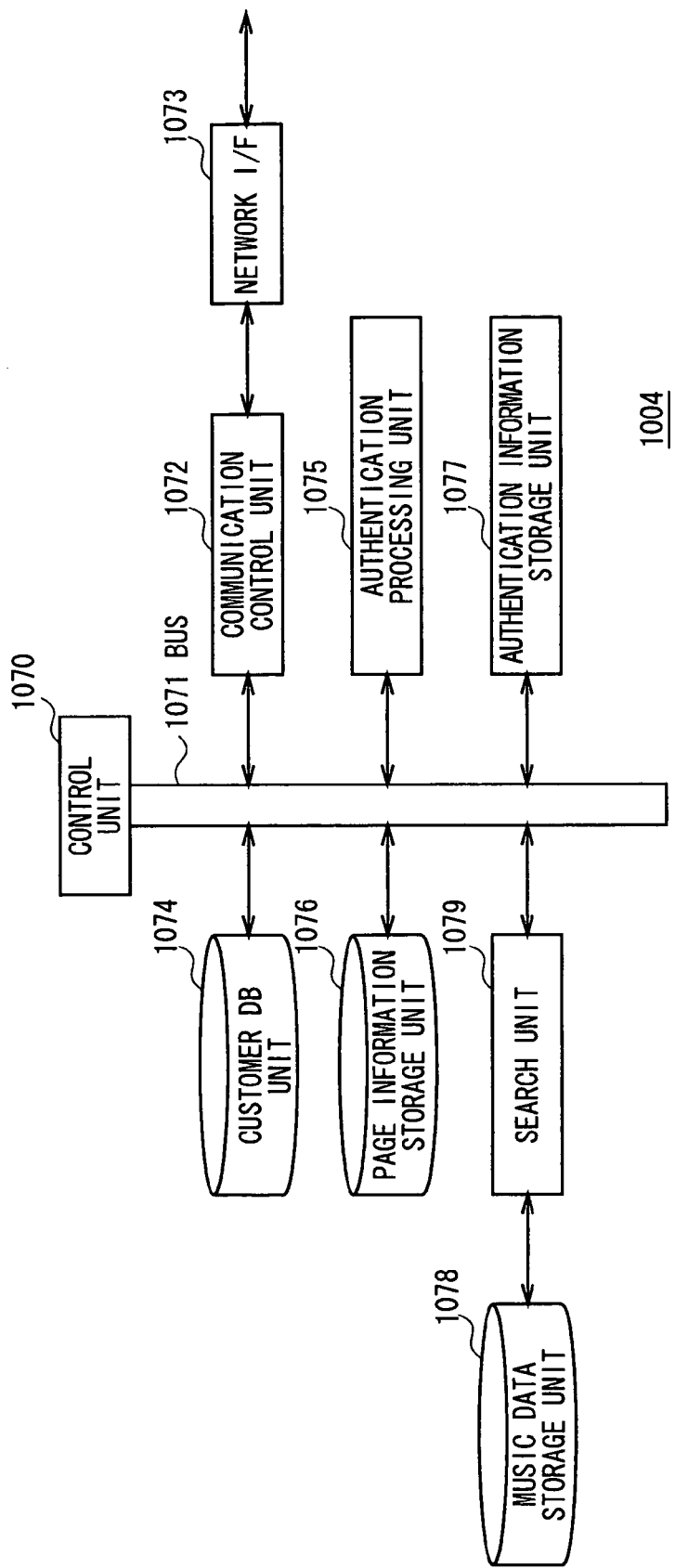
FIG. 27 is a block diagram showing the hardware configuration of function circuit blocks of a music data distribution server.

Next, with reference to FIG. 27, a hardware configuration based on the function circuit blocks of the music data distribution server 1004 will be described. A control unit 1070 in the music data distribution server 1004 controls operations of respective circuits connected through the bus 1071.

A communication control unit 1072 transmits/receives various information and various data such as content data and the like to/from the client terminal 1002, the portal server 1003, and the like through a network interface 1073, under control from the control unit 1070.

User ID information and password information of users who have already signed up a contract with the management agent of the music data distribution server 1004 are linked to each other and registered as customer information in a customer database unit 1074. However, if an authentication processing unit 1075 has a function to perform an authentication processing for authenticating a user, based on portal authentication result information issued from the portal server 1003 and transmitted from the client terminal 1002, there is no need of providing the customer database unit 1074.

A page information storage unit 1076 stores page information for music data distribution, which introduces downloadable music data managed by the music data distribution server 1004.

The page information for music data distribution is written in the XML language or the like, and allows the user who uses the client terminal 1002 to select music data which the user desires to download.

When the control unit 1070 receives a page information obtaining request signal for requesting page information for music data distribution, which is transmitted from the client terminal 1002, through the network interface 1073 and communication control unit 1072, the control unit 1070 transmits page information stored in the page information storage unit 1076, to the client terminal 1002 sequentially through the communication control unit 1072 and network interface 1073, in response to the received page information obtaining request signal.

When the authentication processing unit 1075 receives user ID information and password information of the user using the client terminal 1002, which are transmitted from the client terminal 1002, sequentially through the network interface 1073 and communication control unit 1072, the authentication processing unit 1075 confirms whether or not the received user ID information and password information have been registered as customer information in the customer database unit 1074, as a user authentication processing.

In another user authentication method different from the user authentication processing using the user ID information and password information, the authentication processing unit 1075 receives portal authentication result information (e.g., an authentication ticket described later) issued by the portal server 1003 and transmitted from the client terminal 1002 sequentially through the network interface 1073 and communication control unit 1072. The unit 1075 then transmits the received portal authentication result information to the portal server 1003 sequentially through the communication control unit 1072 and network interface 1073.

In response to the transmission of the portal authentication result information to the portal server 1003, the authentication processing unit 1075 receives confirmation result information returned from the portal server 1003, as a result of execution of an authentication processing (the confirmation processing described above) on the portal authentication result information, sequentially through the network interface 1073 and communication control unit 1072. Based on the received confirmation result information, the authentication processing unit 1075 confirms whether or not the user is a valid user who has signed up a contract with the management agent of the music-related service providing system 1000.

Upon completion of the user authentication processing, the authentication processing unit 1075 issues server authentication result information (e.g., service session ID information described later) indicative of a result of the user authentication processing.

At this time, if the user is authenticated as a valid user as a result of the user authentication processing by the authentication processing unit 1075, the control unit 1070 transmits page information for music data distribution, which is stored for contractants in the page information storage unit 1076, together with server authentication result information, to the client terminal 1002 sequentially through the communication control unit 1072 and network interface 1073.

Otherwise, if the user is not authenticated as a valid user as a result of the user authentication processing by the authentication processing unit 1075, the control unit 1070 transmits authentication error information together with authentication failure notification page information indicative of a failure in the authentication, which is stored in the page information storage unit 1076, to the client terminal 1002 sequentially through the communication control unit 1072 and network interface 1073.

Meanwhile, an authentication information storage unit 1077 temporarily stores server authentication result information issued by the authentication processing unit 1075, and also stores various authentication information which the authentication processing unit 1075 requires when performing a user authentication processing for the user using the client terminal 1002.

The music data storage unit 1078 stores plural music data items compression-coded in the above-mentioned ATRAC3 format, MP3 format, or the like, with the music data items linked respectively to search keys such as content ID information items.

When a download request signal is received sequentially through the network interface 1073 and communication control unit 1072 wherein the download request signal contains a search key for searching for music data which the user desires to download and is transmitted from the client terminal 1002 as a result of having transmitted page information for music data distribution to the client terminal 1002 and the signal also requests download of the music data to be downloaded, a search unit 1079 picks up the search key from the received download request signal.

Then, based on the search key, the search unit 1079 searches for music data which the user desires to download and satisfies a search condition suggested by the search key, among the plural music data items in the music data storage unit 1078.

Thus, the control unit 1070 transmits the desired music data to be downloaded, which has thus been searched for, to the client terminal 1002 sequentially through the communication control unit 1072 and network interface 1073.

Also, the control unit 1070 transmits, at this time, fee charge information for a fee charge processing issued by download of music data to the client terminal 1002, to an accounting server 1008 sequentially through the communication control unit 1072 and network interface 1073, thereby to make the accounting server 1008 execute a fee charge processing of charging the user a fee corresponding to the download of music data.

(3-5) Function Circuit Block Configuration of the Sales Server 1005

Figure 28:
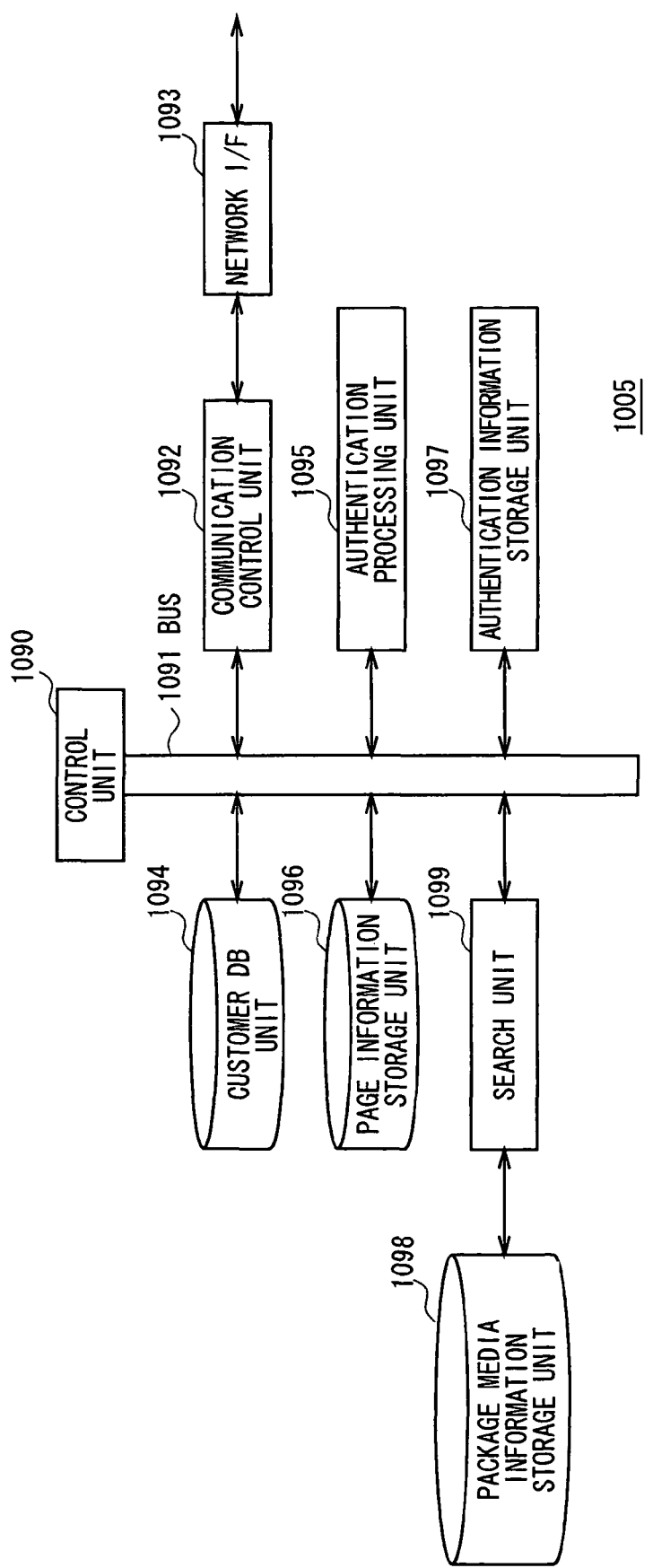
FIG. 28 is a block diagram showing the hardware configuration of function circuit blocks of a sales server.

Next, a hardware configuration based on the function circuit block of the sales server 1005 will be described with reference to FIG. 28. The control unit 1090 in the sales server 1005 controls operation of respective circuits connected through a bus 1091.

A communication control unit 1092 transmits/receives various information to/from the client terminal 1002, the portal server 1003 or the like via the network interface 1093, under control from the control unit 1090.

User ID information and password information of users who have already signed up a contract with the management agency of the sales server 1005 are linked to each other and registered as customer information in a customer database unit 1094. However, if an authentication processing unit 1095 has a function to perform an authentication processing for authenticating a user based on portal authentication result information issued from the portal server 1003 and transmitted from the client terminal 1002, there is no need of providing the customer database unit 1094.

A page information storage unit 1096 stores page information for sales of package media and the like which are managed by the sales server 1005 and introduce package media such as CDs and DVDS.

Note that the page information for sales of package media is written in the XML language or the like and allows the user who uses the client terminal 1002 to select package media such as CDs, DVDS, and the like which the user desires to purchase.

When the control unit 1090 receives a page information obtaining request signal for requesting page information for package media sales, which is transmitted from the client terminal 1002, sequentially through the network interface 1093 and communication control unit 1092, the control unit 1090 transmits page information for package media sales stored in the page information storage unit 1096, to the client terminal 1002 sequentially through the communication control unit 1092 and network interface 1093, in response to the received page information obtaining request signal.

When the authentication processing unit 1095 receives user ID information and password information of the user using the client terminal 1002, which are transmitted from the client terminal 1002, sequentially through the network interface 1093 and communication control unit 1092, the authentication processing unit 1095 confirms whether or not the received user ID information and password information have been registered as customer information in the customer database unit 1094, as a user authentication processing.

In another user authentication method different from the user authentication processing using the user ID information and password information, the authentication processing unit 1095 receives portal authentication result information (e.g., an authentication ticket described later) issued by the portal server 1003 and transmitted from the client terminal 1002 sequentially through the network interface 1093 and communication control unit 1092. The unit 1095 then transmits the received portal authentication result information to the portal server 1003 sequentially through the communication control unit 1092 and network interface 1093.

In response to the transmission of the portal authentication result information to the portal server 1003, the authentication processing unit 1095 receives confirmation result information returned from the portal server 1003, as a result of execution of an authentication processing (the confirmation processing described above) on the portal authentication result information, sequentially through the network interface 1093 and communication control unit 1092. Based on the received confirmation result information, the authentication processing unit 1095 confirms whether or not the user is a valid user who has signed up a contract with the management agent of the music-related service providing system 1000.

Upon completion of the user authentication processing, the authentication processing unit 1095 issues server authentication result information (e.g., service session ID information described later) indicative of a result of the user authentication processing.

At this time, if the user is authenticated as a valid user as a result of the user authentication processing by the authentication processing unit 1095, the control unit 1090 transmits page information for package media sales, which is stored for contractants in the page information storage unit 1096, together with server authentication result information, to the client terminal 1002 sequentially through the communication control unit 1092 and network interface 1093.

Otherwise, if the user is not authenticated as a valid user as a result of the user authentication processing by the authentication processing unit 1095, the control unit 1090 transmits authentication error information together with authentication failure notification page information indicative of a failure in the authentication, which is stored in the page information storage unit 1096, to the client terminal 1002 sequentially through the communication control unit 1092 and network interface 1093.

Meanwhile, an authentication information storage unit 1097 temporarily stores server authentication result information issued by the authentication processing unit 1095, and also stores various authentication information which the authentication processing unit 1095 requires when performing a user authentication processing for the user using the client terminal 1002.

A package media information storage unit 1098 stores information concerning plural package media such as CDs, DVDs, and the like to be sold (hereinafter called package media information), linked to search keys such as package media ID information and the like.

When a media information request signal is received sequentially through the network interface 1093 and communication control unit 1092 wherein the media information request signal requests package media information concerning a specific package medium such as a CD, DVD, or the like, which is transmitted from the client terminal 1002 as a result of having transmitted page information for package media sales to the client terminal 1002, a search unit 1099 picks up a search key for searching for the specific package medium from the received media information request signal.

Then, based on the search key, the search unit 1099 searches for package media information of the specific package medium which satisfies a search condition suggested by the search key, among the plural package media information items in the package media information storage unit 1098.

Thus, the control unit 1090 transmits the package media information, which has thus been searched for, to the client terminal 1002 sequentially through the communication control unit 1092 and network interface 1093. Thus, the package media information concerning the specific package medium is presented to the user.

As a result, when the control unit 1090 receives a purchase request signal to request purchase of the specific package medium described above from the client terminal 1002 sequentially through the network interface 1093 and communication control unit 1092, the control unit 1090 executes a purchase processing such as a shipping procedure or the like for shipping the specific package medium to the user using the client terminal 1002.

Also, the control unit 1090 transmits fee charge information for a processing of charging the user a fee issued by purchase of the specific package medium, to the accounting server 1008 sequentially through the communication control unit 1092 and network interface 1093, thereby to make the accounting server 1008 execute a fee charge processing of charging the user a fee corresponding to the purchase of the specific package medium.

Further, upon completion of the fee charge processing for the user by the accounting server 1008, the control unit 1090 transmits purchase completion page information indicative of completion of the purchase processing of the package medium to the client terminal 1002 sequentially through the communication control unit 1092 and network interface 1093.

(3-6) Function Circuit Block Configuration of the Radio Broadcast Station Distribution Server 1006

Figure 29:
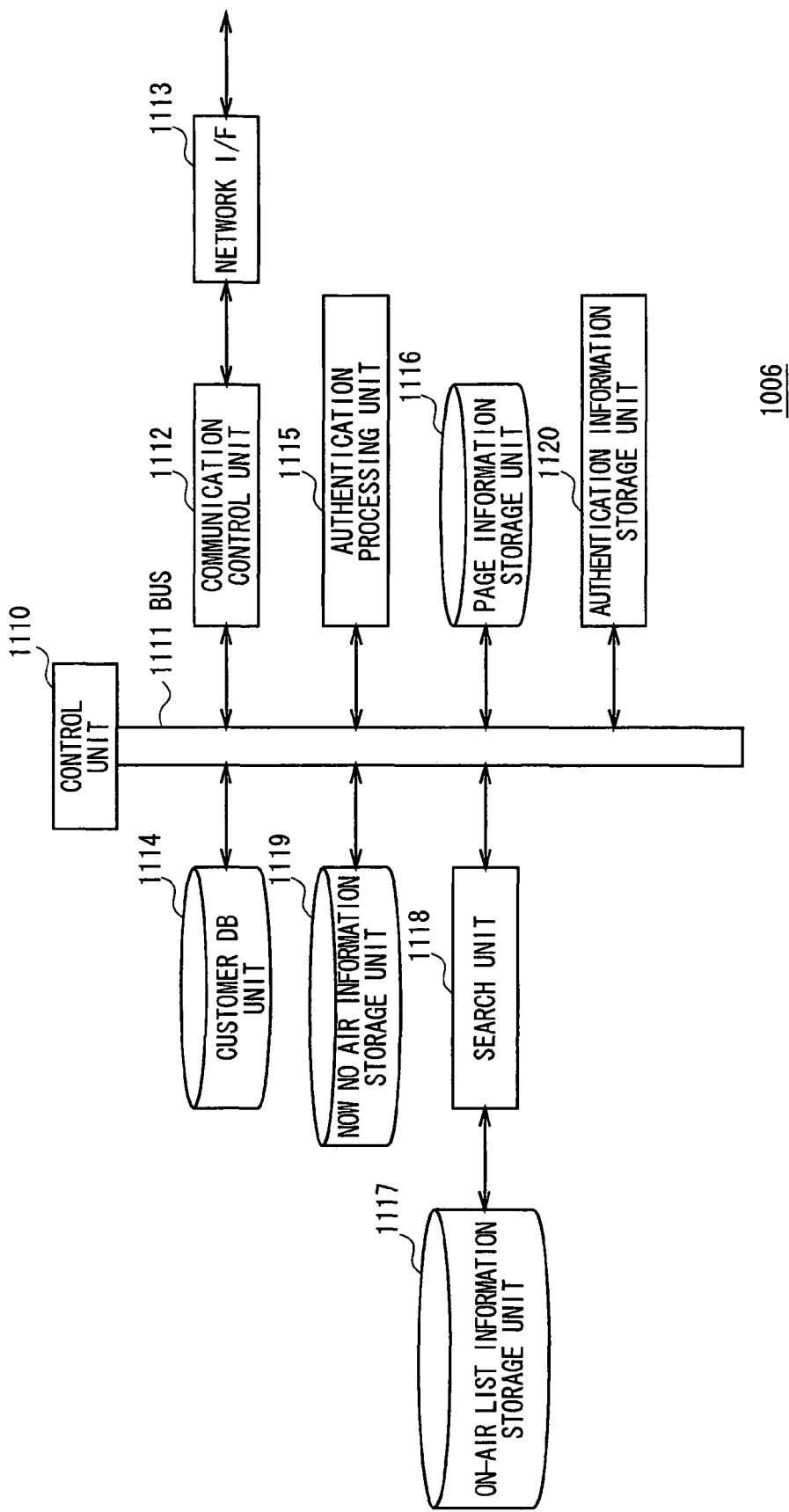
FIG. 29 is a block diagram showing the hardware configuration of function circuit blocks of a radio broadcast information distribution server.

Next, with reference to FIG. 29, a hardware configuration based on the function circuit blocks of the radio broadcast information distribution server 1006 will be described. A control unit 1110 in the radio broadcast information distribution server 1006 controls operations of respective circuits connected through a bus 1111.

A communication control unit 1112 transmits/receives various information to/from the client terminal 1002, the portal server 1003, and the like through a network interface 1113, under control from the control unit 1110.

User ID information and password information of users who have already signed up a contract with the management agent of the radio broadcast information distribution server 1006 are registered as customer information in a customer database unit 1114. However, if an authentication processing unit 1115 has a function to perform an authentication processing for authenticating a user based on portal authentication result information issued from the portal server 1003 and transmitted from the client terminal 1002, there is no need of providing the customer database unit 1114.

A page information storage unit 1116 stores page information or the like for on-air list information distribution, which is used to obtain radio broadcast information (hereinafter called particularly on-air list information) managed by the radio broadcast information distribution server 1006 and concerning radio programs already broadcasted from radio stations corresponding to the radio broadcast information distribution server 1006.

Note that the page information for on-air list information distribution is written in the XML language or the like, and includes input boxes and the like which allow the user using the client terminal 1002 to input date/time information of a radio program, a program name, or the like as a search key for the on-air list information which the user desires to obtain.

An on-air list information storage unit 1117 stores on-air list information generated by listing program names of radio programs which have already been broadcasted from the radio stations corresponding to the radio broadcast information distribution server 1006, program broadcast start time and end time thereof, titles, artist names, and song broadcast start time of songs broadcasted in the radio programs, and the like.

When the control unit 1110 receives a page information obtaining request signal for requesting page information for on-air list information distribution, which is transmitted from the client terminal 1002, sequentially through the network interface 1113 and communication control unit 1112, the control unit 1110 transmits page information for on-air list information distribution stored in the page information storage unit 1116, to the client terminal 1002 sequentially through the communication control unit 1112 and network interface 1113, in response to the received page information obtaining request signal.

As a result, the on-air list information request signal containing a search key for searching for desired on-air list information which the user desires to obtain, and requesting download of the on-air list information is transmitted from the client terminal 1002, wherein the search key is inputted through the page information for on-air list information distribution. A search unit 1118 receives thereby the on-air list information request signal sequentially through the network interface 1113 and communication control unit 1112, and then picks up the search key from the received on-air list information request signal.

Then, based on the search key, the search unit 1118 searches for, as on-air list information which the user desires to obtain, such part of a predetermined range which coincides with a search condition suggested by the search key, among the entire on-air list information in the on-air list information storage unit 1117.

Then, the control unit 1110 transmits the desired on-air list information to be obtained, which has thus been searched for, to the client terminal 1002 sequentially through the communication control unit 1112 and network interface 1113.

A now-on-air list information storage unit 1119 stores now-on-air information which includes program names of radio programs which are currently broadcasted from the radio stations corresponding to the radio broadcast information distribution server 1006, program broadcast start time and end time thereof, titles, artist names, and song broadcast start time of songs being currently broadcasted in the radio programs, and the like.

An authentication processing unit 1115 receives user ID information and password information of the user using the client terminal 1002, which are transmitted together with the now-on-air information request signal requesting obtaining of now-on-air information from the client terminal 1002, sequentially through the network interface 1113 and communication control unit 1112. Then, the authentication processing unit 1115 confirms whether or not the received user ID information and password information have been registered as customer information in a customer database unit 1114, in a user authentication processing.

In another user authentication method different from the user authentication processing using the user ID information and password information, the authentication processing unit 1115 receives portal authentication result information (e.g., an authentication ticket described later) issued by the portal server 1003 and transmitted from the client terminal 1002 sequentially through the network interface 1113 and communication control unit 1112. The unit 1115 then transmits the received portal authentication result information to the portal server 1003 sequentially through the communication control unit 1112 and network interface 1113.

In response to the transmission of the portal authentication result information to the portal server 1003, the authentication processing unit 1115 receives confirmation result information returned from the portal server 1003, as a result of execution of an authentication processing (i.e., the confirmation processing described above) on the portal authentication result information, sequentially through the network interface 1113 and communication control unit 1112. Based on the received confirmation result information, the authentication processing unit 1115 confirms whether or not the user is a valid user who has signed up a contract with the management agent of the music-related service providing system 1000.

Upon completion of the user authentication processing in this manner, the authentication processing unit 1115 issues server authentication result information (e.g., service session ID information described later) indicative of a result of the user authentication processing.

At this time, if the user is authenticated as a valid user as a result of the user authentication processing by the authentication processing unit 1115, the control unit 1110 transmits now-on-air information which is stored in the now-on-air information storage unit 1119, together with server authentication result information, to the client terminal 1002 sequentially through the communication control unit 1112 and network interface 1113.

Otherwise, if the user is not authenticated as a valid user as a result of the user authentication processing by the authentication processing unit 1115, the control unit 1110 transmits authentication error information together with authentication failure notification page information indicative of a failure in the authentication, which is stored in the page information storage unit 1116, to the client terminal 1002 sequentially through the communication control unit 1112 and network interface 1113.

Thus, when obtaining of now-on-air information is requested from a user and the user is then authenticated as a valid user, the control unit 1110 distributes now-on-air information. However, when the user is not authenticated as a valid user, the control unit 1110 does not allow the user to receive the radio broadcast information distribution service such as a now-on-air information distribution service provided by the radio broadcast information distribution server 1006.

Meanwhile, an authentication information storage unit 1120 temporarily stores server authentication result information issued by the authentication processing unit 1115, and also stores various authentication information which the authentication processing unit 1115 requires when performing a user authentication processing for the user using the client terminal 1002.

(3-7) Outlines of Processing in Servers

Next, with reference to sequence charts shown in FIGS. 30 to 35, descriptions will be made of outlines of processing executed between the client terminal 1002 and the portal server 1003, and processing executed between the client terminal 1002 and the other servers including the music data distribution server 1004, sales server 1005, and radio broadcast information distribution server 1006.

(3-7-1) A Procedure of User Authentication Processing Between the Client Terminal 1002 and the Portal Server 1003

Figure 30:
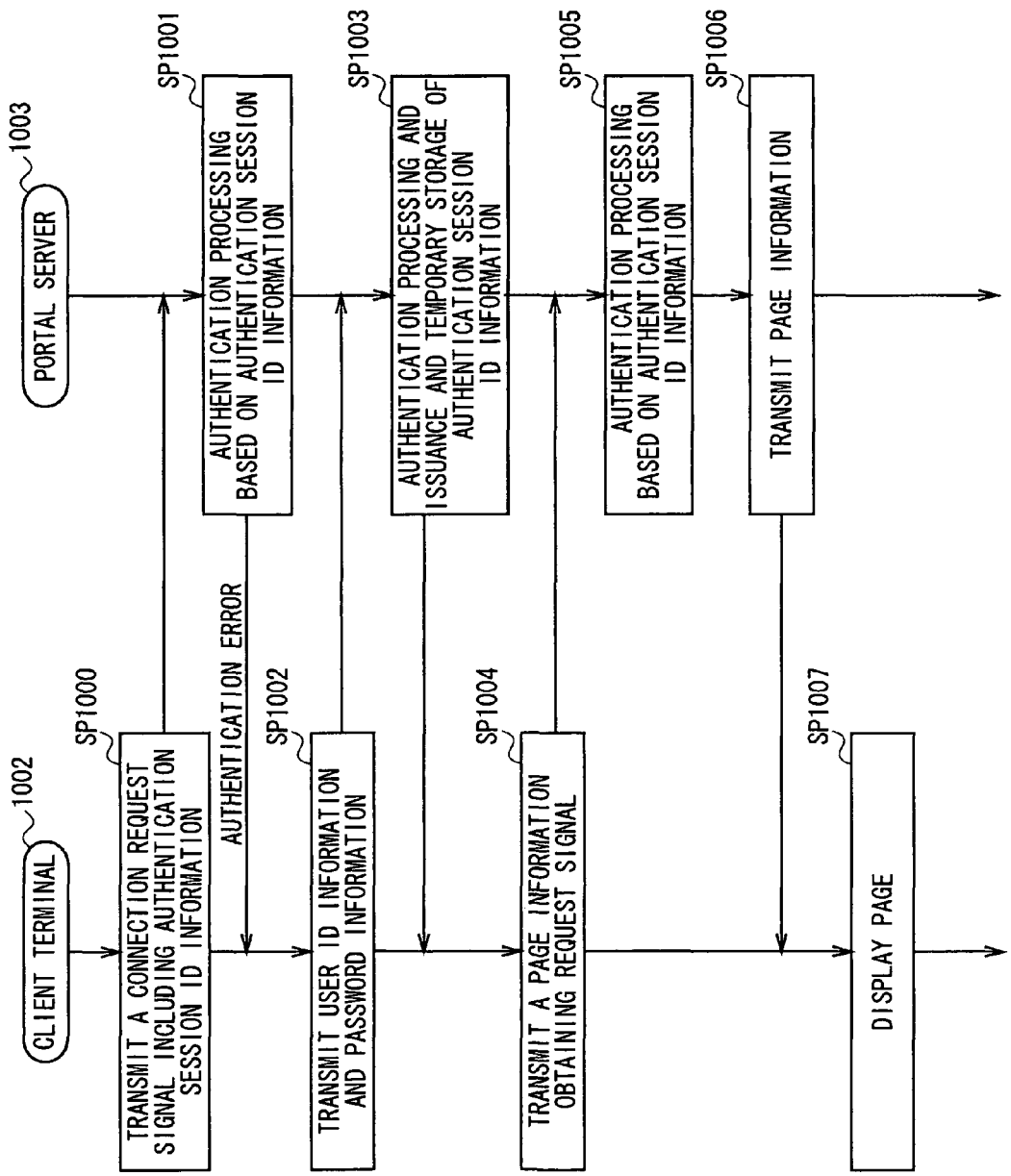
FIG. 30 is a sequence chart showing a user authentication processing procedure between the client terminal and the portal server.

At first, the user authentication processing executed between the client terminal 1002 and the portal server 1003 will be described with reference to FIG. 30.

The control unit 1023 in the client terminal 1002 of a user who has signed up a contract with the management agent of the music-related service providing system 1000 starts an authentication request processing, for example, when an operation of powering on the client terminal 1002 is taken or the user presses down a specific operation button of the operation input unit 1020 and an operation input signal recognized by the operation input unit 1020 is converted by the input processing unit 1021 into an operation command and then supplied.

As the client terminal 1002 starts the authentication request processing, the control unit 1023 generates a connection request signal containing authentication session ID information or the like temporarily stored in the authentication information storage unit 1038, in the step SP1000, and transmits the generated connection request signal to the portal server 1003 sequentially through the communication control unit 1032 and the network interface 1033.

Note that the authentication session ID information is identification information which is issued by the portal server 1003 to identify individual communication connection states (i.e., sessions) every time when the client terminal 1002 and the portal server 1003 connect for communications to execute various processing such as a user authentication processing and the like.

Where used for the user authentication processing or the like, the authentication session ID information has a predetermined validity period (e.g., 1 minute or so) with reference to the time point of issue from the portal server 1003.

Therefore, if the authentication session ID information cannot be presented to the portal server 1003 within the validity period, the client terminal 1002 which has obtained authentication session ID information from the portal server 1003 determines that the communication connection status specified by the authentication session ID information is disconnected by the portal server 1003.

Thus, the portal server 1003 prevents authentication session ID information issued in the past from being illegally used for the user authentication processing or the like by users who have not signed up any contract with the management agent of the music-related service providing system 1000.

The authentication session ID information temporarily stored in the authentication information storage unit 1038 was issued from the portal server 1003 when the client terminal 1002 and the portal server 1003 once connected for communications to execute a user authentication processing or the like.

As the connection request signal is transmitted from the client terminal 1002, the control unit 1050 of the portal server 1003 receives the connection request signal sequentially through the network interface 1053 and communication control unit 1052, in the step SP1001, and transmits authentication session ID information contained in the received connection request signal, to the authentication processing unit 1056.

Further, the authentication processing unit 1056 executes a user authentication processing based on the authentication session ID information received as a connection request signal from the client terminal 1002, under control from the control unit 1050.

As a result, if the authentication processing unit 1056 cannot authenticate the user using the client terminal 1002 as a valid user due to expiration of the validity period of the authentication session ID information received from the client terminal 1002 or the like, the control unit 1050 transmits authentication error information indicative of the error in authentication, to the client terminal 1002 sequentially through the communication control unit 1052 and network interface 1053.

In the step SP1002, the control unit 1023 of the client terminal 1002 receives the authentication error information transmitted from the portal server 1003 sequentially through the network interface 1033 and communication control unit 1032. In response to this information, the control unit 1023 reads user ID information, password information, and the like stored in an authentication information storage unit 1038, and transmits the read user ID information, password information, and the like to the portal server 1003 sequentially through the communication control unit 1032 and the network interface 1033.

In the step SP1003, the control unit 1050 of the portal server 1003 receives the user ID information, password information, and the like transmitted from the client terminal 1002 sequentially through the network interface 1053 and the communication control unit 1052, and transmits the received user ID information, password information, and the like to the authentication processing unit 1056.

Then, the authentication processing unit 1056 detects whether or not the user ID information, password information, and the like received from the client terminal 1002 are included in customer information registered in the customer database unit 1054, as a user authentication processing under control from the control unit 1050.

As a result, if the user using the client terminal 1002 is authenticated as a valid user, the authentication processing unit 1056 issues, as portal authentication result information, authentication session ID information and the like with respect to the current communication connection state between the client terminal 1002 and the portal server 1003, under control from the control unit 1050, and temporarily stores the authentication session ID information and the like issued to the client terminal 1002, into the authentication information storage unit 1057.

Then, the control unit 1050 transmits the authentication session ID information and the like issued to the client terminal 1002 by the authentication processing unit 1056, to the client terminal 1002 sequentially through the communication control unit 1052 and the network interface 1053.

In the step SP1004, the control unit 1023 of the client terminal 1002 receives the authentication session ID information and the like transmitted from the portal server 1003 sequentially through the network interface 1033 and the communication control unit 1032, and sends the received authentication session ID information and the like to the authentication processing unit 1037.

Further, the authentication processing unit 1037 temporarily stores the authentication session ID information and the like received from the portal server 1003 into the authentication information storage unit 1038, under control from the control unit 1023.

The control unit 1023 then transmits the page information obtaining request signal for requesting page information from the portal server 1003, together with the authentication session ID information and the like received from the portal server 1003 and temporarily stored in the authentication information storage unit 1038, to the portal server 1003 sequentially through the communication control unit 1032 and network interface 1033.

In the step SP1005, the control unit 1050 of the portal server 1003 receives the page information request signal, authentication session ID information, and the like transmitted from the client terminal 1002, sequentially through the network interface 1053 and communication control unit 1052, and sends the received authentication session ID information and the like, to the authentication processing unit 1056.

The authentication processing unit 1056 hence executes a user authentication processing by comparing the authentication session ID information and the like received from the client terminal 1002, with the authentication session ID information and the like issued to the client terminal 1002 and stored temporarily in the authentication information storage unit 1057, under control from the control unit 1050.

As a result, if the user using the client terminal 1002 is authenticated as a valid user, the authentication processing unit 1056 determines that the obtaining request for page information from the client terminal 1002 is an authorized request and extends the validity period of the authentication session ID information and the like issued to the client terminal 1002, in the step SP1006.

The control unit 1050 hence reads the page information which has been requested from the user, from the page information storage unit 1055, and transmits the read page information together with the authentication session ID information and the like having the validity period extended by the authentication processing unit 1056, to the client terminal 1002 sequentially through the communication control unit 1052 and network interface 1053.

The control unit 1023 of the client terminal 1002 receives the page information transmitted from the portal server 1003 and the authentication session ID information and the like having the extended validity period sequentially through network interface 1033 and the communication control unit 1032, and sends the received page information to the page information generation unit 1036 as well as the authentication session ID information and the like having the extended validity period to the authentication processing unit 1037, in the step SP1007.

Based on the page information given from the control unit 1023, the page information generation unit. 1036 generates video data of a page in which links to the music data distribution server 1004, sales server 1005, and radio broadcast information distribution server 1006 are embedded, and sends the generated video data to the display control unit 1024.

The display control unit 1024 performs a digital/analog conversion processing on the video data supplied from the page information generation unit 1036, and sends analog video signals thus obtained to the display unit 1025, thereby to make the display unit 1025 display the page of the portal server 1003 as a video based on the analog video signals.

Also, the authentication processing unit 1037 temporarily stores the authentication session ID information and the like having the extended validity period and received from the portal server 1003, into the authentication information storage unit 1038, by overwriting the authentication session ID information and the like before extension of the validity period, under control from the control unit 1023. In this manner, the authentication session ID information and the like temporarily stored in the foregoing step SP1004 are updated to the authentication session ID information and the like having the extended validity period.

(3-7-2) A Procedure of the User Authentication Processing Between the Client Terminal 1002 and Each of the Servers 1004 to 1006

Next, with reference to FIG. 31, a description will be made of the user authentication processing executed between the client terminal 1002 and the music data distribution server 1004, sales server 1005, and radio broadcast information distribution server 1006.

In this case, there is a user authentication processing of this kind (hereinafter called an indirect access authentication processing) which is executed in a manner that the client terminal 1002 once obtains page information from the portal server 1003 as described previously with reference to FIG. 30 and subsequently accesses the music data distribution server 1004, sales server 1005, and radio broadcast information distribution server 1006, according to links embedded in the page information.

There is another user authentication processing of this kind (hereinafter called a direct access authentication processing) which is executed in a manner that the client terminal 1002 does not obtain page information from the portal server 1003 but directly accesses the music data distribution server 1004, sales server 1005, and radio broadcast information distribution server 1006, according to URL information and the like registered as bookmarks in advance.

The indirect access authentication processing can, however, be also carried out in the same manner as described above whichever of the music data distribution server 1004, sales server 1005, and radio broadcast information distribution server 1006 is combined with the client terminal 1002.

On the other side, the direct access authentication processing can also be carried out in the same manner as described above whichever of the music data distribution server 1004, sales server 1005, and radio broadcast information distribution server 1006 is combined with the client terminal 1002.

Between the indirect and direct access authentication processing, the only difference exists in the method of obtaining URL information used to access the music data distribution server 1004, sales server 1005, and radio broadcast information distribution server 1006 from the client terminal 1002. After obtaining the URL information, both the indirect and direct access authentication processing can be carried out in the same procedure.

Therefore, in the following, the music data distribution server 1004 is taken as a representative access destination in order to simplify the following description, and the direct and indirect access authentication processing are explained together representatively as one user authentication processing.

At first, in the step SP1010, the control unit 1023 of the client terminal 1002 transmits service session ID information and the like read from the authentication information storage unit 1038, together with a page information obtaining request signal for requesting and obtaining page information for music data distribution (which can be replaced respectively with page information for package media sales and page information for on-air list information distribution in case of the sales server 1005 and the radio broadcast information distribution server 1006), to the music data distribution server 1004 sequentially through the communication control unit 1032 and network interface 1033, in accordance with the URL information embedded as a link in page information or the URL information or the like registered in advance as a bookmark.

Note that the service session ID information is identification information which is issued by the music data distribution server 1004, sales server 1005, and radio broadcast information distribution server 1006 accessed from the client terminal 1002 to identify individual communication connection states (i.e., sessions) whenever the client terminal 1002 connects to the music data distribution server 1004, sales server 1005, and radio broadcast information distribution server 1006 for communications to execute various processing such as a user authentication processing and the like.

Where used for the user authentication processing or the like, the service session ID information has a predetermined validity period (e.g., 1 minute or so) with reference to the time point of issue from the music data distribution server 1004, sales server 1005, or radio broadcast information distribution server 1006, like the authentication session ID information described previously.

Therefore, if the service session ID information cannot be presented to the music data distribution server 1004, sales server 1005, or the radio broadcast information distribution server 1006 as an issuer within the validity period, the client terminal 1002 which has obtained the service session ID information from any of the servers 1004 to 1006 determines that the communication connection status specified by the service session ID information is disconnected by the music data distribution server 1004, sales server 1005, or the radio broadcast information distribution server 1006 as the issuer.

Thus, the music data distribution server 1004, sales server 1005, and the radio broadcast information distribution server 1006 prevent, service session ID information issued in the past from being illegally used for the user authentication processing or the like by users who have not signed up any contract with the management agent of the music-related service providing system 1000.

The service session ID information temporarily stored in the authentication information storage unit 1038 was issued from the music data distribution server 1004, sales server 1005, or radio broadcast information distribution server 1006 as the access destination when the client terminal 1002 connected to the music data distribution server 1004, sales server 1005, or the radio broadcast information distribution server 1006 for communications to execute a user authentication processing or the like.

In the step SP1011, the control unit 1070 of the music data distribution server 1004 receives the page information obtaining request signal, service session ID information, and the like transmitted from the client terminal 1002, sequentially through the network interface 1073 and the communication control unit 1072, and sends the received service session ID information and the like to the authentication processing unit 1075.

The authentication processing unit 1075 hence executes a user authentication processing by comparing the service session ID information and the like received from the client terminal 1002, with the service session ID information and the like which has already been temporarily stored in the authentication information storage unit 1077, under control from the control unit 1070.

As a result, if the authentication processing unit 1075 cannot authenticate the user using the client terminal 1002 as a valid user, for example, because the validity period of the service session ID information received from the client terminal 1002 has already expired, the authentication processing unit 1075 determines that the request from the client terminal 1002 for obtaining page information for music data distribution is not a valid request.

Further, if the authentication processing unit 1075 thus cannot authenticate the user using the client terminal 1002 as a valid user, the control unit 1070 transmits authentication error information indicative of the error in authentication and a shop code identifying the music data distribution server 1004, to the client terminal 1002 sequentially through the communication control unit 1072 and network interface 1073.

In the step SP1012, the control unit 1023 of the client terminal 1002 receives the authentication error information and shop code transmitted from the music data distribution server 1004 sequentially through the network-interface 1033 and communication control unit 1032. From the authentication error information received, the control unit 1023 recognizes that the user has not been authenticated as a valid user by the music data distribution server 1004, and the control unit 1023 temporarily stores the shop code received from the music data distribution server 1004 into the authentication information storage unit 1038.

Then, the control unit 1023 generates an authentication ticket issuance request signal which requests issuance of an authentication ticket from the portal server 1003 to access the music data distribution server 1004, and transmits the generated authentication ticket issuance request signal together with the shop code of the music data distribution server 1004 and the authentication session ID information received already from the portal server 1003 and stored temporarily in the authentication information storage unit 1038, to the portal server 1003 sequentially through the communication control unit 1032 and network interface 1033.

In the step SP1013, the control unit 1050 of the portal server 1003 receives the authentication ticket issuance request signal, the shop code, and the authentication session ID information transmitted from the client terminal 1002, sequentially through the network interface 1053 and communication control unit 1052, and sends them to the authentication processing unit 1056.

The authentication processing unit 1056 hence executes a user authentication processing by comparing the authentication session ID information and the like received from the client terminal 1002, with the authentication session ID information and the like stored already in the authentication information storage unit 1057, under control from the control unit 1050.

As a result, if the authentication processing unit 1056 cannot authenticate the user using the client terminal 1002 as a valid user, for example, because the validity period of the authentication session ID information received from the client terminal 1002 has already expired, the authentication processing unit 1056 determines that the request from the client terminal 1002 for issuance of an authentication ticket is not a valid request.

Further, if the authentication processing unit 1056 thus cannot authenticate the user using the client terminal 1002 as a valid user, the control unit 1050 transmits authentication error information indicative of the error in authentication to the client terminal 1002 sequentially through the communication control unit 1052 and network interface 1053.

Otherwise, if the user using the client terminal 1002 is authenticated as a valid user, for example, because the validity period of the authentication session ID information received from the client terminal 1002 has not yet expired, the authentication processing unit 1056 determines that the request from the client terminal 1002 for issuance of an authentication ticket is a valid request.

If the user using the client terminal 1002 is thus authenticated as a valid user by the authentication processing unit 1056, the control unit 1050 goes to the step SP1018 described later.

In the step SP1014, the control unit 1023 of the client terminal 1002 receives the authentication error information transmitted from the portal server 1003 sequentially through the network interface 1033 and communication control unit 1032. Then, the control unit 1023 reads user ID information, password information, and the like stored in the authentication information storage unit 1038, and transmits the read user ID information, password information, and the like to the portal server 1003 sequentially through the communication control unit 1032 and the network interface 1033.

In the step SP1015, the control unit 1050 of the portal server 1003 receives the user ID information, password information, and the like transmitted from the client terminal 1002 sequentially through the network interface 1053 and the communication control unit 1052, and sends the received user ID information, password information, and the like to the authentication processing unit 1056.

The authentication processing unit 1056 hence detects whether or not the user ID information, password information, and the like received from the client terminal 1002 are included in customer information registered in the customer database unit 1054, thus executing a user authentication processing, under control from the control unit 1050.

As a result, if the user using the client terminal 1002 is authenticated as a valid user, the authentication processing unit 1056 issues, as portal authentication result information, authentication session ID information and the like with respect to the current communication connection state between the client terminal 1002 and the portal server 1003, under control from the control unit 1050, and temporarily stores the authentication session ID information and the like issued to the client terminal 1002, into the authentication information storage unit 1057.

Then, the control unit 1050 transmits the authentication session ID information and the like issued to the client terminal 1002 by the authentication processing unit 1056, to the client terminal 1002 sequentially through the communication control unit 1052 and the network interface 1053.

In the step SP1016, the control unit 1023 of the client terminal 1002 receives the authentication session ID information and the like transmitted from the portal server 1003 sequentially through the network interface 1033 and the communication control unit 1032, and temporarily stores the received authentication session ID information and the like into the authentication information storage unit 1038.

The control unit 1023 then generates an authentication ticket issuance request signal which requests issuance of an authentication ticket from the portal server 1003, and transmits the generated authentication ticket issuance request signal together with the shop code already stored temporarily in the authentication information storage unit 1038 and the authentication session ID information and the like also stored at this time, to the portal server 1003 sequentially through the communication control unit 1032 and network interface 1033.

In the present embodiment, the shop code has been temporarily stored in the authentication information storage unit 1038 in the client terminal 1002. The embodiment is not limited thereto but it is possible to transmit the shop code to the portal server 1003 in the step SP1016 without temporarily storing the shop code into the authentication information storage unit 1038 in the client terminal 1002 if the shop code is continuously transmitted/received when the processing from the step SP1012 to the step SP1016 are executed.

In the step SP1017, the control unit 1050 of the portal server 1003 receives the authentication ticket issuance request signal, shop code, authentication session ID information, and the like transmitted from the client terminal 1002, sequentially through the network interface 1053 and communication control unit 1052, and sends them to the authentication processing unit 1056.

The authentication processing unit 1056 hence executes a user authentication processing by comparing the authentication session ID information and the like received from the client terminal 1002, with the authentication session ID information and the like stored already in the authentication information storage unit 1057, under control from the control unit 1050.

As a result, if the user using the client terminal 1002 is authenticated as a valid user, for example, because the validity period of the authentication session ID information or the like received from the client terminal 1002 has not yet expired, the authentication processing unit 1056 determines that the request from the client terminal 1002 for issuance of an authentication ticket is a valid request.

If the user using the client terminal 1002 is thus authenticated as a valid user by the authentication processing unit 1056, the control unit 1050 goes to the next step SP1018 described later.

In the step SP1018, the authentication processing unit 1056 issues an authentication ticket and the like, as portal authentication result information which enables access to the music data distribution server 1004 designated by the shop code, based on the shop code and authentication ticket issuance request signal received from the client terminal 1002 in the foregoing step SP1017, under control from the control unit 1050.

The authentication processing unit 1056 temporarily stores the issued authentication ticket and the like into the authentication information storage unit 1057, and extends the validity period of the authentication session ID information or the like issued to the client terminal 1002, under control from the control unit 1050.

Hence, the control unit 1050 transmits the authentication ticket and the like together with the authentication session ID information and the like having a validity period extended by the authentication processing unit 1056, to the client terminal 1002 sequentially through the communication control unit 1052 and network interface 1053.

In the step SP1019, the control unit 1023 of the client terminal 1002 receives the authentication ticket and the like transmitted from the portal server 1003, and the authentication session ID information and the like having the extended validity period, sequentially through the network interface 1033 and the communication control unit 1032, and sends the received authentication session ID information to the authentication processing unit 1037.

Then, the control unit 1023 transmits the authentication ticket and the like received from the portal server 1003, together with an authentication request signal, to the music data distribution server 1004 sequentially through the communication control unit 1032 and network interface 1033.

Also, the authentication processing unit 1037 temporarily stores the authentication session ID information and the like having the extended validity period and received from the portal server 1003, into the authentication information storage unit 1038, by overwriting the authentication session ID information and the like before extension of the validity period, under control from the control unit 1023. In this manner, the authentication session ID information and the like temporarily stored in the foregoing step SP1016 are updated to the authentication session ID information and the like having the extended validity period.

In the step SP1020, the control unit 1070 of the music data distribution server 1004 receives the authentication request signal, authentication ticket, and the like transmitted from the client terminal 1002, sequentially through the network interface 1073 and communication control unit 1072.

The control unit 1070 then transmits the authentication ticket and the like received from the client terminal 1002, together with an authentication ticket confirmation request signal for requesting confirmation of the authentication ticket and the like, to the portal server 1003 sequentially through the communication control unit 1072 and network interface 1073.

In the step SP1021, the control unit 1050 of the portal server 1003 receives the authentication ticket confirmation request signal, authentication ticket, and the like transmitted from the music data distribution server 1004, sequentially through the network interface 1053 and communication control unit 1052, and sends the received authentication ticket confirmation request signal, authentication ticket, and the like to the authentication processing unit 1056.

Then, in response to the authentication ticket confirmation request signal, the authentication processing unit 1056 executes a confirmation processing on the authentication ticket received from the music data distribution server 1004, by comparing the authentication ticket and the like received from the music data distribution server 1004 with the authentication ticket and the like temporarily stored already in the authentication information storage unit 1057, under control from the control unit 1050.

As a result, if the authentication processing unit 1056 confirms that the authentication ticket and the like received from the music data distribution server 1004 are a valid authentication ticket and the like, the control unit 1050 transmits confirmation result information indicating that the authentication ticket and the like are a valid authentication ticket and the like, to the music data distribution server 1004 sequentially through the communication control unit 1052 and network interface 1053.

In the step SP1022, the control unit 1070 of the music data distribution server 1004 receives the confirmation result information transmitted from the portal server 1003, sequentially through the network interface 1073 and communication control unit 1072, and sends the received confirmation result information to the authentication processing unit 1075.

In response to the confirmation result information, the authentication processing unit 1075 hence issues service session ID information and the like, as server authentication result information, with respect to the communication connection state at present between the client terminal 1002 and the music data distribution server 1004, under control from the control unit 1070, and temporarily stores the issued service session ID information and the like into the authentication information storage unit 1077.

Also, the control unit 1070 transmits the service session ID information and the like issued to the client terminal 1002 from the authentication processing unit 1075, to the client terminal 1002 sequentially through the communication control unit 1072 and network interface 1073.

In the step SP1023, the control unit 1023 of the client terminal 1002 receives the service session ID information and the like transmitted from the music data distribution server 1004, sequentially through the network interface 1033 and communication control unit 1032, and temporarily stores the received service session ID information and the like into the authentication information storage unit 1038 by the authentication processing unit 1037.

The control unit 1023 hence transmits a page information obtaining request signal which requests page information for music data distribution, together with the service session ID information and the like received from the music data distribution server 1004 and temporarily stored in the authentication information storage unit 1038, to the music data distribution server 1004 sequentially through the communication control unit 1032 and network interface 1033.

In the step SP1024, the control unit 1070 of the music data distribution server 1004 receives the page information obtaining request signal, service session ID information, and the like transmitted from the client terminal 1002, sequentially through the network interface 1073 and communication control unit 1072, and sends the received service session ID information and the like to the authentication processing unit 1075.

The authentication processing unit 1075 hence executes a user authentication processing by comparing the service session ID information and the like received from the client terminal 1002, with the service session ID information and the like issued to the client terminal 1002 in the step SP1022 and already stored temporarily in the authentication information storage unit 1077, under control from the control unit 1070.

As a result, if the user using the client terminal 1002 is authenticated as a valid user, for example, because the validity period of the service session ID information and the like received from the client terminal 1002 has not yet expired, the authentication processing unit 1075 determines that the request from the client terminal 1002 for obtaining page information for music data distribution is a valid request.

If the user using the client terminal 1002 is thus authenticated as a valid user by the authentication processing unit 1075, the control unit 1070 goes to the next step SP1025.

In the step SP1025, the control unit 1070 reads the page information for music data distribution, which has been requested from the user, from the page information storage unit 1076, and extends the validity period of the service session ID information and the like issued to the client terminal 1002, by the authentication processing unit 1075.

Further, the control unit 1070 transmits the page information for music data distribution, read from the page information storage unit 1076, together with the service session ID information and the like having the validity period extended by the authentication processing unit 1075, to the client terminal 1002 sequentially through the communication control unit 1072 and network interface 1073.

In the step 1026, the control unit 1023 of the client terminal 1002 receives the page information for music data distribution transmitted from the music data distribution server 1004 and the service session ID information and the like having the extended validity period, sequentially through the network interface 1033 and communication control unit 1032, sends the received page information for music data distribution to the page information generation unit 1036, and sends the service session ID information and the like received from the music data distribution server 1004 to the authentication processing unit 1037.

Hence, the authentication processing unit 1037 temporarily stores the service session ID information and the like having the extended validity period and received from the music data distribution server 1004, into the authentication information storage unit 1038, by overwriting the service session ID information and the like before extension of the validity period, under control from the control unit 1023. In this manner, the service session ID information and the like temporarily stored in the foregoing step SP1023 is updated to the service session ID information and the like having the extended validity period.

In addition, the page information generation unit 1036 generates video data based on the page information for music data distribution, and sends the generated video data to the display control unit 1024.

The display control unit 1024 hence performs a digital/analog conversion processing on the video data supplied from the page information generation unit 1036, and sends analog video signals thus obtained, to the display unit 1025, to display a page for music data distribution as a video based on the analog video signals, on the display unit 1025.

(3-7-3) Music-Related Service Providing Processing

With reference to next FIG. 32 to FIG. 35, a description will be made of a music-related service providing processing to be performed when the client terminal 1002 receives a music data distribution service, sales service, or radio broadcast information distribution service with use of the page information for music data distribution, page information for package media sales, page information for on-air list information distribution, or the like obtained from the music data distribution server 1004, sales server 1005, or radio broadcast information distribution server 1006 through the user authentication processing procedure, after completion of the user authentication processing procedure described above with reference to FIG. 31 and executed between the client terminal 1002 and the music data distribution server 1004, sales server 1005, or radio broadcast information distribution server 1006.

(3-7-3-1) Music Data Distribution Service Providing Procedure

Figure 32:
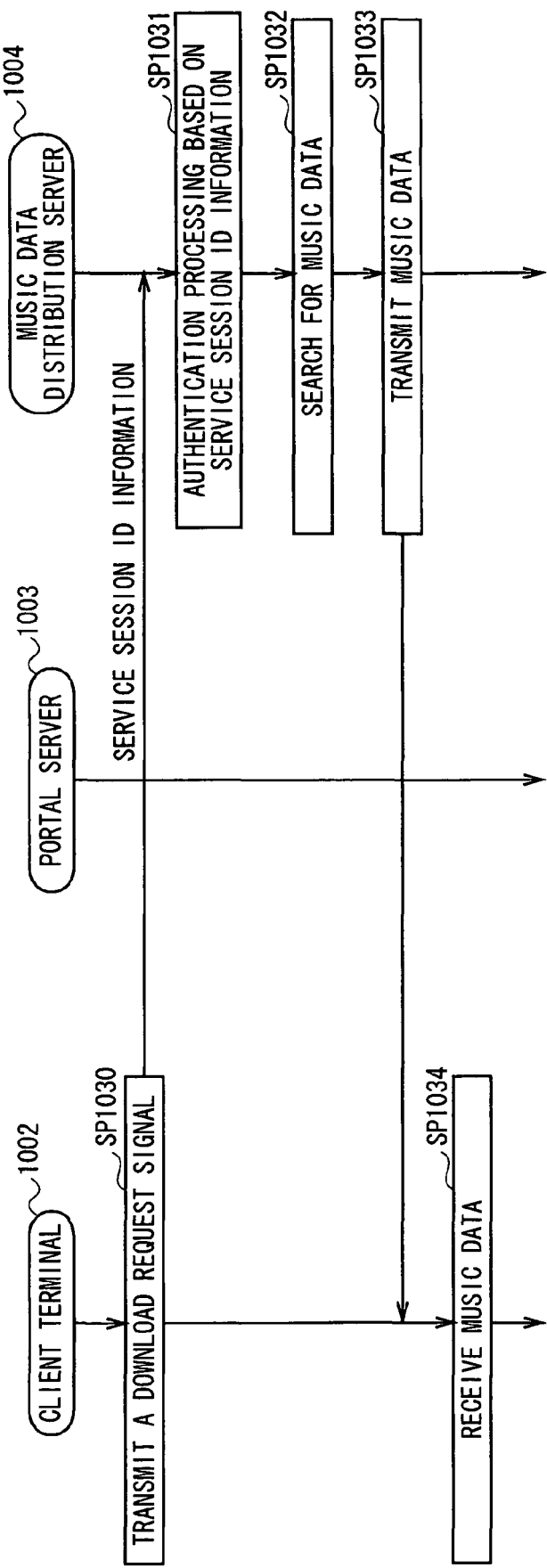
FIG. 32 is a sequence chart showing a music data distribution service providing procedure.

At first, with reference to FIG. 32, a description will be made of the procedure of processing of providing the music data distribution service when the client terminal 1002 receives a music data distribution service from the music data distribution server 1004.

In the step SP1030, the control unit 1023 of the client terminal 1002 generates a download request signal for requesting download of desired music data, in response to an inputted control command, when the control command to select part of a page for music data distribution displayed as a video on the display unit 1025 is inputted from the input processing unit 1021.

Then, the control unit 1023 transmits the download request signal together with service session ID information and the like issued by the music data distribution server 1004 and temporarily stored in the authentication information storage unit 1038, to the music data distribution server 1004 sequentially through the communication control unit 1032 and network interface 1033.

In the step SP1031, the control unit 1070 of the music data distribution server 1004 receives the download request signal, service session ID information, and the like transmitted from the client terminal 1002, sequentially through the network interface 1073 and communication control unit 1072, and sends the received service session ID information and the like to the authentication processing unit 1075.

The authentication processing unit 1075 hence executes a user authentication processing by comparing the service session ID information and the like received from the client terminal 1002, with the service session ID information and the like already stored temporarily in the authentication information storage unit 1077, under control from the control unit 1070.

As a result, if the user who has requested the download of music data with use of the client terminal 1002 is authenticated as a valid user by the authentication processing unit 1075, the control unit 1070 goes to the next step SP1032.

In the step SP1032, based on a search key included in the download request signal, the search unit 1079 searches for the desired music data to be downloaded, which satisfies a search condition suggested by the search key, among plural music data items in the music data storage unit 1078.

Further, as the music data is searched for by the search unit 1079, the control unit 1070 extends the validity period of the service session ID information and the like issued to the client terminal 1002, by the authentication processing unit 1075, and goes to the next step SP1033.

In the step SP1033, the control unit 1070 reads the desired music data to be downloaded, which has been searched for by the search unit 1079, from the music data storage unit 1078, and transmits the desired music data thus read, together with the service session ID information and the like having the validity period extended by the authentication processing unit 1075, to the client terminal 1002 sequentially through the communication control unit 1072 and network interface 1073.

In the step SP1034, the control unit 1023 of the client terminal 1002 receives the desired music data to be downloaded, which has been transmitted from the music data distribution server 1004, and the service session ID information and the like having the extended validity period, sequentially through the network interface 1033 and the communication control unit 1032. The control unit 1023 stores the received music data into the storage medium 1029 and sends the service session ID information and the like received from the music data distribution server 1004 to the authentication processing unit 1037.

The authentication processing unit 1037 temporarily stores the service session ID information And the like having the extended validity period and received from the music data distribution server 1004, into the authentication information storage unit 1038, by overwriting the service session ID information and the like before extension of the validity period, under control from the control unit 1023 in this manner, the service session ID information and the like already stored temporarily in the authentication information storage unit 1038 is updated.

Thus, the client terminal 1002 can download music data which the user desires to obtain, by using the music data distribution service provided by the music data distribution server 1004.

(3-7-3-2) Sales Service Providing Procedure

Figure 33:
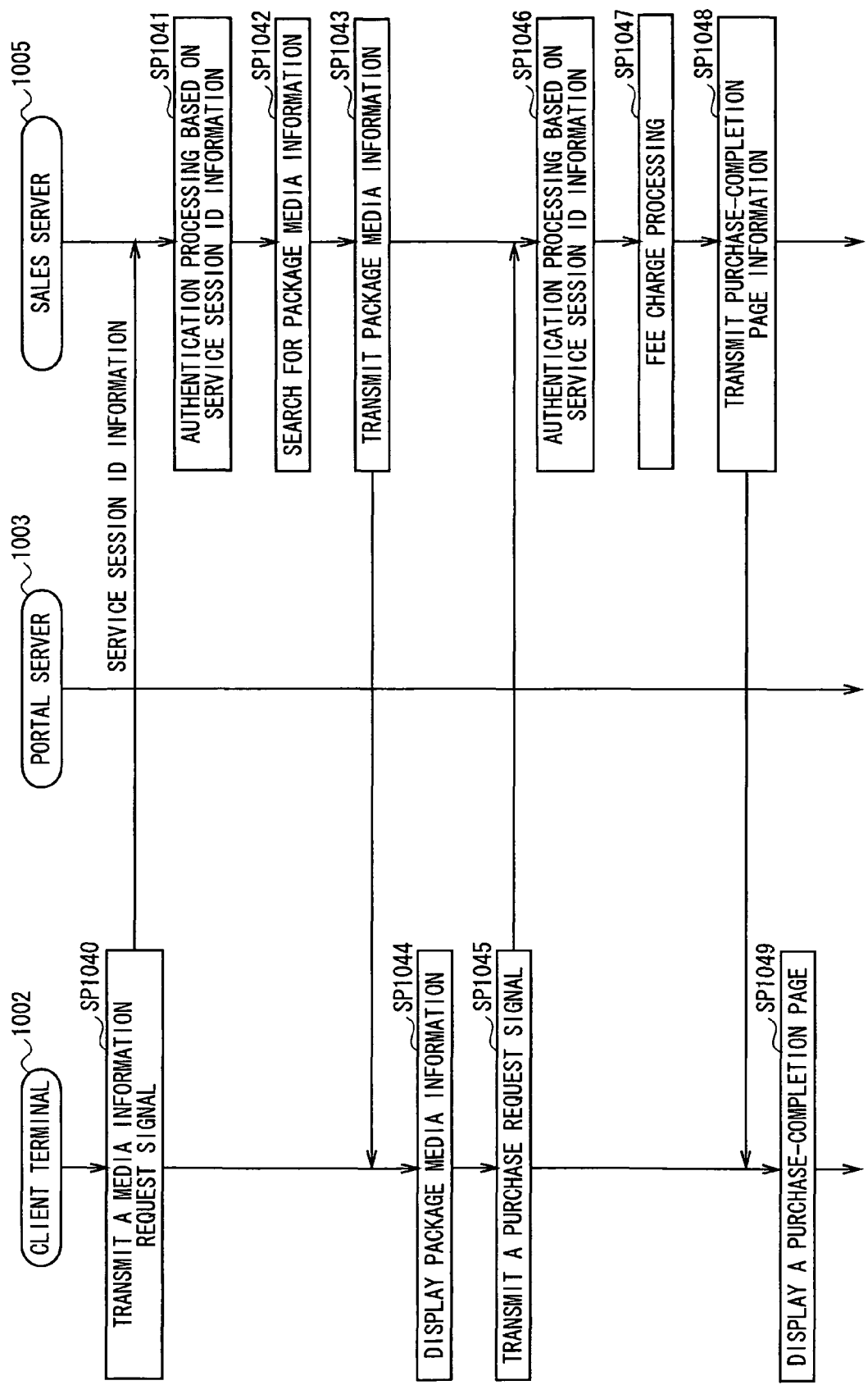
FIG. 33 is a sequence chart showing a sales service providing processing procedure.

Next, with reference to FIG. 33, a description will be made of the procedure of processing of providing sales service when the client terminal 1002 receives a sales service from the sales server 1005.

In the step SP1040, when a control command to select part of a page for package media sales displayed as a video on the display unit 1025 is inputted from the input processing unit 1021, the control unit 1023 of the client terminal 1002 generates a media information request signal for requesting specific package media information corresponding to the inputted control command.

Then, the control unit 1023 transmits the media information request signal together with service session ID information and the like issued already by the sales server 1005 and temporarily stored in the authentication information storage unit 1038, to the sales server 1005 sequentially through the communication control unit 1032 and network interface 1033.

In the step SP1041, the control unit 1090 of the sales server 1005 receives the media information request signal, service session ID information, and the like transmitted from the client terminal 1002, sequentially through the network interface 1093 and communication control unit 1092, and sends the received service session ID information and the like to the authentication processing unit 1095.

The authentication processing unit 1095 executes a user authentication processing by comparing the service session ID information and the like received from the client terminal 1002, with the service session ID information and the like already stored temporarily in the authentication information storage unit 1097, under control from the control unit 1090.

As a result, if the user who has requested the package media information concerning a package medium with use of the client terminal 1002 is authenticated as a valid user by the authentication processing unit 1095, the control unit 1090 goes to the next step SP1042.

In the step SP1042, based on a search key included in the media information request signal, the search unit 1099 searches for package media information of the specific package medium which satisfies a search condition suggested by the search key, among plural package media information items in the package media information storage unit 1098.

Further, as the package media information is searched for by the search unit 1099, the control unit 1090 extends the validity period of the service session ID information and the like issued to the client terminal 1002, by the authentication processing unit 1095, and goes to the next step SP1043.

In the step SP1043, the control unit 1090 reads the package media information which has been searched for by the search unit 1099, from the package media information storage unit 1098, and transmits the package media information thus read, together with the service session ID information and the like having the validity period extended by the authentication processing unit 1095, to the client terminal 1002 sequentially through the communication control unit 1092 and network interface 1093.

In the step SP1044, the control unit 1023 of the client terminal 1002 receives the package media information which has been transmitted from the sales server 1005, and the service session ID information and the like having the extended validity period, sequentially through the network interface 1033 and the communication control unit 1032. The control unit 1023 sends the received package media information to the page information generation unit 1036, and sends the service session ID information and the like received from the sales server 1005 to the authentication processing unit 1037.

The authentication processing unit 1037 temporarily stores the service session ID information and the like having the extended validity period and received from the sales server 1005, into the authentication information storage unit 1038, by overwriting the service session ID information and the like before extension of the validity period, under control from the control unit 1023. In this manner, the service session ID information and the like already stored temporarily in the authentication information storage unit 1038 are updated.

In addition, the page information generation unit 1036 generates video data based on the package media information supplied from the control unit 1023, converts the generated video data into analog video signals by the display control unit 1024, and sends the signals to the display unit 1025.

The control unit 1023 thus displays the package media information as a video based on the analog video signals, on the display unit 1025, and goes to the next step SP1045.

In the step SP1045, when a control command requesting purchase of the package medium corresponding to the package media information displayed as a video on the display unit 1025 is inputted from the input operation unit 1021, the control unit 1023 generates a purchase request signal requesting purchase of the package medium corresponding to the inputted control command.

Then, the control unit 1023 transmits the purchase request signal together with service session ID information and the like already received from the sales server 1005 and temporarily stored in the authentication information storage unit 1038 (i.e., service session ID information and the like having an extended validity period), to the sales server 1005 sequentially through the communication control unit 1032 and network interface 1033.

In the step SP1046, the control unit 1090 of the sales server 1005 receives the purchase request signal and the service session ID information and the like transmitted from the client terminal 1002, sequentially through the network interface 1093 and communication control unit 1092, and sends the received service session ID information and the like to the authentication processing unit 1095.

The authentication processing unit 1095 executes a user authentication processing by comparing the service session ID information and the like received from the client terminal 1002, with the service session ID information and the like already stored temporarily in the authentication information storage unit 1097, under control from the control unit 1090.

As a result, if the user who has requested the purchase of a package medium with use of the client terminal 1002 is authenticated as a valid user by the authentication processing unit 1095, the control unit 1090 goes to the next step SP1047.

In the step SP1047, the control unit 1090 executes a purchase processing such as a procedure for shipping the requested package medium, for the user using the client terminal 1002, and transmits fee charge information for a processing of charging the user a fee issued by purchase of the package medium, to the accounting server 1008 sequentially through the communication control unit 1092 and network interface 1093, thereby to make the accounting server 1008 execute a fee charge processing of charging the user a fee corresponding to the purchase of the package medium.

Also, the control unit 1090 makes the authentication processing unit 1095 extend the validity period of the service session ID information and the like issued to the client terminal 1002.

In the step SP1048, after completion of the fee charge processing, the control unit 1090 transmits purchase completion page information indicative of completion of the purchase processing of the package medium, together with the service session ID information and the like having a validity period extended by the authentication processing unit 1095, to the client terminal 1002 sequentially through the communication control unit 1092 and network interface 1093.

In the step SP1049, the control unit 1023 of the client terminal 1002 receives the purchase completion page information and the service session ID information and the like with an extended validity period transmitted from the sales server 1005, sequentially through the network interface 1033 and communication control unit 1032, and sends the received purchase completion page information to the page information generation unit 1032 as well as the service session ID information and the like received from the sales server 1005 to the authentication processing unit 1037.

The authentication processing unit 1037 temporarily stores the service session ID information and the like having the extended validity period and received from the sales server 1005, into the authentication information storage unit 1038, by overwriting the service session ID information and the like before extension of the validity period, under control from the control unit 1023, thereby to update the contents of the service session ID information and the like already stored temporarily in the authentication information storage unit 1038.

In addition, the page information generation unit 1036 generates video data based on the purchase completion page information supplied from the control unit 1023, converts the generated video data into analog video signals by the display control unit 1024, and sends the signals to the display unit 1025.

The control unit 1023 thus displays a purchase completion page as a video based on the analog video signals, on the display unit 1025.

Thus, the client terminal 1002 allows users to purchase desired package media, with use of the sales service provided by the sales server 1005.

Figure 34:
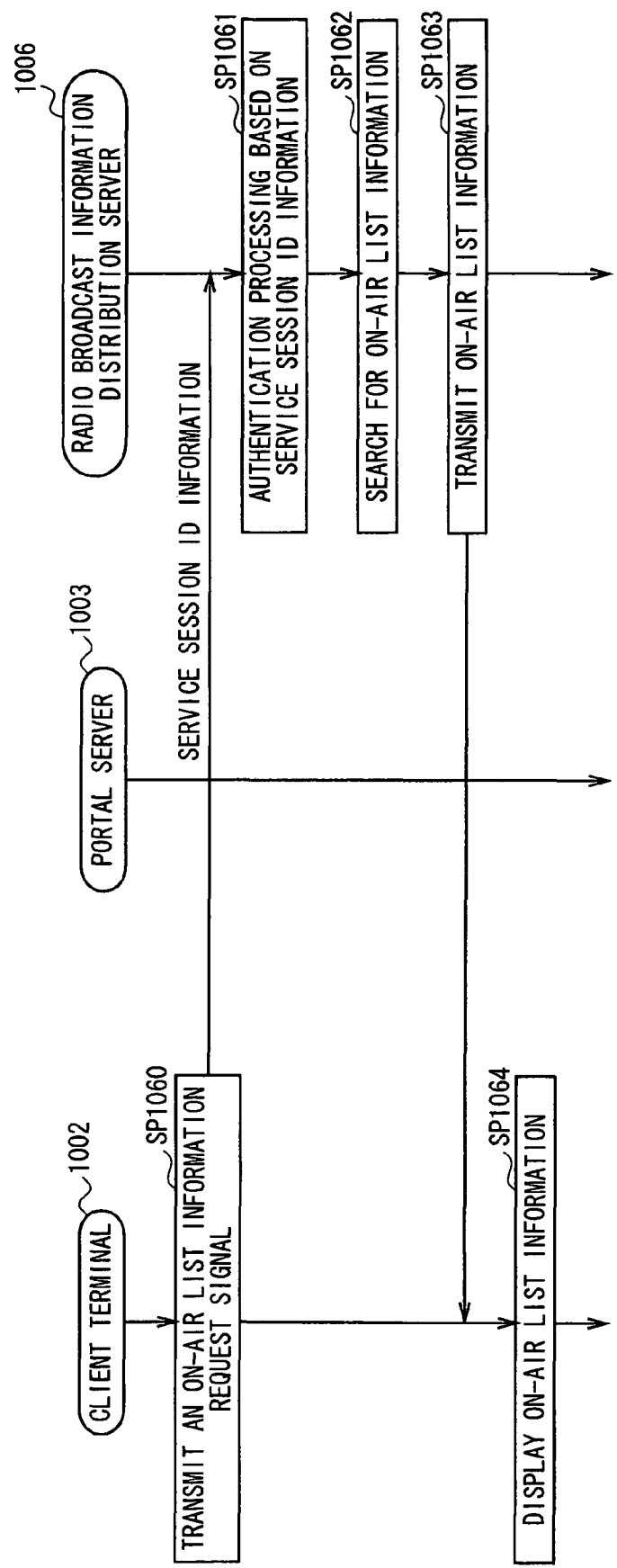
FIG. 34 is a sequence chart showing a radio broadcast information (on-air list information) distribution service providing processing procedure (1)

(3-7-3-3) On-Air List Information Distribution Service Providing Processing Procedure Next, with reference to FIG. 34, a description will be made of the procedure of processing of providing the radio broadcast information distribution service when the client terminal 1002 receives particularly an on-air list information distribution service as the radio broadcast information distribution service from the radio broadcast information distribution server 1006.

In the step SP1060, when a search key for searching for desired on-air list information to be obtained is inputted to an input box on a page for on-air list information distribution, which is displayed as a video on the display unit 1025, and a control command corresponding to a string of letters indicating the inputted search key is inputted from the input processing unit 1021, the control unit 1023 of the client terminal 1002 generates an on-air list information request signal requesting download of the desired on-air list information to be downloaded.

Then, the control unit 1023 transmits the on-air list information request signal together with service session ID information and the like already issued from the radio broadcast information distribution server 1006 and temporarily stored in the authentication information storage unit 1038, to the radio broadcast information distribution server 1006 sequentially through the communication control unit 1032 and network interface 1033.

In the step SP1061, the control unit 1110 of the radio broadcast information distribution server 1006 receives the on-air list information request signal and the service session ID information and the like transmitted from the client terminal 1002, sequentially through the network interface 1113 and communication control unit 1112, and sends the received service session ID information and the like to the authentication processing unit 1115.

The authentication processing unit 1115 executes a user authentication processing by comparing the service session ID information and the like received from the client terminal 1002, with the service session ID information and the like already stored temporarily in the authentication information storage unit 1120, under control from the control unit 1110.

As a result, if the user who has requested the on-air list information with use of the client terminal 1002 is authenticated as a valid user by the authentication processing unit 1115, the control unit 1110 goes to the next step SP1062.

In the step SP1062, based on the search key included in the on-air list information request signal, the search unit 1118 searches for part of a predetermined range which coincides with a search condition suggested by the search key, as the desired on-air list information to be obtained, from the entire on-air-list information in the on-air list information storage unit 1117.

Further, as the on-air list information is searched for by the search unit 1118, the control unit 1110 extends the validity period of the service session ID information and the like issued to the client terminal 1002, by the authentication processing unit 1115, and goes to the next step SP1063.

In the step SP1063, the control unit 1110 reads the on-air list information, which has been searched for by the search unit 1118, from the on-air list information storage unit 1117, and transmits the on-air list information thus read, together with the service session ID information and the like having the validity period extended by the authentication processing unit 1115, to the client terminal 1002 sequentially through the communication control unit 1112 and network interface 1113.

In the step SP1064, the control unit 1023 of the client terminal 1002 receives the on-air list information which has been transmitted from the radio broadcast information distribution server 1006, and the service session ID information and the like having the extended validity period, sequentially through the network interface 1033 and the communication control unit 1032. The control unit 1023 sends the received on-air list information to the page information generation unit 1036, and sends the service session ID information and the like received from the radio broadcast information distribution server 1006 to the authentication processing unit 1037.

The authentication processing unit 1037 temporarily stores the service session ID information and the like having the extended validity period and received from the radio broadcast information distribution server 1006, into the authentication information storage unit 1038, by overwriting the service session ID information and the like before extension of the validity period, under control from the control unit 1023, thereby to update the contents of the service session ID information and the like already stored temporarily in the authentication information storage unit 1038.

In addition, the page information generation unit 1036 generates video data, based on the on-air list information supplied from the control unit 1023, converts the generated video data into analog video signals by the display control unit 1024, and sends the signals to the display unit 1025, thereby to display the on-air list information as a video based on the analog video signals on the display unit 1025.

Thus, the client terminal 1002 allows users to obtain desired on-air list information, with use of the radio broadcast information distribution service provided by the radio broadcast information distribution server 1006.

Figure 35:
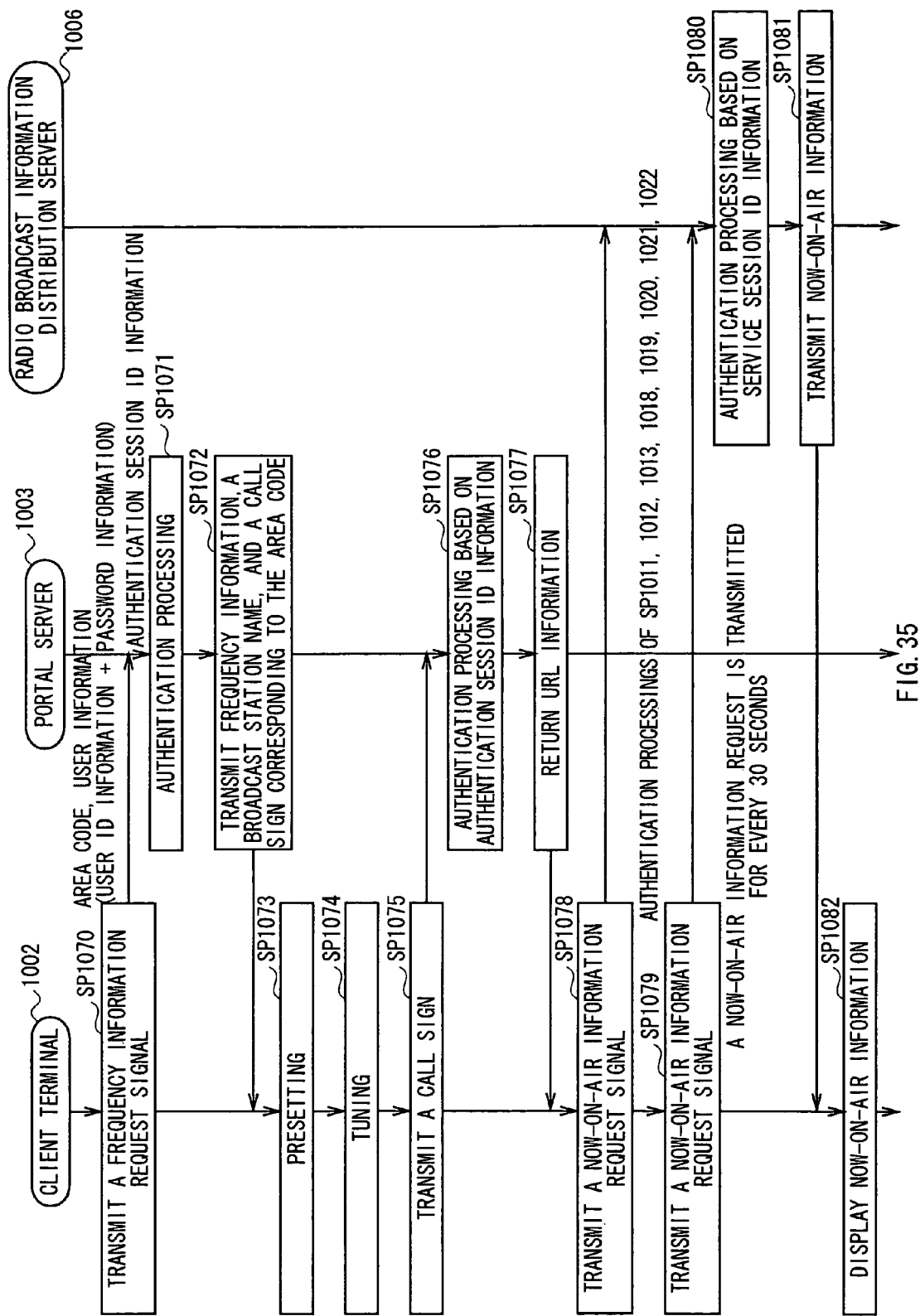
FIG. 35 is a sequence chart showing a radio broadcast information (now-on-air information) distribution service providing processing procedure (2).

(3-7-3-4) Now-On-Air Information Distribution Service Providing Processing Procedure Next, with reference to FIG. 35, a description will be made of the procedure of processing of providing the radio broadcast information distribution service when the client terminal 1002 receives particularly a now-on-air information distribution service as the radio broadcast information distribution service from the radio broadcast information distribution server 1006.

The radio broadcast information distribution server 1006 which provides now-on-air information is provided for every radio station (or call sign).

In some cases, the client terminal 1002 does not store URL information of radio broadcast information distribution servers 1006 corresponding to radio stations, in its initial state.

Therefore, the processing procedure of providing the radio broadcast information distribution service will be described below with reference to an example in which the portal server 1003 manages the URL information items of the radio broadcast information distribution servers 1006, for every one of call signs of radio stations.

This radio broadcast information distribution service providing processing procedure supposes a case that authentication session ID information or the like is not stored temporarily in the authentication information storage unit 1038 when the client terminal 1002 requests frequency information indicative of a broadcast frequency in order to automatically preset the broadcast frequency for every radio station. Therefore, the client terminal 1002 transmits, at first, user ID information, password information, and the like to the portal server 1003.

In the step SP1070, when an operation command requesting automatic presetting of the broadcast frequencies of radio stations is inputted from the input processing unit 1021, the control unit 1023 of the client terminal 1002 transmits a frequency information request signal which requests frequency information concerning receivable broadcast frequencies of respective radio stations, together with an area code inputted by the user and user ID information, password information, and the like stored in the authentication information storage unit 1038, to the portal server 1003 sequentially through the communication control unit 1032 and network interface 1033, in response to the inputted operation command.

In the step SP1071, the control unit 1050 of the portal server 1003 receives the frequency information request signal, area code, user ID information, password information, and the like transmitted from the client terminal 1002, sequentially through the network interface 1053 and communication control unit 1052, and sends the user ID information, password information, and the like received from the client terminal 1002, to the authentication processing unit 1056.

The authentication processing unit 1056 executes a user authentication processing by comparing the user ID information, password information, and the like received from the client terminal 1002, with customer information registered in the customer database unit 1054, under control from the control unit 1050.

As a result, if the user using the client terminal 1002 is authenticated as a valid user and the request for obtaining frequency information from the client terminal 1002 is determined to be a valid request, the authentication processing unit 1056 issues authentication session ID information and the like with respect to the communication connection state at present between the client terminal 1002 and the portal server 1003, and temporarily stores the issued authentication session ID information and the like into the authentication information storage unit 1057, under control from the control unit 1050.

If the user is authenticated as a valid user by the authentication processing unit 1056, the control unit 1050 goes to the next step SP1072.

In the step SP1072, based on the area code received from the client terminal 1002, the control unit 1050 searches for, lists up, and reads frequency information, radio station names, and call signs corresponding to the area code from the list of plural frequency information items, radio station names, and call signs in the frequency information storage unit 1058.

The control unit 1050 hence transmits the frequency information, radio station names, and call signs listed up and read from the frequency information storage unit 1058, together with the authentication session ID information and the like issued to the client terminal 1002 by the authentication processing unit 1056 in the foregoing step SP1071, to the client terminal 1002 sequentially through the communication control unit 1052 and network interface 1053.

In the step SP1073, the control unit 1023 of the client terminal 1002 receives the list of frequency information, radio station names, and call signs and the authentication session ID information and the like transmitted from the portal server 1003, sequentially through the network interface 1033 and communication control unit 1032, and sends the authentication session ID information and the like received from the portal server 1003 to the authentication processing unit 1037 as well as the list of frequency information, radio station names, and call signs to the display control unit 1024.

The authentication processing unit 1037 hence temporarily stores the authentication session ID information and the like received from the portal server 1003, into the authentication information storage unit 1038, under control from the control unit 1023.

The display control unit 1024 sends the list of frequency information, radio station names, and call signs supplied from the control unit 1023, to the display unit 1025, thereby to display the list on the display unit 1025.

Further, the control unit 1023 stores as preset items the frequency information, radio station name, and call sign, which are selected on the basis of a select command inputted from the input processing unit 1021 at this time, and goes to the next step SP1074.

In the step SP1074, the control unit 1023 controls the tuner unit 1031 to extract radio broadcast signals of the radio broadcast broadcasted at the broadcast frequency corresponding to a tuning control command inputted from the input processing unit 1021, from the radio broadcast waves.

The tuner unit 1031 hence extracts the radio broadcast signals broadcasted at the broadcast frequency from the radio broadcast waves received by the broadcast signal reception unit 30, performs a predetermined processing such as decoding or the like on the signals, and sends audio data obtained as a result, to the audio control unit 1026.

Therefore, the audio control unit 1026 converts the audio data supplied from the tuner unit 1031 into analog audio signals and sends the analog audio signals to the loudspeaker 1027. Thus, sounds of the selected radio program can be outputted.

In the step SP1075, the radio broadcast display control unit 1039 reads a call sign stored in correspondence with the frequency information indicative of the broadcast frequency according to the tuning control command described above, from the storage medium 1029, under control from the control unit 1023, and transmits the read call sign together with the authentication session ID information and the like already stored temporarily in the authentication information storage unit 1038, to the portal server 1003 sequentially through the communication control unit 1032 and network interface 1033.

In the step SP1076, the control unit 1050 of the portal server 1003 receives the call sign and the authentication session ID information and the like transmitted from the client terminal 1002, sequentially through the network interface 1053 and communication control unit 1052, and sends the received authentication session ID information and the like to the authentication processing unit 1056.

The authentication processing unit 1056 executes a user authentication processing by comparing the authentication session ID information and the like received from the client terminal 1002, with the authentication session ID information and the like which has already been stored temporarily in the authentication information storage unit 1057, under control from the control unit 1050.

As a result, if the validity period of the authentication session ID information and the like received from the client terminal 1002 has not yet expired and the user who has transmitted the call sign using the client terminal 1002 is therefore authenticated as a valid user by the authentication processing unit 1056, the control unit 1050 goes to the next step SP1077.

In the step SP1077, the control unit 1050 searches for URL information linked to the call sign among plural URL information items in the URL storage unit 1059, based on the call sign received from the client terminal 1002.

Also, the control unit 1050 extends the validity period of the authentication session ID information and the like issued to the client terminal 1002, by the authentication processing unit 1056.

Then, the control unit 1050 reads the URL information thus searched for, from the URL storage unit 1059, and transmits the read URL information together with the authentication session ID information and the like having the validity period extended by the authentication processing unit 1056, to the client terminal 1002 sequentially through the communication control unit 1052 and network interface 1053.

In the step SP1078, the control unit 1023 of the client terminal 1002 receives the URL information and the authentication session ID information and the like having the extended validity period, which have been transmitted from the portal server 1003, sequentially through the network interface 1033 and communication control unit 1032, and sends the received authentication session ID information and the like to the authentication processing unit 1037 as well as the URL information to the radio broadcast display control unit 1039.

The authentication processing unit 1037 temporarily stores the authentication session ID information and the like having the extended validity period, which have been received from the portal server 1003, by overwriting authentication session ID information and the like before extension of the validity period, under control from the control unit 1023, thereby to update the contents of the authentication session ID information and the like already stored temporarily in the information storage unit 1038.

Also, the radio broadcast display control unit 1039 temporarily stores the URL information supplied from the control unit 1023 into the storage medium 1029 or the like, with the information linked to a call sign stored also in the storage medium 1029, under control from the control unit 1023.

Further, the radio broadcast display control unit 1039 transmits a now-on-air information request signal requesting obtaining of now-on-air information, together with service session ID information and the like already received from the radio broadcast information distribution server 1006 and stored temporarily in the authentication information storage unit 1038, to the radio broadcast information distribution server 1006 sequentially through the communication control unit 1032 and network interface 1033, in accordance with the URL information temporarily stored in the storage medium 1029 or the like, under control from the control unit 1023.

In this radio broadcast information distribution service providing processing procedure, the processing of transmitting the now-on-air information request signal and service session ID information and the like from the client terminal 1002 to the radio broadcast information distribution server 1006 in the step SP1078 corresponds to the processing of the step SP1010 which has been described with reference to FIG. 31.

Figure 31:
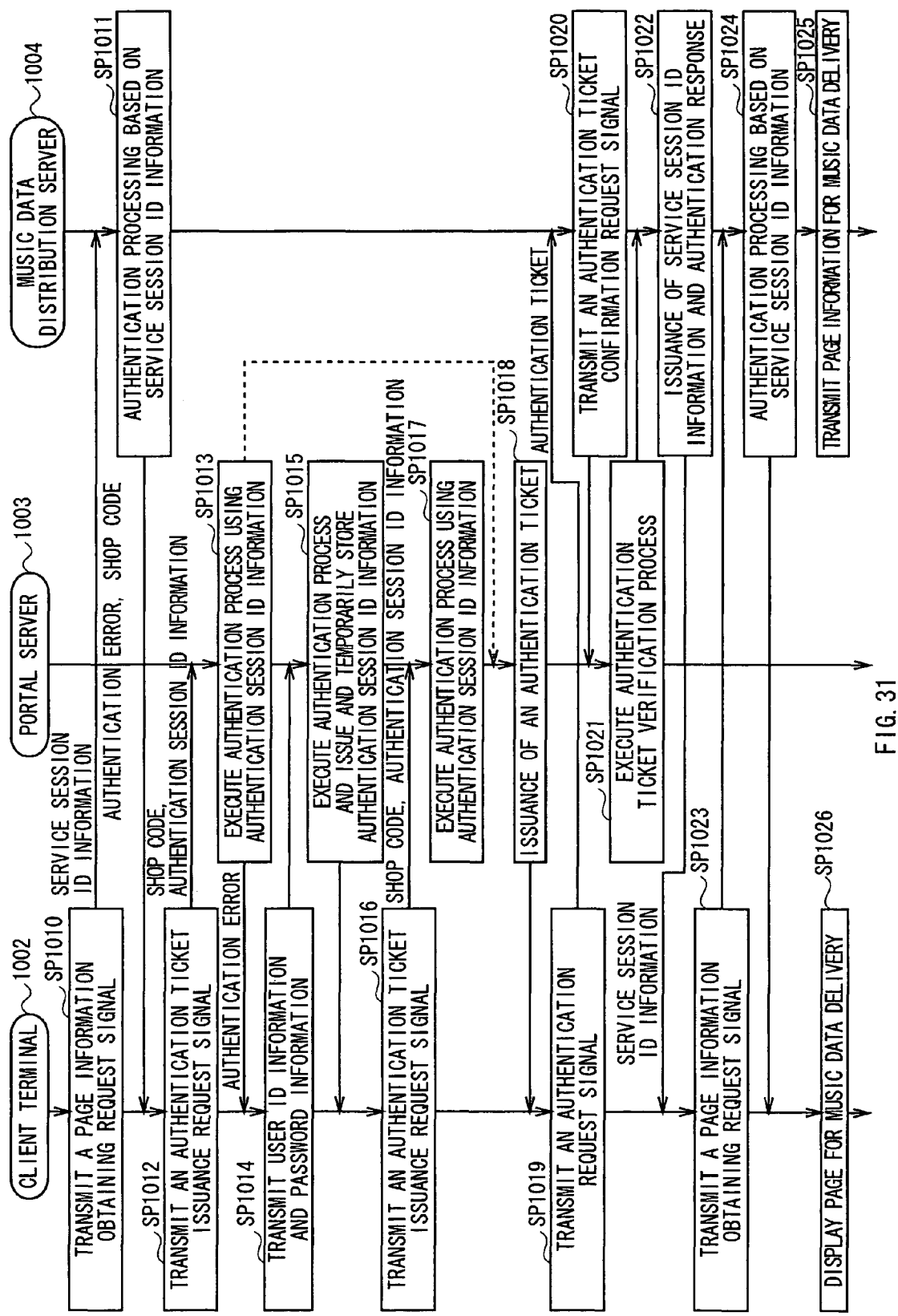
FIG. 31 is a sequence chart showing a user authentication processing procedure between the client terminal and the music data distribution server.

Therefore, in this radio broadcast information distribution service providing processing procedure, the same user authentication processing as those in the steps SP1011 to SP1013 and SP1018 to SP1022 described with reference to FIG. 31 are sequentially executed in the client terminal 1002, radio broadcast information distribution server 1006, and portal server 1003, following the processing of the step SP1078. Thereafter, the procedure goes to the subsequent step SP1079.

In the step SP1079, the radio broadcast display control unit 1039 of the client terminal 1002 transmits again the now-on-air information request signal together with service session ID information and the like already received from the radio broadcast information distribution server 1006 and stored temporarily in the authentication information storage unit 1038, to the radio broadcast information distribution server 1006 sequentially through the communication control unit 1032 and network interface 1033, in accordance with the URL information temporarily stored in the storage medium 1029 or the like, under control from the control unit 1023.

In the step SP1080, the control unit 1110 of the radio broadcast information distribution server 1006 receives the now-on-air information request signal and the service session ID information and the like transmitted from the client terminal 1002, sequentially through the network interface 1113 and communication control unit 1112, and sends the received authentication session ID information and the like to the authentication processing unit 1115.

The authentication processing unit 1115 hence executes a user authentication processing by comparing the service session ID information and the like received from the client terminal 1002, with the service session ID information and the like which have already been stored temporarily in the authentication information storage unit 1120, under control from the control unit 1110.

As a result, if the user using the client terminal 1002 is authenticated as a valid user, the authentication processing unit 1115 determines that the request for obtaining now-on-air information from the client terminal 1002 is a valid request.

Further, as the user using the client terminal 1002 is authenticated as a valid user by the authentication processing unit 1115, the control unit 1110 extends the validity period of the service session ID information and the like issued to the client terminal 1002, by the authentication processing unit 1115, and goes to the next step SP1081.

In the step SP1081, the control unit 1110 reads now-on-air information from the now-on-air information storage unit 1119, and transmits the now-on-air information thus read, together with the service session ID information and the like having the validity period extended by the authentication processing unit 1115, to the client terminal 1002 sequentially through the communication control unit 1112 and network interface 1113.

In the step SP1082, the control unit 1023 of the client terminal 1002 receives the now-on-air information transmitted from the radio broadcast information distribution server 1006 and the service session ID information and the like having the extended validity period, sequentially through the network interface 1033 and the communication control unit 1032, and sends the received service session ID-information and the like to the authentication processing unit 1037 as well as the now-on-air information to the radio broadcast display control unit 1039.

The authentication processing unit 1037 temporarily stores the service session ID information and the like having the extended validity period and received from the radio broadcast information distribution server 1006, into the authentication information storage unit 1038, by overwriting the service session ID information and the like before extension of the validity period, under control from the control unit 1023, thereby to update the service session ID information and the like already stored temporarily in the authentication information storage unit 1038.

Also, the radio broadcast display control unit 1039 sends the now-on-air information supplied from the control unit 1023 to the display unit 1025 through the display control unit 1024, thereby to display the now-on-air information concerning the radio program of the radio broadcast being received at present, on the display unit 1025.

Thereafter, in this radio broadcast information distribution service providing procedure, the client terminal 1002 periodically and repeatedly executes the request for obtaining now-on-air information in the step SP1079, and the radio broadcast information distribution server 1006 receives the request from the client terminal 1002 and executes the processing of the steps SP1080 and SP1081 sequentially.

In this manner, the client terminal 1002 can display the program name of the radio broadcast being received at present, the start time of broadcast of the program, the end time of broadcast of the program, the title and artist name of the song being broadcasted currently in the radio program, the start time of broadcast of the song, and the like, as now-on-air information being updated moment by moment, on the display unit 1025 of the client terminal 1002.

Of the program modules described in the first embodiment, the HTTP message program 111 and the communicator program 112 are program modules capable of realizing the same functions as those of the communication control unit 1032 of the client terminal 1002 described previously with reference to FIG. 24.

The content reproducing module 113 is a program module capable of realizing the same functions as those of the encoder/decoder unit 1034 of the client terminal 1002 described previously with reference to FIG. 24.

Further, the copyright protect management module 114 is a program module capable of realizing the same functions as those of the copyright management unit 1035 of the client terminal 1002 described previously with reference to FIG. 24.

Further, the Internet radio tuning/reproducing module 118 is a program module capable of realizing the same functions as those of the control unit 1023 and audio control unit 1026 of the client terminal 1002 described previously with reference to FIG. 24.

Further, the song purchase/playback module 119 is a program module capable of realizing the same functions as those of the control unit 1023 and audio control unit 1026 of the client terminal 1002 described previously with reference to FIG. 24.

Further, the XML browser 151 is a program module capable of realizing the same functions as those of the input processing unit 1021 and page information generation unit 1036 of the client terminal 1002 described previously with reference to FIG. 24.

Further, the hard disc content controller 117, database access module 115, and content data access module 116 are program modules capable of realizing the same functions as those of the control unit 1023 of the client terminal 1002 described previously with reference to FIG. 24.

Further, the authentication library 131 of the library 130 is a program module capable of realizing the same functions as those of the authentication processing unit 1037 and authentication information storage unit 1038 of the client terminal 1002 described previously with reference to FIG. 24.

Further, the clip library 132 of the library 130 is a program module capable of realizing the same functions as those of the control unit 1023 of the client terminal 1002 described previously with reference to FIG. 24.

Further, the related-information display module 120 is a program module capable of realizing the same functions as those of the radio broadcast display control unit 1039 of the client terminal 1002 described previously with reference to FIG. 24.

Further, the tuner tuning/reproducing/recording module 121 is a program module capable of realizing the same functions as those of the control unit 1023, audio control unit 1026, and tuner unit 1031 of the client terminal 1002 described previously with reference to FIG. 24.

Further, the audio user interface 152 is a program module capable of realizing the same functions as those of the input processing unit 1021, control unit 1023, and display control unit 1024 of the client terminal 1002 described previously with reference to FIG. 24.

Further, the CD playback module 141 is a program module capable of realizing the same functions as those of the audio control unit 1026 and external recording medium recording/reproducing unit 1028 of the client terminal 1002 described previously with reference to FIG. 24.

Further, the HDD reproducing module 142 is a program module capable of realizing the same functions as those of the control unit 1023 and audio control unit 1026 of the client terminal 1002 described previously with reference to FIG. 24.

That is, even in the terminal device 10 (terminal device 10X), the CPU 11 can execute the same processing as those of the client terminal 1002 by using these program modules.

Note that radio broadcasts broadcasted from radio stations are adopted as radio broadcasts which the client terminal 1002 can receive, in the embodiment described above. The present invention is not limited thereto but may be configured such that the client terminal 1002 receives Internet radio broadcast or satellite radio broadcast and obtains related information and radio broadcast information thereof. Alternatively, the client terminal 1002 may receive television broadcast broadcasted from television broadcast stations and may obtain various broadcast information and the like concerning television programs of the television broadcast from a server on the network NT1000.

Also, the above embodiment has been described with reference to a case where hardware circuit blocks, function circuit blocks, and program modules are mounted on the client terminal 1002. The present invention is not limited thereto but may be configured such that each of the program modules of the client terminal 1002 is installed in any of various information processing apparatuses such as a cellular phone, personal computer, and the like. Then, the same processing as those executed by the client terminal 1002 can be executed by the information processing apparatus.

INDUSTRIAL APPLICABILITY

The present invention is applicable to an information processing apparatus or the like which, for example, receives periodically related information of contents being broadcasted.

The invention claimed is:

1. An information processing apparatus comprising:
a transmitter configured to transmit request information continuously at a particular interval, the request information requesting related information related to a song currently being played in a broadcast program being received and including at least one of a song title of the song or an artist name of an artist of the song;
a receiver configured to receive the related information corresponding to the request information, the related information including the song title, the artist name, and an album number corresponding to the song, and to receive an identification code indicative of a right to receive a particular service upon purchase of a content as a response to the transmitted request, wherein the particular service is related to the broadcast program being received and the identification code includes an issuer of the identification code, a purpose of the identification code, a location at which the identification code can be used to receive the particular service, an expiration date of the identification code and a code identifier corresponding to the identification code, wherein the identification code is associated with a predetermined total time period of the broadcast program during which a plurality of songs are played, including the song currently being played, such that the identification code is the same for the related information received for all songs played during the broadcast program;
a memory configured to store the related information and the identification code which have been received along with time information indicating when the related information and the identification code were stored and a memory location identifying a location at which the song corresponding to both the related information and the identification code is stored; and
a display configured to automatically and continuously display the related information last received and automatically update the displayed related information when another song is played such that the displayed related information corresponds to the song currently being played until another song is played in the broadcast program.

2. The information processing apparatus according to claim 1, wherein
the transmitter is configured to transmit the identification code together with purchase request information requesting purchase of a content, and
the receiver is configured to receive content data corresponding to the purchase request information, as well as additional data corresponding to the identification code.

3. The information processing apparatus according to claim 1, wherein
the transmitter is configured to transmit purchase request information requesting purchase of a content, the identification code, and user identification information to identify a user.

4. The information processing apparatus according to claim 1, wherein
the receiver is configured to receive plural identification codes each being the identification code, and
the transmitter is configured to transmit purchase request information requesting purchase of a content, and the plural identification codes.

5. The information processing apparatus according to claim 4, wherein the plural identification codes transmitted by the transmitter are those that can be used for a purpose of purchase indicated by the purchase request information, among the plural identification codes received by the receiver.

6. The information processing apparatus according to claim 1, wherein
in response to an instruction to purchase the arbitrary content, the transmitter is configured to transmit the identification code indicative of a right to receive a particular service together with purchase request information requesting purchase of the arbitrary content, and
the receiver is configured to receive, together with content data corresponding to the purchase request information, a second identification code indicative of a right to allow the user to receive a particular service when the user further purchases a content.

7. The information processing apparatus according to claim 6, wherein
the receiver is configured to receive the content data, the second identification code, and additional data corresponding to the first identification code.

8. The information processing apparatus according to claim 6, wherein
the transmitter is configured to transmit the purchase request information, the first identification code, and user identification information to identify the user.

9. The information processing apparatus according to claim 6, wherein
the transmitter is configured to transmit the first identification codes, and
the receiver is configured to receive the content data, the second identification code, and additional data corresponding to plural first identification codes each being the first identification code.

10. An information processing method comprising:
transmitting request information continuously at a particular interval, the request information requesting related information related to a song currently being played in a broadcast program being received and including at least one of a song title of the song or an artist name of an artist of the song;
receiving the related information corresponding to the request information, the related information including the song title, the artist name, and an album number corresponding to the song, and receiving an identification code indicative of a right to receive a particular service upon purchase of a content as a response to the transmitted request, wherein the particular service is related to the broadcast program being received and the identification code includes an issuer of the identification code, a purpose of the identification code, a location at which the identification code can be used to receive the particular service, an expiration date of the identification code and a code identifier corresponding to the identification code, wherein the identification code is associated with a predetermined total time period of the broadcast program during which a plurality of songs are played, including the song currently being played, such that the identification code is the same for the related information received for all songs played during the broadcast program;
storing the related information and the identification code which have been received along with time information indicating when the related information and the identification code were stored and a memory location identifying a location at which the song corresponding to both the related information and the identification code is stored; and
automatically and continuously displaying the related information last received and automatically updating the displayed related information when another song is played, such that the displayed related information corresponds to the song currently being played in the broadcast program.

11. A non-transitory computer-readable recording medium including computer program instructions, which when executed by a computer, cause the computer to perform a method comprising:
transmitting request information continuously at a particular interval, the request information requesting related information related to a song currently being played in a broadcast program being received and including at least one of a song title of the song or an artist name of an artist of the song;
receiving the related information corresponding to the request information, the related information including the song title, the artist name, and an album number corresponding to the song, and receiving an identification code indicative of a right to receive a particular service upon purchase of a content as a response to the transmitted request, wherein the particular service is related to the broadcast program being received and the identification code includes an issuer of the identification code, a purpose of the identification code, a location at which the identification code can be used to receive the particular service, an expiration date of the identification code and a code identifier corresponding to the identification code, wherein the identification code is associated with a predetermined total time period of the broadcast program during which a plurality of songs are played, including the song currently being played, such that the identification code is the same for the related information received for all songs played during the broadcast program;
storing the related information and the identification code which have been received along with time information indicating when the related information and the identification code were stored and a memory location identifying a location at which the song corresponding to both the related information and the identification code is stored; and
automatically and continuously displaying the related information last received and automatically updating the displayed related information when another song is played, such that the displayed related information corresponds to the song currently being played in the broadcast program.

12. The information processing apparatus according to claim 1, wherein the broadcast program is a radio broadcast program that includes audio data but not video data.

* * * * *